(12) United States Patent
Aoki

(10) Patent No.: US 8,660,743 B2
(45) Date of Patent: Feb. 25, 2014

(54) TORQUE DETECTION DEVICE

(75) Inventor: Kenichiro Aoki, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/991,517

(22) PCT Filed: Dec. 24, 2010

(86) PCT No.: PCT/JP2010/073279
§ 371 (c)(1),
(2), (4) Date: Jun. 4, 2013

(87) PCT Pub. No.: WO2012/086045
PCT Pub. Date: Jun. 28, 2012

(65) Prior Publication Data
US 2013/0261886 A1  Oct. 3, 2013

(51) Int. Cl.
*G01M 17/00* (2006.01)
*G06F 7/00* (2006.01)
*G06F 19/00* (2011.01)
*G06F 11/30* (2006.01)
*G07C 5/00* (2006.01)

(52) U.S. Cl.
USPC ........... 701/34.4; 701/32.9; 701/33.7; 701/41

(58) Field of Classification Search
USPC ............ 701/1, 36, 41, 29.1, 29.7, 30.2, 30.3, 701/30.4, 32.9, 33.6, 33.7, 34.4
See application file for complete search history.

(56) References Cited

U.S. PATENT DOCUMENTS 8,217,600 B2 *  7/2012  Sakai ....................... 318/400.05
2013/0141871 A1 *  6/2013  Omae et al. .................. 361/709

FOREIGN PATENT DOCUMENTS

JP  A-2003-315182  11/2003

* cited by examiner

*Primary Examiner* — Rami Khatib
(74) *Attorney, Agent, or Firm* — Oliff PLC

(57) ABSTRACT

An output section of one detection coil of a first resolver and an output section of one detection coil of a second resolver are connected by a first inter-coil resistor element, and an output section of the other detection coil of the first resolver and an output section of the other detection coil of the second resolver are connected by a second inter-coil resistor element. A sin wave signal for excitation is supplied to one of first and second excitation coils, and a cos wave signal for excitation having the same frequency as that of the sin wave signal for excitation and having a phase delay of 90° in relation to the sin wave signal for excitation is supplied to the other of the first and second excitation coils. By virtue of this configuration, the rotational angles of the two resolvers can be calculated even when one of detection lines is broken.

13 Claims, 25 Drawing Sheets

US 8,660,743 B2

TORQUE DETECTION DEVICE

TECHNICAL FIELD

The present invention relates to a torque detection device which includes two resolvers and which detects torque acting on a shaft on the basis of rotational angles detected by the respective resolvers.

BACKGROUND ART

Conventionally, there has been known an electric power steering apparatus which produces a steering assist torque so as to assist a driver's steering operation. Such an electric power steering apparatus detects a steering torque acting on a steering shaft by use of a torque detection device, calculates a target assist torque which increases with the steering torque, and feedback-controls the amount of electricity supplied to an electric motor so as to obtain the calculated target assist torque. Accordingly, in such an electric power steering apparatus, in particular, the torque detection device must be reliable.

A steering torque detection device detects the torsion angle of a torsion bar provided in a steering shaft, and calculates a steering torque which is proportional to the torsion angle. For example, a torque detection device disclosed in Patent Document 1 employs a configuration which detects the torsion angle of a torsion bar by making use of two resolvers. In this torque detection device, a first resolver is provided at one end of the torsion bar, and a second resolver is provided at the other end thereof. Steering torque is detected from the difference between the rotational angle ($\theta_1$) detected by the first resolver and the rotational angle ($\theta_2$) detected by the second resolver.

Each resolver includes an excitation coil to which an excitation AC signal is supplied and which energizes a rotor coil, and a sin phase detection coil and a cos phase detection coil fixedly disposed around the torsion bar. The sin phase detection coil and the cos phase detection coil are assembled with a shift of 90° ($\pi/2$) (electrical angle) provided therebetween. The sin phase detection coil outputs an AC signal having an amplitude corresponding to the sin value of the rotational angle of the rotor, and the cos phase detection coil outputs an AC signal having an amplitude corresponding to the cos value of the rotational angle of the rotor.

The two resolvers are connected to an ECU, which constitutes a torque computation section. The ECU supplies an excitation AC signal to the excitation coil of the first resolver and the excitation coil of the second resolver via a common excitation line. In addition, the ECU receives output signals from the respective detection coils of the first resolver and the second resolver via individual detection lines.

The ECU computes the rotational angles of the torsion bar at positions where the respective resolvers are provided from the output signals from the sin phase detection coil and the cos phase detection coil of each resolver. The ECU then detects the steering torque acting on the torsion bar from the difference between the two rotational angles.

In the torque detection device disclosed in Patent Document 1, even in the case where either one of two detection lines of either one of the two resolvers is broken, the ECU estimates the rotational angle by use of only the signal output from the normal detection line of the resolver which has the broken detection line so long as the rotational angle detected by the resolver which does not have the broken detection line is within a predetermined angle range. For example, in the case where a sin phase detection line (a detection line to which the sin phase detection coil is connected) of the first resolver is broken, the ECU estimates the rotational angle by use of only the output signal received via a cos phase detection line (a detection line to which the cos phase detection coil is connected) of the first resolver so long as the rotational angle detected by the second resolver is within the predetermined angle range. The ECU can make this estimation based on the assumption that the mechanical angular difference between the first rotational angle ($\theta_1$) detected by the first resolver and the second rotational angle ($\theta_2$) detected by the second resolver is always limited to a certain value or less. Accordingly, even in the case where either one of the two detection lines is broken, the ECU can detect steering torque from the difference between the first rotational angle $\theta_1$ and the second rotational angle $\theta_2$ so long as the rotational angle detected by the resolver whose detection lines are not broken is within the predetermined angle range.

PRIOR ART DOCUMENT

Patent Document

Patent Document 1: Japanese Patent Application Laid-Open (kokai) No. 2003-315182

SUMMARY OF THE INVENTION

However, since the conventional torque detection device is configured to obtain the rotational angle from an output signal received via a single detection line under the condition that the mechanical angular difference between the first rotation angle $\theta_1$ and the second rotational angle $\theta_2$ is limited to a certain value or less, the rotational angle can be univocally obtained only in a limited situation. The conventional apparatus employing such a configuration cannot detect the rotational angle in about half the rotational angle range of each resolver. As a result, steering assist based on an accurately detected steering torque cannot be continued, whereby steering feeling is impaired. Moreover, in the case where double wiring is employed so as to secure redundancy for breakage of the detection lines, the configuration of the wiring harness becomes complex.

The present invention has been accomplished so as to cope with the above-described problems, and its object is to increase the degree of redundancy for breakage of detection lines without rendering complex the wiring connecting an ECU (a torque computation section) and first and second resolvers.

In order to achieve the above-described object, the present invention provides a torque detection device which comprises a resolver unit (100) and a torque computation section (32). The resolver unit (100) includes a first resolver (110) and a second resolver (120). The first resolver (110) has a first excitation coil (111) supplied with an excitation AC signal, a first sin phase detection coil (112) which outputs a voltage signal having an amplitude corresponding to the sin value of a rotational angle of a shaft (12) at a first axial position thereof, and a first cos phase detection coil (113) which outputs a voltage signal having an amplitude corresponding to the cos value of the rotational angle of the shaft at the first axial position thereof. The second resolver (120) has a second excitation coil (121) supplied with an excitation AC signal, a second sin phase detection coil (122) which outputs a voltage signal having an amplitude corresponding to the sin value of a rotational angle of the shaft at a second axial position thereof, and a second cos phase detection coil (123) which outputs a voltage signal having an amplitude corresponding to the cos value of the rotational angle of the shaft at the second axial position thereof. The torque computation section (32) supplies the excitation AC signals to an excitation AC signal input section of the first excitation coil and an excitation AC signal input section of the second excitation coil via individual excitation lines (210b, 220b). The torque computation section (32) inputs the voltage signals from a signal output section (100ps1, 212a) of the first sin phase detection coil, a signal output section (100pc1, 213a) of the first cos phase detection coil, a signal output section (100ps2, 222a) of the second sin phase detection coil, and a signal output section (100pc2, 223a) of the second cos phase detection coil via individual detection lines (212b, 213b, 222b, 223b). The torque computation section (32) calculates a first rotational angle ($\theta 1$) of the shaft at the first axial position and a second rotational angle ($\theta 2$) of the shaft at the second axial position on the basis of the voltage signals, and calculates a torque acting around the axis of the shaft on the basis of the calculated first and second rotational angles.

The resolver unit includes a first inter-coil resistor element (150) which electrically connects the signal output section of one of the first sin phase detection coil and the first cos phase detection coil of the first resolver and the signal output section of one of the second sin phase detection coil and the second cos phase detection coil of the second resolver, and a second inter-coil resistor element (160) which electrically connects the signal output section of the other of the first sin phase detection coil and the first cos phase detection coil of the first resolver and the signal output section of the other of the second sin phase detection coil and the second cos phase detection coil of the second resolver. The torque computation section includes a coil drive circuit (52) which supplies a sin wave signal for excitation to one of the first excitation coil and the second excitation coil and supplies a cos wave signal for excitation to the other of the first excitation coil and the second excitation coil, the cos wave signal for excitation having a frequency identical with that of the sin wave signal for excitation and having a phase delay of 90° in relation to the sin wave signal for excitation, and separation means (S12, S32, S36, S39, S42) which separates excitation sin wave signal components corresponding to the sin wave signal for excitation, and excitation cos wave signal components corresponding to the cos wave signal for excitation, from composite signals ($E_{s1}, E_{c1}, E_{s2}, E_{c2}$) which are input via the detection lines and including the voltage signals output from the first resolver and the second resolver in a mixed manner.

The torque detection device of the present invention includes a resolver unit and a torque computation section connected to the resolver unit via electrical wiring. The resolver unit includes a first resolver for detecting the rotational angle of a shaft at a first axial position (a first rotational angle), and a second resolver for detecting the rotational angle of the shaft at a second axial position (a second rotational angle).

The first resolver includes a first excitation coil, a first sin phase detection coil, and a first cos phase detection coil. An excitation AC signal output from the torque computation section is supplied to the first excitation coil via an excitation line. Thus, the first sin phase detection coil outputs a voltage signal having an amplitude corresponding to the sin value of the first rotational angle, and the first cos phase detection coil outputs a voltage signal having an amplitude corresponding to the cos value of the first rotational angle.

The second resolver includes a second excitation coil, a second sin phase detection coil, and a second cos phase detection coil. An excitation AC signal output from the torque computation section is supplied to the second excitation coil via an excitation line. Thus, the second sin phase detection coil outputs a voltage signal having an amplitude corresponding to the sin value of the second rotational angle, and the second cos phase detection coil outputs a voltage signal having an amplitude corresponding to the cos value of the second rotational angle.

The torque computation section inputs the voltage signals from the signal output sections of the coils via individual detection lines, calculates a first rotational angle and a second rotational angle of the shaft on the basis of the input voltage signals, and calculates a torque acting around the axis of the shaft on the basis of the first rotational angle and the second rotational angle. The rotational angle can be calculated, for example, on the basis of the arc tangent value of a value obtained by dividing a value corresponding to the voltage amplitude of the signal output from the sin phase detection coil by a value corresponding to the voltage amplitude of the signal output from the cos phase detection coil.

In the torque detection device configured as described above, when one of the detection lines is broken, the torque computation section becomes unable to receive the voltage signal of the detection coil corresponding to the broken detection line. Therefore, in such a state, the torque cannot be detected. In order to overcome such a drawback, in the present invention, a first inter-coil resistor element and a second inter-coil resistor element are provided in the resolver unit. The first inter-coil resistor element electrically connects the signal output section of one of the first sin phase detection coil and the first cos phase detection coil of the first resolver and the signal output section of one of the second sin phase detection coil and the second cos phase detection coil of the second resolver. The second inter-coil resistor element electrically connects the signal output section of the other of the first sin phase detection coil and the first cos phase detection coil of the first resolver and the signal output section of the other of the second sin phase detection coil and the second cos phase detection coil of the second resolver.

Accordingly, composite signals each including, in a mixed manner, the voltage signal from one detection coil of the first resolver and the voltage signal from one detection coil of the second resolver are input to the torque computation section via two detection lines; and composite signals each including, in a mixed manner, the voltage signal from the other detection coil of the first resolver and the voltage signal from the other detection coil of the second resolver are input to the torque computation section via two different detection lines.

The torque computation section includes a coil drive circuit for individually driving the first excitation coil and the second excitation coil, and separation means for obtaining, from the composite signals, values corresponding to the voltage amplitudes of the voltage signals output from the detection coils. The coil drive circuit supplies a sin wave signal for excitation to one of the first excitation coil and the second excitation coil and supplies a cos wave signal for excitation to the other of the first excitation coil and the second excitation coil. The cos wave signal for excitation has a frequency identical with that of the sin wave signal for excitation and has a phase delay of 90° in relation to the sin wave signal for excitation. Accordingly, each of the composite signals input to the torque computation section via the detection lines includes, in a mixed manner, an excitation sin wave signal component, which is a signal component generated in the corresponding detection coil by the sin wave signal for excitation, and an excitation cos wave signal component, which is a signal component generated in the corresponding detection coil by the cos wave signal for excitation.

The separation means receives the composite signals output from the first resolver and the second resolver via the detection lines, and separates the excitation sin wave signal component and the excitation cos wave signal component from each composite signal. For example, the excitation sin wave signal component can be extracted by modulating the composite signal with a sin wave signal produced in consideration of the phase delay, and the excitation cos wave signal component can be extracted by modulating the composite signal with a cos wave signal produced in consideration of the phase delay. Thus, from each detection line, there can be extracted the signal components output from two detection coils (one detection coil of the first resolver and one detection coil of the second resolver, or the other detection coil of the first resolver and the other detection coil of the second resolver). In the following description, detection lines which are electrically connected together by an inter-coil resistor element will be referred to as "detection lines which are paired."

Therefore, even in the case where any detection line is broken, the torque computation section can extract the output signal component of the detection coil corresponding to the broken detection line using the composite signal output from a detection line which is paired with the broken detection line.

Accordingly, even when one of the detection lines is broken, the rotational angle of the first resolver and the rotational angle of the second resolver can be calculated, and the torque can be detected. Thus, reliability in terms of breakage of the detection lines can be improved. Also, since it is unnecessary to provide the detection lines in double, the wiring for connecting the resolver unit and the torque computation section does not become complex and can be implemented at low cost.

Notably, even in the case where two of the detection lines are broken, if the broken detection lines are not paired (are not connected together by an inter-coil resistor element), the signal components output from the four detection coils can be separately extracted by using the composing signals output from two normal detection lines. Accordingly, the rotational angle of the first resolver and the rotational angle of the second resolver may be calculated in such a case as well.

Another feature of the present invention resides in that the torque detection device is provided in an electric power steering apparatus for a vehicle so as to detect a steering torque applied to a steering shaft (12).

In an electric power steering apparatus for a vehicle, the resolver unit is provided on the steering shaft, and the resolver unit and the torque computation section are connected with each other via a wiring harness. According to the present invention, even when a detection line which partially constitutes the wiring harness is broken, the steering torque can be detected. Therefore, steering assist by the electric power steering apparatus can be continued. Accordingly, the redundancy for wire breakage of the electric power steering apparatus can be improved.

Another feature of the present invention resides in that the first resolver and the second resolver are assembled to the shaft such that the first resolver and the second resolver have a phase shift of 90° in electrical angle therebetween in a state in which no torque is applied to the shaft.

According to the present invention, as compared with the case where the first resolver and the second resolver are assembled in the same phase, the maximum voltages of the composite signals input to the torque computation section via the detection lines become smaller. Therefore, the resolution of A/D conversion performed in the torque computation section can be increased. Thus, accurate torque detection can be performed.

Another feature of the present invention resides in that the resolver unit includes resistor elements (171, 172, 173, 174) for coping with grounding which are provided in the signal output section of the first sin phase detection coil, the signal output section of the first cos phase detection coil, the signal output section of the second sin phase detection coif, and the signal output section of the second cos phase detection coil such that each resistor element for coping with grounding is located on the side toward the corresponding detection line (212b, 213b, 222b, 223b) in relation to a connection point (151, 152, 161, 162) where the first inter-coil resistor element or the second inter-coil resistor element is connected to the corresponding signal output section.

According to the present invention, even in the case where one detection line is grounded, the potential at the connection point between the output signal section of a detection coil corresponding to the grounded detection line (a detection coil directly connected to the grounded detection line without mediation of an inter-coil resistor) and the inter-coil resistor element does not become zero. Therefore, from another detection line which is paired with the grounded detection line, there is output a composite signal which includes the voltage signals of the two detection coils in a mixed manner. Accordingly, the torque computation section can extract the signal component of the detection coil corresponding to the grounded detection line by using the composite signal output from the detection line which is paired with the grounded detection line. Thus, according to the present invention, not only in the case where any detection line is broken but also in the case where any detection line is grounded, the rotational angle of the first resolver and the rotational angle of the second resolver can be calculated, and the torque can be detected. Accordingly, the redundancy for harness breakage of the torque detection device can be improved further.

Another feature of the present invention resides in that the separation means adds the voltage values of the composite signals output from two signal output sections which are electrically connected with each other via the first inter-coil resistor element, adds the voltage values of the composite signals output from two signal output sections which are electrically connected with each other via the second inter-coil resistor element, and calculates, from the resultant voltage values (($E_{s1}+E_{s2}$), ($E_{c1}+E_{c2}$)), values ($S_{s1}$, $S_{c1}$) contained in the excitation sin wave signal component and corresponding to the amplitudes of the output voltages of the corresponding detection coils and values ($S_{s2}$, $S_{c2}$) contained in the excitation cos wave signal component and corresponding to the amplitudes of the output voltages of the corresponding detection coils.

In the case where the first resolver and the second resolver are connected with each other via inter-coil resistor elements, when the value corresponding to the voltage amplitude of the output signal of each detection coil is calculated on the basis of the composite signal received from the detection line, the value corresponding to the voltage amplitude decrease as compared with the case where the inter-coil resistor elements are not provided. Therefore, the resolution in the torque computation section decreases. In order to overcome such a drawback, in the present invention, the separation means adds the voltage values of the composite signals output from two signal output sections which are electrically connected with each other via the first inter-coil resistor element, adds the voltage values of the composite signals output from two signal output sections which are electrically connected with each other via the second inter-coil resistor element, and calculates, from the resultant voltage values, values contained in the excitation sin wave signal component and corresponding to the amplitudes of the output voltages of the corresponding detection coils and values contained in the excitation cos wave signal component and corresponding to the amplitudes of the output voltages of the corresponding detection coils. Therefore, as compared with the case where the voltage values of the composite signals are not added, the calculated output voltage amplitude corresponding value; i.e., the value corresponding to the amplitude of the voltage of the signal output from each detection coil increases. Therefore, the resolution in the torque computation section is improved, and satisfactory torque detection accuracy can be attained.

Another feature of the present invention resides in that the torque computation section includes temperature compensation means which compensates the influence, on the calculated rotational angles, of a difference between the temperature characteristic of the internal resistance of each detection coil and the temperature characteristic of each inter-coil resistor element.

In the case where the temperature characteristic of the internal resistance of each detection coil differs from the temperature characteristic of each inter-coil resistor element, the calculated rotational angles become inaccurate due to a temperature change within the resolver unit when any of the detection lines is broken. In order to overcome such a drawback, in the present invention, the temperature compensation means compensates the influence, on the calculated rotational angles, of the difference between the temperature characteristic of the internal resistance of each detection coil and the temperature characteristic of each inter-coil resistor element. Thus, according to the present invention, the rotational angles can be calculated accurately irrespective of the temperature change within the resolver unit.

Another feature of the present invention resides in that the temperature compensation means compensates the influence of the temperature characteristic on the calculated rotational angles by making the material of the inter-coil resistor elements the same as the material of the detection coils.

According to the present embodiment, since the temperature characteristic of the internal resistance of each detection coil becomes the same as that of each inter-coil resistor element, the rotational angles can be calculated accurately irrespective of the temperature change within the resolver unit.

Another feature of the present invention resides in that the separation means compensates the influence of the difference in temperature characteristic on the calculated rotational angles by separately extracting the voltage signal components output from the first sin phase detection coil, the first cos phase detection coil, the second sin phase detection coil, the second cos phase detection coil, from two composite signals output from the first resolver or the second resolver to the torque computation section (S11, S12, S82, S83, S86, S87, S89, S90, S91, S92).

According to the present invention, when one of the detection lines is broken, the signal components output from the first sin phase detection coil, the first cos phase detection coil, the second sin phase detection coil, the second cos phase detection coil are separately extracted from two composite signals output from a resolver which connects to the torque computation section via the detection lines which do not break. This procedure eliminates the influence of the internal resistance ($R_a$) of each detection coil and the resistance ($R_o$) of each inter-coil resistor element on the calculation of the rotational angles. Accordingly, the rotational angles can be calculated accurately irrespective of the temperature change within the resolver unit.

Another feature of the present invention resides in that the torque computation section includes phase shift compensation means which compensates phase shift between the voltage signals generated in the detection coils and the corresponding composite signals input to the torque computation section.

In the resolver unit, due to the influence of the inductances of the detection coils, a phase shift may be produced between the voltage signals generated in the detection coils and the corresponding composite signals input to the torque computation section. In such a case, the calculated rotational angles become inaccurate. In order to overcome such a drawback, in the present invention, the phase shift compensation means compensates the phase shift between the voltage signals generated in the detection coils and the corresponding composite signals input to the torque computation section. Thus, according to the present invention, the rotational angles can be calculated accurately.

Another feature of the present invention resides in that the phase shift compensation means compensates the phase shift by inductors (180, 190) connected in series to the first inter-coil resistor element and the second inter-coil resistor element respectively.

In the present invention, an inductor is connected in series to each inter-coil resistor element. Therefore, by setting the inductance of the inductor to a value for compensating the phase shift, the phase shift can be suppressed. Thus, the rotational angles can be calculated accurately.

Another feature of the present invention resides in that the torque computation section includes resistance calculation means (S111) which calculates the resistance of each inter-coil resistor element on the basis of the composite signals received via the detection lines, and anomaly processing means (S112, S113, S114, S115) which performs anomaly processing when the calculated resistance falls outside a normal range.

In this case, preferably, the anomaly processing means operates a warning device (S114) when the calculated resistance falls within a warning range defined outside the normal range, and outputs a torque detection impossible signal (S115) when the calculated resistance falls within a detection impossible range defined outside the warning range.

When the resistances of the inter-coil resistor elements change due to wire breakage, deterioration, or the like, the rotational angles cannot be accurately calculated on the basis of the composite signals. In order to overcome such a drawback, in the present invention, the resistance calculation means calculates the resistance of each inter-coil resistor element on the basis of the composite signals received via the detection lines. When the calculated resistance falls outside a normal range, the anomaly processing means performs anomaly processing. For example, the anomaly processing means operates a warning device when the calculated resistance falls within a warning range defined outside the normal range, and outputs a torque detection impossible signal when the calculated resistance falls within a detection impossible range defined outside the warning range.

By virtue of the above-described configuration, for a change in the resistance of each inter-coil resistor element with time, it is possible to prompt a user to exchange parts in an early stage. Also, for an anomaly of each inter-coil resistor element, such as wire breakage or short circuit, which has suddenly occurred, a signal representing that torque detection is impossible is output. Therefore, a piece of equipment which operates on the basis of the detected torque can be stopped quickly.

Another feature of the present invention resides in that the resolver unit includes an inter-excitation-coil resistor element (230) which electrically connects the excitation AC signal input section of the first excitation coil and the excitation AC signal input section of the second excitation coil.

In the present invention, excitation AC signals are supplied from the coil drive circuit to the two excitation coils of the resolver unit via the two excitation lines. In the case where one of the excitation lines is broken, an excitation AC signal is supplied to the excitation coil corresponding to the broken excitation line via the inter-excitation-coil resistor element. Accordingly, even in the case where one of the excitation lines is broken, an excitation AC signal can be supplied to the two excitation coils.

Thus, according to the present invention, even when one of the excitation lines is broken, each resolver allows calculation of the rotational angle thereof. Therefore, torque detection can be performed. Notably, in a state in which one of the excitation lines is broken, a common excitation AC signal is supplied to the two excitation coils. Therefore, in the case where one of the detection lines is broken in such a state, the torque detection becomes impossible. Therefore, preferably, the torque computation section includes excitation line breakage detection means which detects breakage of any of the excitation lines, and warning means which operates a warning device, when breakage of any of the excitation lines is detected, to thereby prompt a user to replace parts before occurrence of breakage anomaly of any of the detection lines.

Notably, in the above description, in order to facilitate understanding of the invention, symbols which are used in an embodiment and which are parenthesized are added to the constitution of the invention corresponding to the embodiment. However, the constituent elements of the invention are not limited to those in the embodiment denoted by the symbols.

MODE FOR CARRYING OUT THE INVENTION

Figure 1:
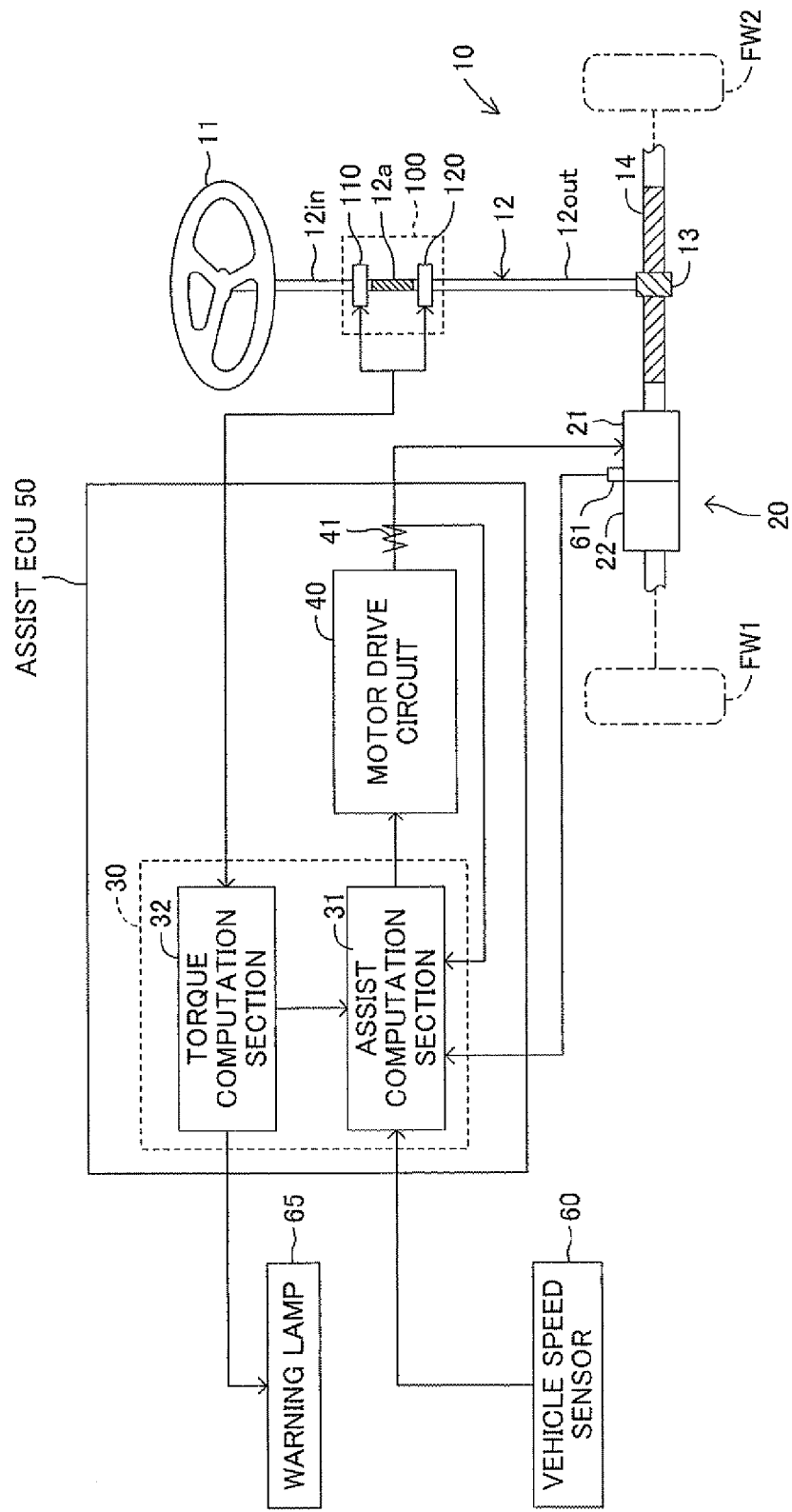
FIG. 1 is a schematic configurational diagram of an electric power steering apparatus equipped with a torque detection device according to an embodiment.

One embodiment of the present invention will next be described with reference to the drawings. FIG. 1 is a schematic configurational diagram of an electric power steering apparatus for a vehicle which is equipped with a torque detection device according to an embodiment.

The electric power steering apparatus for a vehicle includes a steering mechanism 10 for steering left and right front wheels FW1, FW (steerable wheels) in accordance with a driver's steering operation applied to a steering wheel 11; a power assist section 20 provided in the steering mechanism 10 and adapted to generate steering assist torque; an assist control apparatus 50 (hereinafter referred to as the assist ECU 50) for driving and controlling an electric motor 21 of the power assist section 20; a vehicle speed sensor 60; and a resolver unit 100.

The steering mechanism 10 includes a steering shaft 12 whose upper end is connected to the steering wheel 11 for unitary rotation therewith. A pinion gear 13 is connected to the lower end of the steering shaft 12 for unitary rotation therewith. The pinion gear 13 engages with a rack gear formed on a rack bar 14 to thereby constitute a rack and pinion mechanism. The left and right front wheels FW1, FW2 are steerably connected to opposite ends of the rack bar 14 via unillustrated tie rods and knuckle arms. The left and right front wheels FW1, FW2 are steered leftward and rightward in accordance with an axial displacement of the rack bar 14 caused by rotation of the steering shaft 12 about the axis thereof.

The power assist section 20 is assembled to the rack bar 14. The power assist section 20 is composed of the electric motor 21 for steering assist (e.g., a three-phase DC brushless motor), and a ball screw mechanism 22. The rotation shaft of the electric motor 21 is connected to the rack bar 14 via the ball screw mechanism 22 so as to transmit power to the rack bar 14. The electric motor 21 assists the steering of the left and right front wheels FW1, FW2 by rotating its rotation shaft. The ball screw mechanism 22, which functions as a speed reducer and a rotation-linear motion converter, reduces the rotational speed of the rotation shaft of the electric motor 21, converts the rotation of the rotation shaft to rectilinear motion, and transmits the rectilinear motion to the rack bar 14.

A rotational angle sensor 61 is provided on the electric motor 21 so as to detect the rotational angle of the rotation shaft thereof. The rotational angle sensor 61 is connected to the assist ECU 50.

The steering shaft 12 includes a torsion bar 12a provided at an intermediate position with respect to the axial direction thereof. A portion of the steering shaft 12 which connects the upper end of the torsion bar 12a and the steering wheel 11 will be referred to as an input shaft 12in, and a portion of the steering shaft 12 which connects the lower end of the torsion bar 12a and the pinion gear 13 will be referred to as an output shaft 12out.

The resolver unit 100 is provided on the steering shaft 12. The resolver unit 100 is composed of the torsion bar 12a, a first resolver 110 assembled to the input shaft 12 in, and a second resolver 120 assembled to the output shaft 12out. The first resolver 110 outputs a signal corresponding to the rotational angle of the input shaft 12 in (the rotational angle at one end of the torsion bar 12a corresponding to the first rotational angle at the first axial position of the present invention). The second resolver 120 outputs a signal corresponding to the rotational angle of the output shaft 12out (the rotational angle at the other end of the torsion bar 12a corresponding to the second rotational angle at the second axial position of the present invention). When the steering wheel 11 is rotated, a torque acts on the steering shaft 12, whereby the torsion bar 12a is twisted. The torsion angle of the torsion bar 12a is proportional to the steering torque acting on the steering shaft 12. Accordingly, the steering torque acting on the steering shaft 12 can be detected by means of obtaining the difference between the rotational angle $\theta_1$ detected by the first resolver 110 and the rotational angle $\theta_2$ detected by the second resolver 120. The first resolver 110 and the second resolver 120 are connected to the assist ECU 50.

The assist ECU 50 includes a computation section 30 composed of a microcomputer, a signal processing circuit, etc.; and a motor drive circuit 40 (e.g., a three-phase inverter circuit) composed of a switching circuit. The computation section 30 is composed of an assist computation section 31 and a torque computation section 32. The torque computation section 32 is connected to the resolver unit 100, and detects, through computation, the steering torque acting on the steering shaft 12. The portion composed of the resolver unit 100 and the torque computation section 32 corresponds to the torque detection device of the present invention. The resolver unit 100 and the torque computation section 32 will be described later.

The motor drive circuit 40 receives a PWM control signal from the assist computation section 31, and controls the duty ratios of internal switching elements, to thereby adjust the amount of electricity supplied to the electric motor 21. A current sensor 41 for detecting current flowing through the electric motor 21 is provided for the motor drive circuit 40.

The current sensor 41, the vehicle speed sensor 60, and the rotational angle sensor 61 are connected to the assist computation section 31. The vehicle speed sensor 60 outputs a vehicle speed detection signal representing vehicle speed vx. The assist computation section 31 also receives the steering torque calculated by the torque computation section 32. A warning lamp 65 for reporting anomaly to a driver is connected to the torque computation section 32, and the torque computation section 32 turns on the warning lamp 65 at the time of detection of an anomaly such as wire breakage.

Next, steering assist control performed by the assist computation section 31 will be described briefly. The assist computation section 31 acquires the vehicle speed vx detected by the vehicle speed sensor 60 and the steering torque Tr calculated by the torque computation section 32, and calculates a target assist torque on the basis of the acquired vehicle speed vx and steering torque Tr. The target assist torque is set with reference to an unillustrated assist map or the like such that the target assist torque increases as the steering torque Tr increases, and decreases as the vehicle speed vx increases. The assist computation section 31 calculates a target current required to generate the target assist torque, calculates a target instruction voltage on the basis of the difference between the actual current detected by the current sensor 41 and the target current, by making use of a PI control (proportional-plus-integral control) equation or the like, and outputs to the motor drive circuit 40 a PWM control signal corresponding to the target instruction voltage. The assist computation section 31 acquires the rotational angle (electrical angle) of the electric motor 21 detected by the rotational angle sensor 61, and generates a PWM control signal of three phases (U phase, V phase, and W phase) corresponding to the rotational angle, to thereby apply a three-phase drive voltage to the electric motor 21. Thus, through current feedback control, the target current flows through the electric motor 21 such that the electric motor 21 rotates in the same direction as the direction of the driver's steering operation. As a result, the driver's steering operation is properly assisted by the torque generated by the electric motor 21.

In order to properly perform such steering assist control, highly reliable detection of the steering torque Tr is necessary. In view of this, in the present embodiment, the steering torque Tr is detected by the following configuration.

Figure 2:
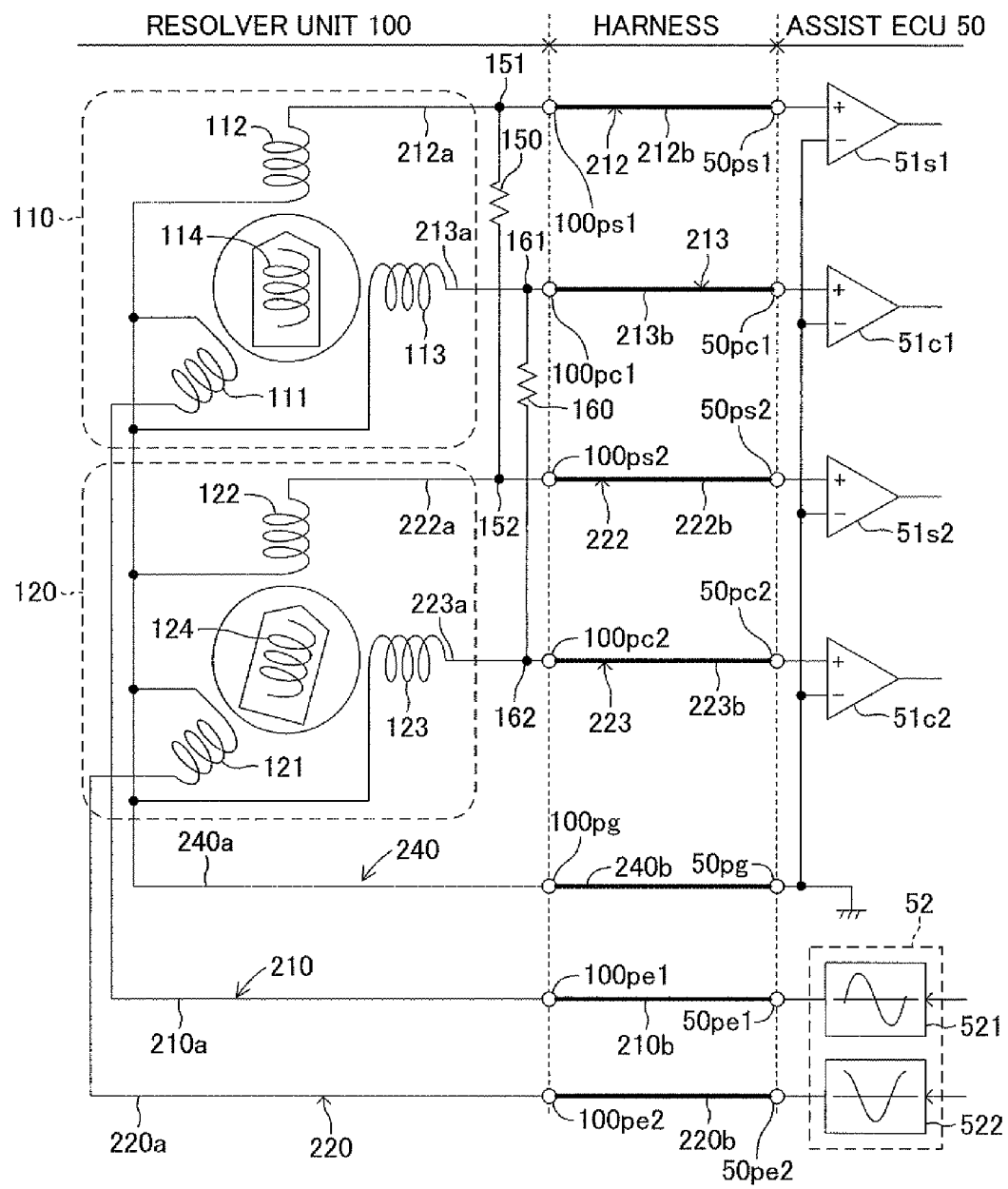
FIG. 2 is a schematic configurational diagram showing a resolver unit and the connection between the resolver unit and an assist ECU.

First, the resolver unit 100 will be described. FIG. 2 schematically shows the circuit configuration of the resolver unit 100. The first resolver 110 includes the input shaft 12in as a rotor. A first excitation coil 111 wound along the circumferential direction of the rotor is fixedly provided on a stator located radially outward of the input shaft 12in. A first rotor coil 114 is fixedly provided on the input shaft 12in, which serves as the rotor. The first rotor coil 114 rotates as a result of rotation of the rotor. The first rotor coil 114 is electrically connected, in a non-contact fashion, with the first excitation coil 111 via a transformer (not shown) provided in the rotor, whereby the first rotor coil 114 is energized by an AC voltage applied to the first excitation coil 111.

The first resolver 110 includes a first sin phase detection coil 112 and a first cos phase detection coil 113 provided on the stator located radially outward of the input shaft 12in. The first sin phase detection coil 112 and the first cos phase detection coil 113 are disposed such that they shift from each other by 90° in electrical angle.

The first sin phase detection coil 112 and the first cos phase detection coil 113 are disposed on the rotation plane of the first rotor coil 114, and output AC voltage signals upon receipt of magnetic flux generated by the first rotor coil 114. The amplitudes of the AC voltage signals generated by the first sin phase detection coil 112 and the first cos phase detection coil 113 change in accordance with the respective rotational positions of the first sin phase detection coil 112 and the first cos phase detection coil 113 in relation to the first rotor coil 114. That is, the first sin phase detection coil 112 outputs an AC voltage signal having an amplitude corresponding to the sin value of the rotational angle of the input shaft 12*in*; and the first cos phase detection coil 113 outputs an AC voltage signal having an amplitude corresponding to the cos value of the rotational angle of the input shaft 12*in*.

One end of the first excitation coil 111 is connected to a first excitation signal output port 50*pe*1 of the assist ECU 50 via a first excitation line 210. Notably, in the case where a portion of the first excitation line 210 provided within the resolver unit 100 and a harness portion thereof provided between the resolver unit 100 and the assist ECU 50 are distinguishably described, the portion provided within the resolver unit 100 will be referred to as an internal first excitation line 210*a*, and the hardness portion provided between the resolver unit 100 and the assist ECU 50 will be referred to as an external first excitation line 210*b*. The internal first excitation line 210*a* and the external first excitation line 210*b* are connected at a first excitation signal input port 100*pe*1.

One end of the first sin phase detection coil 112 is connected to a first sin phase signal input port 50*ps*1 of the assist ECU 50 via a first sin phase detection line 212. Also, one end of the first cos phase detection coil 113 is connected to a first cos phase signal input port 50*pc*1 of the assist ECU 50 via a first cos phase detection line 213. Notably, in the case where a portion of the first sin phase detection line 212 provided within the resolver unit 100 and a harness portion thereof provided between the resolver unit 100 and the assist ECU 50 are distinguishably described, the portion provided within the resolver unit 100 will be referred to as an internal first sin phase detection line 212*a*, and the harness portion provided between the resolver unit 100 and the assist ECU 50 will be referred to as an external first sin phase detection line 212*b*. Similarly, in the case where a portion of the first cos phase detection line 213 provided within the resolver unit 100 and a harness portion thereof provided between the resolver unit 100 and the assist ECU 50 are distinguishably described, the portion provided within the resolver unit 100 will be referred to as an internal first cos phase detection line 213*a*, and the harness portion provided between the resolver unit 100 and the assist ECU 50 will be referred to as an external first cos phase detection line 213*b*. The internal first sin phase detection line 212*a* and the external first sin phase detection line 212*b* are connected at a first sin phase signal output port 100*ps*1. Also, the internal first cos phase detection line 213*a* and the external first cos phase detection line 213*b* are connected at a first cos phase signal output port 100*pc*1.

The second resolver 120 includes the output shaft 12*out* as a rotor. A second excitation coil 121 wound along the circumferential direction of the rotor is fixedly provided on a stator located radially outward of the output shaft 12*out*. A second rotor coil 124 is fixedly provided on the output shaft 12*out*, which serves as the rotor. The second rotor coil 124 rotates as a result of rotation of the rotor. The second rotor coil 124 is electrically connected, in a non-contact fashion, with the second excitation coil 121 via a transformer (not shown) provided in the rotor, whereby the second rotor coil 124 is energized by an AC voltage applied to the second excitation coil 121.

The second resolver 120 includes a second sin phase detection coil 122 and a second cos phase detection coil 123 provided on the stator located radially outward of the output shaft 12*out*. The second sin phase detection coil 122 and the second cos phase detection coil 123 are disposed such that they shift from each other by 90° in electrical angle.

The second sin phase detection coil 122 and the second cos phase detection coil 123 are disposed on the rotation plane of the second rotor coil 124, and output AC voltage signals upon receipt of magnetic flux generated by the second rotor coil 124. The amplitudes of the AC voltage signals generated by the second sin phase detection coil 122 and the second cos phase detection coil 123 change in accordance with the respective rotational positions of the second sin phase detection coil 122 and the second cos phase detection coil 123 in relation to the second rotor coil 124. That is, the second sin phase detection coil 122 outputs an AC voltage signal having an amplitude corresponding to the sin value of the rotational angle of the output shaft 12*out*; and the second cos phase detection coil 123 outputs an AC voltage signal having an amplitude corresponding to the cos value of the rotational angle of the output shaft 12*out*.

One end of the second excitation coil 121 is connected to a second excitation signal output port 50*pe*2 of the assist ECU 50 via a second excitation line 220. Notably, in the case where a portion of the second excitation line 220 provided within the resolver unit 100 and a harness portion thereof provided between the resolver unit 100 and the assist ECU 50 are distinguishably described, the portion provided within the resolver unit 100 will be referred to as an internal second excitation line 220*a*, and the hardness portion provided between the resolver unit 100 and the assist ECU 50 will be referred to as an external second excitation line 220*b*. The internal second excitation line 220*a* and the external second excitation line 220*b* are connected at a second excitation signal input port 100*pe*2.

One end of the second sin phase detection coil 122 is connected to a second sin phase signal input port 50*ps*2 of the assist ECU 50 via a second sin phase detection line 222. Also, one end of the second cos phase detection coil 123 is connected to a second cos phase signal input port 50*pc*2 of the assist ECU 50 via a second cos phase detection line 223. Notably, in the case where a portion of the second sin phase detection line 222 provided within the resolver unit 100 and a harness portion thereof provided between the resolver unit 100 and the assist ECU 50 are distinguishably described, the portion provided within the resolver unit 100 will be referred to as an internal second sin phase detection line 222*a*, and the harness portion provided between the resolver unit 100 and the assist ECU 50 will be referred to as an external second sin phase detection line 222*b*. Similarly, in the case where a portion of the second cos phase detection line 223 provided within the resolver unit 100 and a harness portion thereof provided between the resolver unit 100 and the assist ECU 50 are distinguishably described, the portion provided within the resolver unit 100 will be referred to as an internal second cos phase detection line 223*a*, and the harness portion provided between the resolver unit 100 and the assist ECU 50 will be referred to as an external second cos phase detection line 223*b*. The internal second sin phase detection line 222*a* and the external second sin phase detection line 222*b* are connected at a second sin phase signal output port 100*ps*2. Also, the internal second cos phase detection line 223*a* and the external second cos phase detection line 223*b* are connected at a second cos phase signal output port 100*pc*2.

Furthermore, the internal first sin phase detection line 212*a* and the internal second sin phase detection line 222*a* are electrically connected via an electric resistor element 150. That is, one end (the signal output side) of the first sin phase detection coil 112 and one end (signal output side) of the second sin phase detection coil 122 are electrically connected via the electric resistor element 150 within the casing of the resolver unit 100. Hereinafter, the electric resistor element 150 will be referred to as an inter-coil resistor 150. In addition, the connection point between the internal first sin phase detection line 212a and the inter-coil resistor 150 will be referred to as a connection point 151, and the connection point between the internal second sin phase detection line 222a and the inter-coil resistor 150 will be referred to as a connection point 152.

Moreover, the internal first cos phase detection line 213a and the internal second cos phase detection line 223a are electrically connected via an electric resistor element 160. That is, one end (signal output side) of the first cos phase detection coil 113 and one end (signal output side) of the second cos phase detection coil 123 are electrically connected via the electric resistor element 160 within the casing of the resolver unit 100. Hereinafter, the electric resistor element 160 will be referred to as an inter-coil resistor 160. In addition, the connection point between the internal first cos phase detection line 213a and the inter-coil resistor 160 will be referred to as a connection point 161, and the connection point between the internal second cos phase detection line 223a and the inter-coil resistor 160 will be referred to as a connection point 162.

Notably, either one of the inter-coil resistors 150 and 160 corresponds to the first inter-coil resistor of the present invention, and the other one of the inter-coil resistors 150 and 160 corresponds to the second inter-coil resistor of the present invention.

Moreover, the other end of the first excitation coil 111, the other end of the second excitation coil 121, the other end of the first sin phase detection coil 112, the other end of the first cos phase detection coil 113, the other end of the second sin phase detection coil 122, and the other end of the second cos phase detection coil 123 are connected to a ground port 50pg of the assist ECU 50 via a common ground line 240. Notably, in the case where a portion of the ground line 240 provided within the resolver unit 100 and a harness portion thereof provided between the resolver unit 100 and the assist ECU 50 are distinguishably described, the portion provided within the resolver unit 100 will be referred to as an internal ground line 240a, and the harness portion provided between the resolver unit 100 and the assist ECU 50 will be referred to as an external ground line 240b. The internal ground line 240a and the external ground line 240b are connected at a ground port 100pg.

The external first excitation line 210b, the external first sin phase detection line 212b, the external first cos phase detection line 213b, the external second excitation line 220b, the external second sin phase detection line 222b, the external second cos phase detection line 223b, and the external ground line 240b, which are laid between the resolver unit 100 and the assist ECU 50, are bundled to form a wiring harness.

The torque computation section 32 includes a coil drive circuit 52. The coil drive circuit 52 includes a first excitation coil drive circuit 521 and a second excitation coil drive circuit 522. The first excitation coil drive circuit 521 outputs from the first excitation signal output port 50pe1 an AC voltage for excitation which has a constant period and a constant amplitude. Hereinafter, the AC voltage for excitation output from the first excitation signal output port 50pe1 will be referred to as a first excitation signal, and the voltage value of the first excitation signal will be referred to as a first excitation voltage $V_1$. The first excitation voltage $V_1$ is represented by the following equation (1), in which $A_1$ represents the amplitude.

$$V_1 = A_1 \sin(\omega t) \quad (1)$$

Meanwhile, the second excitation coil drive circuit 522 outputs from the second excitation signal output port 50pe2 an AC voltage for excitation which has the same frequency as that of the AC voltage for excitation output from the first excitation coil driver circuit 521 and which has a phase delay of 90° in relation to the AC voltage for excitation output from the first excitation coil driver circuit 521. Hereafter, the AC voltage for excitation output from the second excitation signal output port 50pe2 will be referred to as a second excitation signal, and the voltage value of the second excitation signal will be referred to as a second excitation voltage $V_2$. The second excitation voltage $V_2$ is represented by the following equation (2), in which $A_2$ represents the amplitude.

$$V_2 = A_2 \cos(\omega t) \quad (2)$$

Notably, the amplitudes $A_1$ and $A_2$ of the first excitation voltage $V_1$ and the second excitation voltage $V_2$ are set in accordance with the characteristics of the first resolver 110 and the second resolver 120.

For example, the two excitation signals are generated as follows. The assist ECU 50 stores a sinusoidal wave signal in a digital form, outputs this sinusoidal wave signal to the first excitation coil drive circuit 521, and outputs to the second excitation coil drive circuit 522 a sinusoidal wave signal which has a phase delay of 90° in relation to the stored sinusoidal wave signal (i.e., a cosine wave signal). Each of the drive circuits 521 and 522 includes a D/A converter (not shown) for converting an input digital signal to an analog voltage signal and an amplifier (not shown) for amplifying the output signal from the D/A converter; and outputs from the amplifier an excitation signal represented by the above-mentioned equation. The excitation signal can be generated by various other methods. For example, a first pulse train signal is supplied to the first excitation coil drive circuit 521, and a second pulse train signal which has a phase delay of 90° in relation to the first pulse train signal is supplied to the second excitation coil drive circuit 522. In the drive circuits 521 and 522, waveform shaping processing is performed for the respective pulse train signals so as to output two sinusoidal wave voltages with a phase shift of 90° provided therebetween.

The first excitation coil drive circuit 521 and the second excitation coil drive circuit 522 are individually controlled in accordance with instructions from the microcomputer within the assist ECU 50. Accordingly, the assist ECU 50 can output the first excitation signal and the second excitation signal independently of each other.

The first excitation signal is supplied to the first excitation coil 111 of the first resolver 110 via the first excitation line 210. Similarly, the second excitation signal is supplied to the second excitation coil 121 of the second resolver 120 via the second excitation line 220.

When the first excitation coil 111 of the first resolver 110 is excited by the first excitation signal, an AC voltage is generated in each of the first sin phase detection coil 112 and the first cos phase detection coil 113. Similarly, when the second excitation coil 121 of the second resolver 120 is excited by the second excitation signal, an AC voltage is generated in each of the second sin phase detection coil 122 and the second cos phase detection coil 123.

The voltage of the AC voltage signal output from the first sin phase detection coil 112 will be referred to as a first sin phase coil voltage $e_{s1}$, and the voltage of the AC voltage signal output from the first cos phase detection coil 113 will be referred to as a first cos phase coil voltage $e_{c1}$. Similarly, the voltage of the AC voltage signal output from the second sin phase detection coil 122 will be referred to as a second sin phase coil voltage $e_{s2}$, and the voltage of the AC voltage signal output from the second cos phase detection coil 123 will be referred to as a second cos phase coil voltage $e_{c2}$.

The first sin phase coil voltage $e_{s1}$, the first cos phase coil voltage $e_{c1}$, the second sin phase coil voltage $e_{s2}$, and the second cos phase coil voltage $e_{c2}$ are represented by the following equations (3) to (6).

$$e_{s1} = \alpha A_1 \sin(k\theta_1) \cdot \sin(\omega t + \phi) \quad (3)$$

$$e_{c1} = \alpha A_1 \cos(k\theta_1) \cdot \sin(\omega t + \phi) \quad (4)$$

$$e_{s2} = \alpha A_2 \sin(k\theta_2) \cdot \cos(\omega t + \phi) \quad (5)$$

$$e_{c2} = \alpha A_2 \cos(k\theta_2) \cdot \cos(\omega t + \phi) \quad (6)$$

In the above-mentioned equations, $\theta_1$ represents the angle of the rotor of the first resolver 110 connected directly to the input shaft 12*in*; $\theta_2$ represents the angle of the rotor of the second resolver 120 connected directly to the output shaft 12*out*; $\alpha$ represents the transformation ratio of the first resolver 110 and the second resolver 120; k represents the shaft angle multiplier of the first resolver 110 and the second resolver 120; $\phi$ represents the phase delay; $\omega$ represents the angular frequency; and t represents time.

Figure 3:
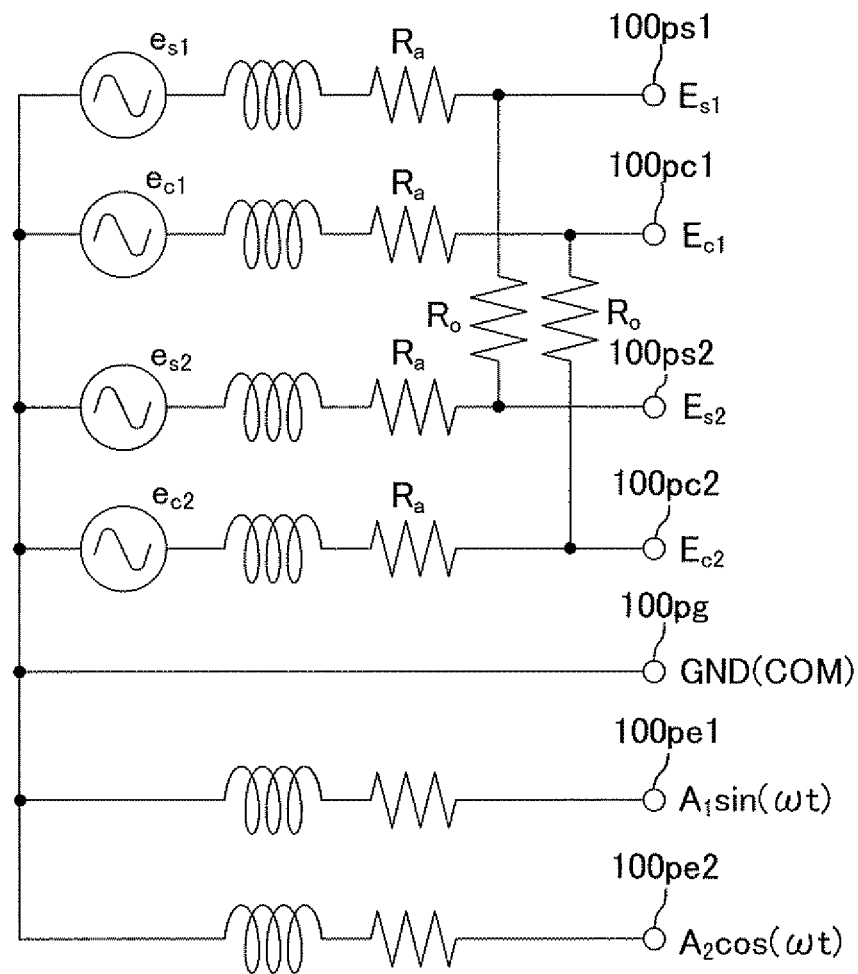
FIG. 3 is an electrical circuit diagram of the resolver unit.

FIG. 3 is an electrical circuit diagram of the resolver unit 100 represented through use of the first sin phase coil voltage $e_{s1}$, the first cos phase coil voltage $e_{c1}$, the second sin phase coil voltage $e_{s2}$, and the second cos phase coil voltage $e_{c2}$. The internal resistances (output impedances) of the detection coils 112, 113, 122, and 123 are all the same (i.e., $R_a$), and the resistances of the inter-coil resistors 150 and 160 are also the same (i.e., $R_0$).

The signal output from the first sin phase signal output port 100*ps*1 of the resolver unit 100; that is, the signal input to the first sin phase signal input port 50*ps*1 of the assist ECU 50, will be referred to as a first sin phase detection signal, and its voltage will be referred to as a first sin phase detection voltage $E_{s1}$. Similarly, the signal output from the first cos phase signal output port 100*pc*1 of the resolver unit 100; that is the signal input to the first cos phase signal input port 50*pc*1 of the assist ECU 50, will be referred to as a first cos phase detection signal, and its voltage will be referred to as a first cos phase detection voltage $E_{c1}$. The signal output from the second sin phase signal output port 100*ps*2 of the resolver unit 100; that is, the signal input to the second sin phase signal input port 50*ps*2 of the assist ECU 50, will be referred to as a second sin phase detection signal, and its voltage will be referred to as a second sin phase detection voltage $E_{s2}$. Similarly, the signal output from the second cos phase signal output port 100*pc*2 of the resolver 100; that is, the signal input to the second cos phase signal input port 50*pc*2 of the assist ECU 50, will be referred to as a second cos phase detection signal, and its voltage will be referred to as a second cos phase detection voltage $E_{c2}$.

The first sin phase detection signal, the first cos phase detection signal, the second sin phase detection signal, and the second cos phase detection signal correspond to the composite signal of the present invention.

The first sin phase detection voltage $E_{s1}$, the second sin phase detection voltage $E_{s2}$, the first cos phase detection voltage $E_{c1}$, and the second cos phase detection voltage $E_{c2}$ are represented by the following equations (7) to (10).

$$E_{s1} = \frac{R_0 + R_a}{R_0 + 2R_a} e_{s1} + \frac{R_a}{R_0 + 2R_a} e_{s2} \quad (7)$$

$$E_{s2} = \frac{R_a}{R_0 + 2R_a} e_{s1} + \frac{R_0 + R_a}{R_0 + 2R_a} e_{s2} \quad (8)$$

$$E_{c1} = \frac{R_0 + R_a}{R_0 + 2R_a} e_{c1} + \frac{R_a}{R_0 + 2R_a} e_{c2} \quad (9)$$

$$E_{c2} = \frac{R_a}{R_0 + 2R_a} e_{c1} + \frac{R_0 + R_a}{R_0 + 2R_a} e_{c2} \quad (10)$$

The resistance $R_a$ of each of the detection coils 112, 113, 122, and 123 is assumed to be equal to the resistance $R_0$ of each of the inter-coil resistors 150 and 160 ($R_a = R_0$). In such a case, the first sin phase detection voltage $E_{s1}$, the second sin phase detection voltage $E_{s2}$, the first cos phase detection voltage $E_{c1}$, and the second cos phase detection voltage $E_{c2}$ are represented by the following equations (11) to (14).

$$E_{s1} = \frac{2}{3}e_{s1} + \frac{1}{3}e_{s2} = \frac{\alpha}{3}(2A_1\sin(k\theta_1)\sin(\omega t + \phi) + A_2\sin(k\theta_2)\cos(\omega t + \phi)) \quad (11)$$

$$E_{s2} = \frac{1}{3}e_{s1} + \frac{2}{3}e_{s2} = \frac{\alpha}{3}(A_1\sin(k\theta_1)\sin(\omega t + \phi) + 2A_2\sin(k\theta_2)\cos(\omega t + \phi)) \quad (12)$$

$$E_{c1} = \frac{2}{3}e_{c1} + \frac{1}{3}e_{c2} = \frac{\alpha}{3}(2A_1\cos(k\theta_1)\sin(\omega t + \phi) + A_2\cos(k\theta_2)\cos(\omega t + \phi)) \quad (13)$$

$$E_{c2} = \frac{1}{3}e_{c1} + \frac{2}{3}e_{c2} = \frac{\alpha}{3}(A_1\cos(k\theta_1)\sin(\omega t + \phi) + 2A_2\cos(k\theta_2)\cos(\omega t + \phi)) \quad (14)$$

The assist ECU 50 receives the first sin phase detection signal, the first cos phase detection signal, the second sin phase detection signal, and the second cos phase detection signal via the first sin phase detection line 212, the first cos phase detection line 213, the second sin phase detection line 222, and the second cos phase detection line 223, respectively. In the assist ECU 50, the first sin phase detection signal, the first cos phase detection signal, the second sin phase detection signal, and the second cos phase detection signal are input to amplifiers 51*s*1, 51*c*1, 51*s*2, and 51*c*2, which amplify the voltages of the respective detection signals in relation to the ground potential. The amplified voltage signals are converted to digital values by use of an unillustrated A/D converter, and the digital values are input to the microcomputer, which performs torque calculation processing.

The torque computation section 32 of the assist ECU 50 includes a circuit which amplifies the first sin phase detection signal, the first cos phase detection signal, the second sin phase detection signal, and the second cos phase detection signal, converts them into digital signals, and inputs the digital signals into the microcomputer; a coil drive circuit 52; and a functional section in which the microcomputer performs torque calculation.

Next, a method of calculating a steering torque will be described. The steering torque can be calculated if the rotational angle $\theta_1$ of the first resolver 110 (the rotational angle of the input shaft 12*in*) and the rotational angle $\theta_2$ of the second resolver 120 (the rotational angled of the output shaft 12*out*) are known. Also, the rotational angle $\theta_1$ can be obtained if the value of $\sin(k\theta_1)$ and the value of $\cos(k\theta_1)$ are known. However, since each of the four detection signals input to the torque computation section 32 contains a voltage component associated with the first excitation signal ($A_1 \sin(\omega t)$) and a voltage component associated with the second excitation signal ($A_2 \cos(\omega t)$), a voltage value associated with the rotational angle $\theta_1$ and a voltage value associated with the rotational angle $\theta_2$ cannot be obtained separately. In order to overcome this drawback, the voltage component associated with the first excitation signal ($A_1 \sin(\omega t)$) and the voltage component associated with the second excitation signal ($A_2 \cos(\omega t)$) is separated from the detection signal as described below.

The torque computation section 32 samples the detection voltage $E_{s1}$ of the first sin phase detection signal, the detection voltage $E_{c1}$ of the first cos phase detection signal, the detection voltage $E_{s2}$ of the second sin phase detection signal, and the detection voltage $E_{c2}$ of the second cos phase detection signal at intervals represented by T/N. Notably, T represents the period ($T=2\pi/\omega$) of the first and second excitation signals, and N represents the number of times (integer) sampling is performed in each period. The torque computation section 32 then multiplies each of the sampled detection voltages (sampling data) by $\sin(\omega t(k)+\phi)$ or $\cos(\omega t(k)+\phi))$, and accumulates the values obtained through the multiplication within the single period. In this case, t(k) is represented by the following equation (15).

$$t(k)=t0+kT/N \tag{15}$$

(k=0, 1, ..., N−1)

Figure 4:
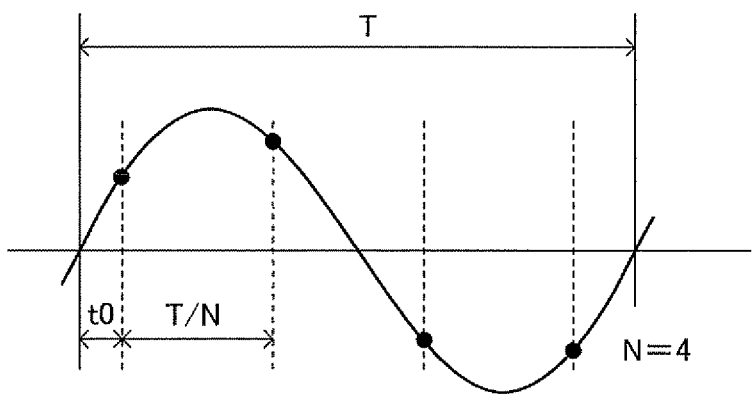
FIG. 4 is a graph showing sampling timings.

FIG. 4 shows, as an example, the timings at which sampling is performed with N set to 4. Notably, N is equal to or greater than 3.

As shown by the equation (16) given below, the value obtained by accumulating, over one period, the result obtained by multiplying the value of $\sin(\omega t(k)+\phi)$ by the value of $\sin(\omega t(k)+\phi)$ becomes N/2. Similarly, as shown by the equation (17) given below, the value obtained by accumulating, over one period, the result obtained by multiplying the value of $\cos(\omega t(k)+\phi)$ by the value of $\sin(\omega t(k)+\phi)$ becomes zero. The properties of these calculations can be explained on the basis of the orthogonality between the sin and cos functions.

$$\sum_{k=0}^{N-1}\sin\!\left(\omega\!\left(t_0+\frac{kT}{N}\right)+\phi\right)\cdot\sin\!\left(\omega\!\left(t_0+\frac{kT}{N}\right)+\phi\right)= \tag{16}$$

$$\frac{N}{2}-\frac{1}{2}\sum_{k=0}^{N-1}\cos 2\!\left(\omega\!\left(t_0+\frac{kT}{N}\right)+\phi\right)=\frac{N}{2}$$

$$\sum_{k=0}^{N-1}\sin\!\left(\omega\!\left(t_0+\frac{kT}{N}\right)+\phi\right)\cdot\cos\!\left(\omega\!\left(t_0+\frac{kT}{N}\right)+\phi\right)= \tag{17}$$

$$\frac{1}{2}\sum_{k=0}^{N-1}\cos 2\!\left(\omega\!\left(t_0+\frac{kT}{N}\right)+\phi\right)=0$$

(N = 3, 4, 5 ... )

By means of using the above-described properties, the second excitation signal ($A_2 \cos(\omega t)$) component can be removed from the composite signal which contains the first excitation signal ($A_1 \sin(\omega t)$) component and the second excitation signal ($A_2 \cos(\omega t)$) component by modulating the first sin phase detection signal, the first cos phase detection signal, the second sin phase detection signal, and the second cos phase detection signal with a sin signal. Similarly, the first excitation signal ($A_2 \sin(\omega t)$) component can be removed by modulating the first sin phase detection signal, the first cos phase detection signal, the second sin phase detection signal, and the second cos phase detection signal with a cos signal.

The torque computation section 32 samples the detection voltage $E_{s1}$ of the first sin phase detection signal, the detection voltage $E_{c1}$ of the first cos phase detection signal, the detection voltage $E_{s2}$ of the second sin phase detection signal, and the detection voltage $E_{c2}$ of the second cos phase detection signal, multiplies the sampled detection voltages $E_{s1}$ and $E_{c1}$ by the value of $\sin(\omega t(k)+\phi)$, and accumulates the values obtained through the multiplication within the single period. Similarly, the torque computation section 32 multiplies the sampled detection voltage $E_{s2}$ and $E_{c2}$ by the value of $\cos(\omega t(k)+\phi)$, and accumulates the values obtained through the multiplication within the single period. Hereinafter, the process of multiplying the sampled voltage of a detection signal by the value of $\sin(\omega t(k)+\phi)$ or the value of $\cos(\omega t(k)+\phi)$ and accumulating the value obtained through the multiplication over one period will be referred to as multiplying and accumulating operation.

Here, the value obtained by performing the multiplying and accumulating operation for the first sin phase detection voltage $E_{s1}$ with a sin signal is denoted by $S_{s1}$, the value obtained by performing the multiplying and accumulating operation for the first cos phase detection voltage $E_{c1}$ with the sin signal is denoted by $S_{c1}$, the value obtained by performing the multiplying and accumulating operation for the second sin phase detection voltage $E_{s2}$ with a cos signal is denoted by $S_{s2}$, and the value obtained by performing the multiplying and accumulating operation for the second cos phase detection voltage $E_{c2}$ with the cos signal is denoted by $S_{c2}$. In such a case, the values $S_{s1}$, $S_{c1}$, $S_{s2}$, and $S_{c2}$ are represented by the following equations (18) to (21).

$$E_{s1}= \tag{18}$$
$$\frac{\alpha}{3}(2A_1\sin(k\theta_1)\sin(\omega t+\phi)+A_2\sin(k\theta_2)\cos(\omega t+\phi))\xrightarrow{\Sigma E_{s1}\cdot\sin(\omega t+\phi)}$$
$$S_{s1}=\frac{N\alpha}{3}A_1\sin(k\theta_1)$$

$$E_{c1}= \tag{19}$$
$$\frac{\alpha}{3}(2A_1\cos(k\theta_1)\sin(\omega t+\phi)+A_2\cos(k\theta_2)\cos(\omega t+\phi))\xrightarrow{\Sigma E_{c1}\cdot\sin(\omega t+\phi)}$$
$$S_{c1}=\frac{N\alpha}{3}A_1\cos(k\theta_1)$$

$$E_{s2}= \tag{20}$$
$$\frac{\alpha}{3}(A_1\sin(k\theta_1)\sin(\omega t+\phi)+2A_2\sin(k\theta_2)\cos(\omega t+\phi))\xrightarrow{\Sigma E_{s2}\cdot\cos(\omega t+\phi)}$$
$$S_{s2}=\frac{N\alpha}{3}A_2\sin(k\theta_2)$$

$$E_{c2}= \tag{21}$$
$$\frac{\alpha}{3}(A_1\cos(k\theta_1)\sin(\omega t+\phi)+2A_2\cos(k\theta_2)\cos(\omega t+\phi))\xrightarrow{\Sigma E_{c2}\cdot\sin(\omega t+\phi)}$$
$$S_{c2}=\frac{N\alpha}{3}A_2\cos(k\theta_2)$$

Since the values $S_{s1}$, $S_{c1}$, $S_{s2}$, and $S_{c2}$ correspond to the amplitudes of the first sin phase coil voltage $e_{s1}$, the first cos phase coil voltage $e_{c1}$, the second sin phase coil voltage $e_{s2}$, and the second cos phase coil voltage $e_{c2}$, hereinafter, the value $S_{s1}$ will be referred to as a first sin phase amplitude, the value $S_{c1}$ will be referred to as a first cos phase amplitude, the value $S_{s2}$ will be referred to as a second sin phase amplitude, and the value $S_{c2}$ will be referred to as a second cos phase amplitude. In the case where these amplitudes are collectively referred, they will be simply referred to as $S_{s1}$, $S_{c1}$, $S_{s2}$, and $S_{c2}$.

Accordingly, the rotational angle $\theta_1$ of the first resolver 110 can be calculated from the first sin phase amplitude $S_{s1}$ and the first cos phase amplitude $S_{c1}$ in accordance with the following equation (22).

$$\theta_1 = \frac{1}{k}\tan^{-1}\frac{\sin(k\theta_1)}{\cos(k\theta_1)} = \frac{1}{k}\tan^{-1}\frac{S_{s1}}{S_{c1}} \tag{22}$$

Similarly, the rotational angle $\theta_2$ of the second resolver 120 can be calculated from the second sin phase amplitude $S_{s2}$ and the second cos phase amplitude $S_{c2}$ in accordance with the following equation (23).

$$\theta_2 = \frac{1}{k}\tan^{-1}\frac{\sin(k\theta_2)}{\cos(k\theta_2)} = \frac{1}{k}\tan^{-1}\frac{S_{s2}}{S_{c2}} \tag{23}$$

As described above, the torque computation section 32 samples the first sin phase detection voltage $E_{s1}$, the first cos phase detection voltage $E_{c1}$, the second sin phase detection voltage $E_{s2}$, and the second sin phase detection voltage $E_{c2}$, and performs the multiplying and accumulating operation for each of the sampled detection voltages in order to remove one of the two excitation signal components contained in the composite signal, whereby the first sin phase amplitude $S_{s1}$, the first cos phase amplitude $S_{c1}$, the second sin phase amplitude $S_{s2}$, and the second cos phase amplitude $S_{c2}$ are calculated. Namely, the torque computation section 32 filters, through the multiplying and accumulating operation, the composite signal containing two excitation signal components in order to extract a desired signal component. Thus, the amplitudes $S_{s1}$, $S_{c1}$, $S_{s2}$, and $S_{c2}$. are calculated. Furthermore, by means of calculating the arctangent function by use of these amplitudes $S_{s1}$, $S_{c1}$, $S_{s2}$, and $S_{c2}$, the torque computation section 32 calculates the rotational angles $\theta_1$ and $\theta_2$.

The torque computation section 32 calculates a steering torque Tr from the calculated rotational angles $\theta_1$ and $\theta_2$ in accordance with the following equation (24).

$$Tr = Kb \cdot (\theta_1 - \theta_2) \tag{24}$$

Here, Kb is a proportional constant determined in accordance with the twisting characteristic of the torsion bar 12a, and is stored in the microcomputer in advance.

Next, there will be described a method of calculating the rotational angles $\theta_1$ and $\theta_2$ at the time of breakage of one of the detection lines 212b, 213b, 222b, and 223b which electrically connect the resolver unit 100 and the assist ECU 50. Such wire breakage occurs because of breakage of a wiring harness or connection failure of connectors which connect the wiring harness to the assist ECU 50 and the resolver unit 100. Accordingly, here, wire breakage is assumed not to occur in the detection lines 212a, 213a, 222a, and 223a within the resolver unit 100.

Figure 5:
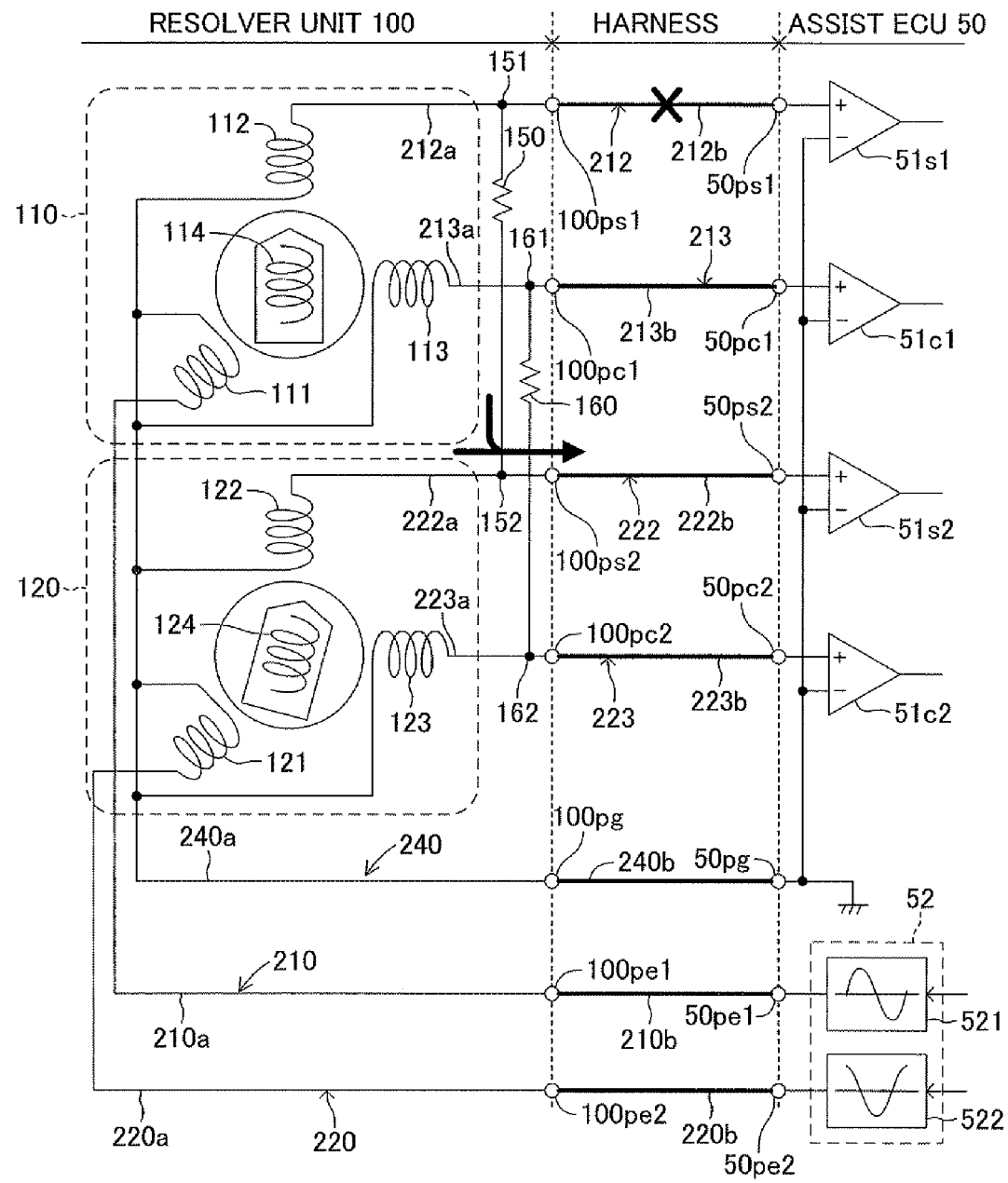
FIG. 5 is a diagram showing the flow of a detection signal in the case where an external first sin phase detection line is broken.

First, the case where the external first sin phase detection line 212b is broken will be described. For example, as shown in FIG. 5, when the external first sin phase detection line 212b is broken, the first sin phase detection signal is not input to the first sin phase signal input port 50ps1 of the assist ECU 50. However, the second sin phase detection signal input to the second sin phase signal input port 50ps2 contains the AC voltage signal (first excitation signal ($A_1 \sin(\omega t)$) component) output from the first sin phase detection coil 112 in addition to the AC voltage signal (second excitation signal ($A_2 \cos(\omega t)$) component) output from the second sin phase detection coil 122. Accordingly, the AC voltage signal component output from the first sin phase detection coil 112 can be extracted by use of the second sin phase detection signal. In this case, by means of performing the multiplying and accumulating operation for the second sin phase detection voltage $E_{s2}$ with $\sin(\omega t + \phi)$, the first sin phase amplitude $S_{s1}$ which is proportional to the sin value of the rotational angle $\theta_1$ can be calculated as shown by the following equation (25).

$$E_{s2} = \tag{25}$$
$$\frac{\alpha}{3}(A_1\sin(k\theta_1)\sin(\omega t + \phi) + 2A_2\sin(k\theta_2)\cos(\omega t + \phi))\xrightarrow{\Sigma E_{s2} \cdot \sin(\omega t + \phi)}$$
$$S_{s1} = \frac{N\alpha}{6}A_1\sin(k\theta_1)$$

The first sin phase amplitude $S_{s1}$ calculated as described above becomes smaller than that before the wire breakage due to the ratio of voltage division by the electrical resistance. However, by means of multiplying the first sin phase amplitude $S_{s1}$ by a correction value m stored in advance, the rotational angle $\theta_1$ can be calculated by the following equation (26).

$$\theta_1 = \frac{1}{k}\tan^{-1}\frac{\sin(k\theta_1)}{\cos(k\theta_1)} = \frac{1}{k}\tan^{-1}\frac{m \cdot S_{s1}}{S_{c1}} \tag{26}$$

In the equation given above, the denominator $S_{c1}$ is a value obtained by performing the multiplying and accumulating operation for the first cos phase detection voltage $E_{c1}$ with $\sin(\omega t + \phi)$ as described above. The correction value m can be calculated from the voltage division ratio, and is represented by the following equation (27).

$$m = 1 + \frac{R_0}{R_a} \tag{27}$$

Similarly, when the external first cos phase detection line 213b is broken, the first cos phase amplitude $S_{c1}$ which is proportional to the cos value of the rotational angle $\theta_1$ can be obtained by performing the multiplying and accumulating operation for the second cos phase detection voltage $E_{c2}$ with $\sin(\omega t + \phi)$ as shown by the following equation (28).

$$E_{c2} = \tag{28}$$
$$\frac{\alpha}{3}(A_1\cos(k\theta_1)\sin(\omega t + \phi) + 2A_2\cos(k\theta_2)\cos(\omega t + \phi))\xrightarrow{\Sigma E_{c2} \cdot \sin(\omega t + \phi)}$$
$$S_{c1} = \frac{N\alpha}{6}A_1\cos(k\theta_1)$$

Accordingly, the rotational angle $\theta_1$ can be calculated from the following equation (29).

$$\theta_1 = \frac{1}{k}\tan^{-1}\frac{\sin(k\theta_1)}{\cos(k\theta_1)} = \frac{1}{k}\tan^{-1}\frac{S_{s1}}{m \cdot S_{c1}} \tag{29}$$

Similarly, when the external second sin phase detection line 222b is broken, the second sin phase amplitude $S_{s2}$ which is proportional to the sin value of the rotational angle $\theta_2$ can be obtained by performing the multiplying and accumulating operation for the first sin phase detection voltage $E_{s1}$ with $\cos(\omega t+\phi)$ as shown by the following equation (30).

$$E_{s1} = \frac{\alpha}{3}(2A_1\sin(k\ \theta_1)\sin(\omega t + \phi) + \qquad (30)$$
$$A_2\sin(k\ \theta_2)\cos(\omega t + \phi)) \xrightarrow{\Sigma E_{s1}\cdot\cos(\omega t+\phi)}$$
$$S_{s2} = \frac{N\alpha}{6}A_2\sin(k\ \theta_2)$$

Accordingly, the rotational angle $\theta_2$ can be calculated from the following equation (31).

$$\theta_2 = \frac{1}{k}\tan^{-1}\frac{\sin(k\theta_2)}{\cos(k\theta_2)} = \frac{1}{k}\tan^{-1}\frac{m\cdot S_{s2}}{S_{c2}} \qquad (31)$$

Similarly, when the external second cos phase detection line 223b is broken, the second cos phase amplitude $S_{c2}$ which is proportional to the cos value of the rotational angle $\theta_2$ can be obtained by performing the multiplying and accumulating operation for the first cos phase detection voltage $E_{c1}$ with $\cos(\omega t+\phi)$ as shown by the following equation (32).

$$E_{c1} = \frac{\alpha}{3}(2A_1\cos(k\ \theta_1)\sin(\omega t + \phi) + \qquad (32)$$
$$A_2\cos(k\ \theta_2)\cos(\omega t + \phi)) \xrightarrow{\Sigma E_{c1}\cdot\cos(\omega t+\phi)}$$
$$S_{c2} = \frac{N\alpha}{6}A_2\cos(k\ \theta_2)$$

Accordingly, the rotational angle $\theta_2$ can be calculated from the following equation (33).

$$\theta_2 = \frac{1}{k}\tan^{-1}\frac{\sin(k\theta_2)}{\cos(k\theta_2)} = \frac{1}{k}\tan^{-1}\frac{S_{s2}}{m\cdot S_{c2}} \qquad (33)$$

As described above, when one of the detection lines 212b, 213b, 222b, and 223b is broken, the torque computation section 32 calculates the amplitude on the broken detection line side from the detection signal output from the detection line which is connected to the broken detection line via the inter-coil resistor 150 or 160. That is, when either one of the detection lines connected via the inter-coil resistor 150 or 160 is broken, the torque computation section 32 separately extracts the first excitation signal ($A_1 \sin(\omega t)$) component and the second excitation signal ($A_2 \cos(\omega t)$) component from the detection line which is not broken, and calculates their amplitudes. Thus, even when one of the detection lines 212b, 213b, 222b, and 223b is broken, the torque computation section 32 can calculate the rotational angles $\theta_1$ and $\theta_2$, and finally calculate the steering torque Tr therefrom. Hereinafter, the detection lines connected together via the inter-coil resistor 150 or 160 will be referred to as paired detection lines.

By means of using the above-described method, even in the case where two detection lines are broken, the torque computation section 32 can calculate the rotational angles $\theta_1$ and $\theta_2$ if the broken detection lines are not paired lines. That is, in the example shown in FIG. 2, in the case where both of the detection lines 212b and 213b are broken or in the case where both of the detection lines 222b and 223b are broken, the torque computation section 32 can calculate the rotational angle $\theta_1$ and $\theta_2$ from the two detection lines which are not broken.

In the present embodiment, the first sin phase detection line 212 and the second sin phase detection line 222 are connected together via the inter-coil resistor 150, and the first cos phase detection line 213 and the second cos phase detection line 223 are connected together via the inter-coil resistor 160. However, in place of such a configuration, there may be employed a configuration in which the first sin phase detection line 212 and the second cos phase detection line 223 are connected together via the inter-coil resistor 150, and the first cos phase detection line 213 and the second sin phase detection line 222 are connected via the inter-coil resistor 160. In other words, the effect of the present invention can be attained by connecting either one of the two detection lines of the first resolver 110 and either one of the two detection lines of the second resolver via the inter-coil resistor 150, and connecting the other detection line of the first resolver 110 and the other detection line of the second resolver via the inter-coil resistor 160.

Figure 6:
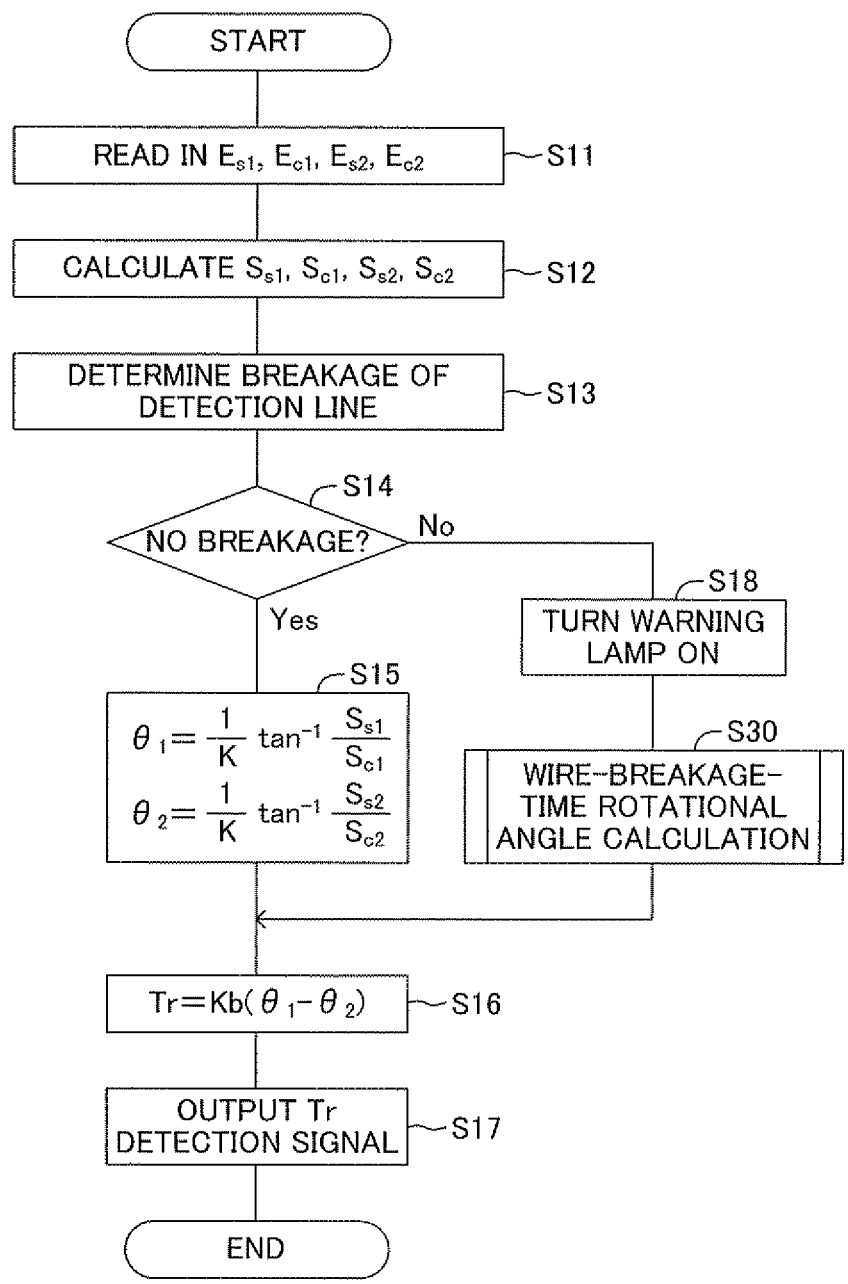
FIG. 6 is a flowchart showing a steering torque detection routine.

Next, steering torque detection processing executed by the torque computation section 32 will be described. FIG. 6 is a flowchart showing a steering torque detection routine. The steering torque detection routine is stored in the ROM of the microprocessor as a control program. The steering torque detection routine is repeatedly executed at predetermined short intervals during a period during which an ignition key is in an ON state. Notably, simultaneously with the start of the steering torque detection routine, the torque computation section 32 operates the coil drive circuit 52 so as to start the output of the first excitation signal from the first excitation signal output port 50pe1 and the output of the second excitation signal from the second excitation signal output port 50pe2.

In step S11, the torque computation section 32 reads the detection voltages $E_{s1}$, $E_{c1}$, $E_{s2}$, and $E_{c2}$. In a sampling routine different from the steering torque detection routine, the torque computation section 32 samples the instantaneous values of the detection voltages $E_{s1}$, $E_{c1}$, $E_{s2}$, $E_{c2}$ at sampling intervals determined such that the sampling is performed three or more times in each period of the excitation signal. The processing of step S13 is processing of reading the detection voltages $E_{s1}$, $E_{c1}$, $E_{s2}$, and $E_{c2}$ sampled in the sampling routine within the single period (or a plurality of periods). Subsequently, in step S12, the torque computation section 32 calculates the amplitudes $S_{s1}$, $S_{c1}$, $S_{s2}$, and $S_{c2}$ by performing the multiplying and accumulating operation for the detection voltages $E_{s1}$ and $E_{c1}$ with $\sin(\omega t+\phi)$ as described above, and performing the multiplying and accumulating operation for the detection voltages $E_{s2}$ and $E_{c2}$ with $\cos(\omega t+\phi)$.

Subsequently, in step S13, the torque computation section 32 determines whether or not each of the detection lines 212b, 213b, 222b, and 223b is broken. In the present embodiment, when the value $(S_{s1}^2+S_{c1}^2)$ of the sum of squares of the amplitudes $S_{s1}$ and $S_{c1}$ is less than a reference value Se, the torque computation section 32 determines that at least either one of the external first sin phase detection line 212b and the external first cos phase detection line 213b is broken. When the value $(S_{s2}^2+S_{c2}^2)$ of the sum of squares of the amplitudes $S_{s2}$ and $S_{c2}$ is less than the reference value Se, the torque computation section 32 determines that at least either one of the external second sin phase detection line 222b and the external second cos phase detection line 223b is broken.

When none of the detection lines 212b, 213b, 222b, and 223b is broken, the following equation (34) holds.

$$(S_{s1}^2+S_{c1}^2)=(S_{s2}^2+S_{c2}^2)=(N\alpha A/3)^2=Ao^2 \quad (34)$$

Notably, the resistance $R_a$ of each of the detection coils 112, 113, 122, and 123 is set such that it is equal to the resistance $R_0$ of each of the inter-coil resistors 150 and 160 ($R_a=R_0$). In addition, the amplitude $A_1$ of the first excitation voltage $V_1$ and the amplitude $A_2$ of the second excitation voltage $V_2$ are set to the same value A ($A_1=A_2=A$).

In the case where the external first sin phase detection line 212b or the external first cos phase detection line 213b is broken, $(S_{s2}^2+S_{c2}^2)=Ao^2$ and $(S_{s1}^2+S_{c1}^2) \leq Ao^2$ hold. In the case where the external second sin phase detection line 222b or the external second cos phase detection line 223b is broken, $(S_{s1}^2+S_{c1}^2)=Ao2$ and $(S_{s2}^2+S_{c2}^2) \leq Ao^2$ hold. The reference value Se is a value set in advance in order to determine whether or not each of the detection lines 212b, 213b, 222b, and 223b is broken by use of the above-described properties.

When the value $(S_{s1}^2+S_{c1}^2)$ is less than the reference value Se or when the value $(S_{s2}^2+S_{c2}^2)$ is less than the reference value Se, the torque computation section 32 specifies the broken detection line on the basis of the detection voltages $E_{s1}$, $E_{c1}$, $E_{s2}$, and $E_{c2}$. In the case where the value $(S_{s1}^2+S_{c1}^2)$ is less than the reference value Se, the torque computation section 32 determines that the external first sin phase detection line 212b is broken if the detection voltage $E_{s1}$ is maintained at 0 volt; or determines that the external first cos phase detection line 213b is broken if the detection voltage $E_{c1}$ is maintained at 0 volt. Meanwhile, in the case where the value $(S_{s2}^2+S_{c2}^2)$ is less than the reference value Se, the torque computation section 32 determines that the external second sin phase detection line 222b is broken if the detection voltage $E_{s2}$ is maintained at 0 volt; or determines that the external second cos phase detection line 223b is broken if the detection voltage $E_{c2}$ is maintained at 0 volt. This processing of step S13 corresponds to wire breakage detection means which specifies (detects) a broken detection line among the four detection lines.

In the subsequent step S14, the torque computation section 32 determines whether or not breakage of the detection line 212b, 213b, 222b, or 223b has been detected. If no wire breakage has been detected, the torque computation section 32 proceeds to step S15. If wire breakage has been detected, the torque computation section 32 proceeds to step S18.

In step S15, the torque computation section 32 substitutes the amplitudes $S_{s1}$, $S_{c1}$, $S_{s2}$, and $S_{c2}$ into the above-described equations (22) and (23) so as to calculate the rotational angle $\theta_1$ of the first resolver 110 and the rotational angle $\theta_2$ of the second resolver 120. Next, in step S16, the torque computation section 32 calculates the steering torque Tr through use of the above-described equation (24).

Subsequently, in step S17, the torque computation section 32 outputs to the assist computation section 31 the steering torque detection signal representing the calculated steering torque Tr. The assist computation section 31 calculates a target assist torque from this steering torque Tr, and outputs a PWM control signal to the motor drive circuit 40 such that a target current corresponding to the target assist torque flows through the electric motor 21. As a result, the electric motor 21 generates a proper steering assist torque.

Meanwhile, when breakage of one of detection lines 212b, 213b, 222b, and 223b is detected (S14: No), in step S18, the torque computation section 32 turns on a warning lamp 65 of the vehicle, which allows the driver to notice occurrence of an anomaly.

Figure 7:
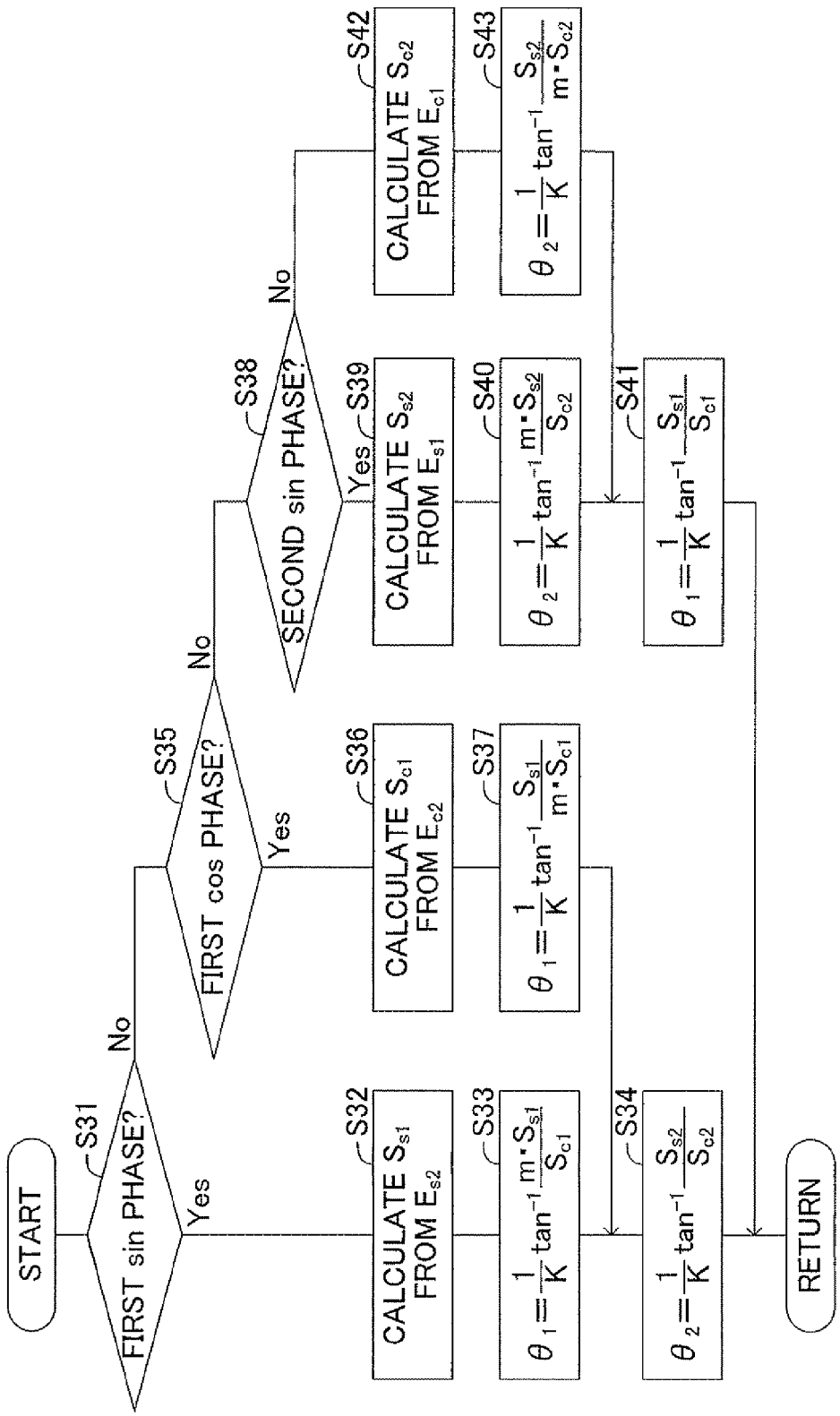
FIG. 7 is a flowchart showing a wire-breakage-time rotational angle calculation routine.

Subsequently, in step S30, the torque computation section 32 performs wire-breakage-time rotational angle calculation processing. FIG. 7 is a flowchart showing a wire-breakage-time rotational angle calculation routine (subroutine) incorporated as the step S30 of the steering torque detection routine shown in FIG. 6. When this routine starts, in step S31, the torque computation section 32 determines whether or not the broken detection line is the external first sin phase detection line 212b. In the case where the torque computation section 32 determines that the broken detection line is the external first sin phase detection line 212b, in step S32, the torque computation section 32 performs the multiplying and accumulating operation for the second sin phase detection voltage $E_{s2}$ with $\sin(\omega t+\phi)$, to thereby calculate the first sin phase amplitude $S_{s1}$ represented by the above-mentioned equation (25). Subsequently, in step S33, the torque computation section 32 substitutes the amplitude $S_{c1}$ calculated in step S12 and the amplitude $S_{s1}$ calculated in step S32 into the above-mentioned equation (26), to thereby calculate the rotational angle $\theta_1$. Subsequently, in step S34, the torque computation section 32 substitutes the amplitudes $S_{s2}$ and $S_{c2}$ calculated in step S12 into the above-mentioned equation (23) in order to calculate the rotational angle $\theta_2$, and exits the wire-breakage-time rotational angle calculation routine, thereby proceeding to step S16 of the steering torque detection routine.

In the case where the torque computation section 32 determines in step S35 that the broken detection line is the external first cos phase detection line 213b, in step S36, the torque computation section 32 performs the multiplying and accumulating operation for the second cos phase detection voltage $E_{c2}$ with $\sin(\omega t+\phi)$, to thereby calculate the first cos phase amplitude $S_{c1}$ represented by the above-mentioned equation (28). Subsequently, in step S37, the torque computation section 32 substitutes the amplitude $S_{s1}$ calculated in step S12 and the amplitude $S_{c1}$ calculated in step S36 into the above-mentioned equation (29), to thereby calculate the rotational angle $\theta_1$. Subsequently, in step S34, the torque computation section 32 calculates the rotational angle $\theta_2$ as described above.

In the case where the torque computation section 32 determines in step S38 that the broken detection line is the external second sin phase detection line 222b, in step S39, the torque computation section 32 performs the multiplying and accumulating operation for the first sin phase detection voltage $E_{s1}$ with $\cos(\omega t+\phi)$, to thereby calculate the second sin phase amplitude $S_{s2}$ represented by the above-mentioned equation (30). Subsequently, in step S40, the torque computation section 32 substitutes the amplitude $S_{c2}$ calculated in step S12 and the amplitude $S_{s2}$ calculated in step S39 into the above-mentioned equation (31), to thereby calculate the rotational angle $\theta_2$. Subsequently, in step S41, the torque computation section 32 substitutes the amplitudes $S_{s1}$ and $S_{c1}$ calculated in step S12 into the above-mentioned equation (22) in order to calculate the rotational angle $\theta_1$, and exits the wire-breakage-time rotational angle calculation routine, thereby proceeding to step S16 of the steering torque detection routine.

In the case where the torque computation section 32 makes a "No" determination in step S38; that is, in the case where the torque computation section 32 determines that the broken line is the external second cos phase detection line 223b, in step S42, the torque computation section 32 perform the multiplying and accumulating operation for the first cos phase detection voltage $E_{c1}$ with $\cos(\omega t+\phi)$, to thereby calculate the second cos phase amplitude $S_{c2}$ represented by the above-mentioned equation (32). Subsequently, in step S43, the torque computation section 32 substitutes the amplitude $S_{s2}$ calculated in step S12 and the amplitude $S_{c2}$ calculated in step S42 into the above-mentioned equation (33), to thereby calculate the rotational angle $\theta_2$. Subsequently, in step S41, the torque computation section 32 calculates the rotational angle $\theta_1$ in the above-described manner, and proceeds to step S16 of the steering torque detection routine.

In step S17, the torque computation section 32 outputs the steering torque detection signal to the assist computation section 31, and ends the steering torque detection routine. Subsequently, the torque computation section 32 repeats the steering torque detection routine at predetermined short intervals.

Notably, in this steering torque detection routine, when breakage of two or more detection lines among the detection lines 212b, 213b, 222b, and 223b is detected in step S13, the torque computation section 32 outputs a torque detection impossible signal to the assist computation section 31 without calculating the rotational angle. As a result, the assist computation section 31 stops the steering assist.

However, even when wire breakage has been detected in two detection lines, the torque computation section 32 can calculate the rotational angles depending on the combination of the two detection lines. Accordingly, the torque computation section 32 may first determine whether or not calculation of the rotation angle is possible, and then calculate the rotational angles if calculation thereof is possible. That is, in the case where the two broken detection lines are paired lines (connected together via an inter-coil resistor), the torque computation section 32 cannot calculate the rotational angle. Otherwise, the torque computation section 32 can calculate the rotational angle.

Figure 8:
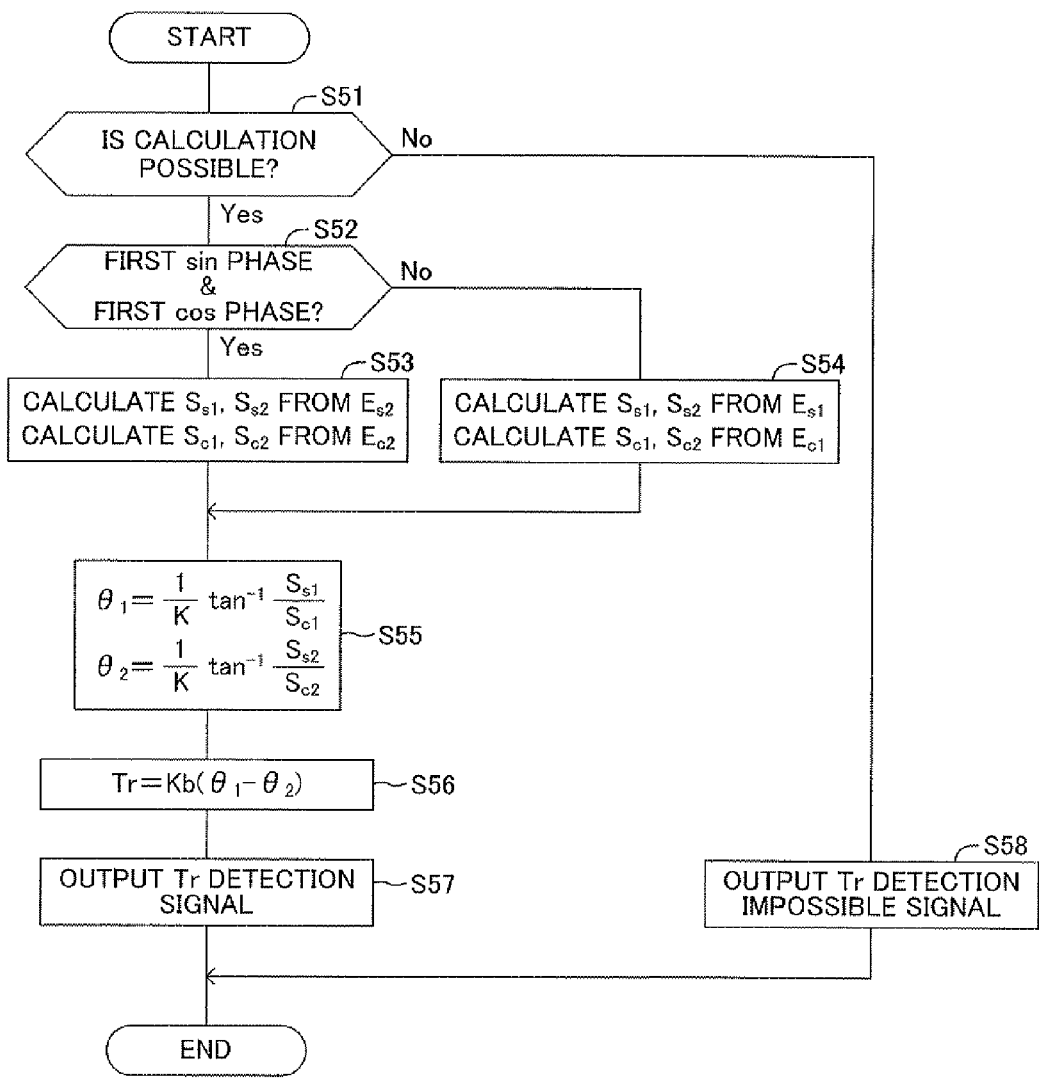
FIG. 8 is a flowchart showing a two-wire-breakage-time rotational angle calculation routine.

Next, there will be described processing performed in the case where the torque computation section 32 has determined that two detection lines are broken. FIG. 8 is a flowchart showing a two-wire-breakage-time rotational angle calculation routine which, for example, is started when breakage of two detection lines is detected in step S13 of the steering torque detection routine of FIG. 6. When this routine starts, in step S51, the torque computation section 32 determines whether or not calculation of the rotational angles is possible on the basis of the combination of the detection lines in which wire breakage has been detected. In the case where both of the detection lines 212b and 222b are broken, or in the case where both of the detection lines 213b and 223b are broken, calculation of the rotational angles is impossible. In the case where both of the detection lines 212b and 213b are broken, or in the case where both of the detection lines 222b and 223b are broken, calculation of the rotational angles is possible.

After determining that calculation of the rotational angles is possible (S51: Yes), in step S52 subsequent thereto, the torque computation section 32 determines whether or not the broken detection lines are the external first sin phase detection line 212b and the external first cos phase detection line 213b.

In the case where the torque computation section 32 has determined that the broken detection lines are the external first sin phase detection line 212b and the external first cos phase detection line 213b (S52: Yes), instep S53, the torque computation section 32 performs the multiplying and accumulating operation for the second sin phase detection voltage $E_{s2}$ with $\sin(\omega t+\phi)$ in order to calculate the first sin phase amplitude $S_{s1}$; and performs the multiplying and accumulating operation for the second sin phase detection voltage $E_{s2}$ with $\cos(\omega t+\phi)$ in order to calculate the second sin phase amplitude $S_{s2}$. Moreover, the torque computation section 32 performs the multiplying and accumulating operation for the second cos phase detection voltage $E_{c2}$ with $\sin(\omega t+\phi)$ in order to calculate the first cos phase amplitude $S_{c1}$; and performs the multiplying and accumulating operation for the second cos phase detection voltage $E_{c2}$ with $\cos(\omega t+\phi)$ in order to calculate the second cos phase amplitude $S_{c2}$.

Meanwhile, in the case where the torque computation section 32 has determined that the broken detection lines are the external second sin phase detection line 222b and the external second cos phase detection line 223b (S52: No), in step S54, the torque computation section 32 performs the multiplying and accumulating operation for the first sin phase detection voltage $E_{s1}$ with $\sin(\omega t+\phi)$ in order to calculate the first sin phase amplitude $S_{s1}$; and performs the multiplying and accumulating operation for the first sin phase detection voltage $E_{s1}$ with $\cos(\omega t+\phi)$ in order to calculate the second sin phase amplitude $S_{s2}$. Moreover, the torque computation section 32 performs the multiplying and accumulating operation for the first cos phase detection voltage $E_{c1}$ with $\sin(\omega t+\phi)$ in order to calculate the first cos phase amplitude $S_{c1}$; and performs the multiplying and accumulating operation for the first cos phase detection voltage $E_{c1}$ with $\cos(\omega t+\phi)$ in order to calculate the second cos phase amplitude $S_{c2}$.

After calculating the amplitudes $S_{s1}$, $S_{c1}$, $S_{s2}$, and $S_{c2}$ in step S53 or S54, in step S55 subsequent thereto, the torque computation section 32 substitutes the amplitudes $S_{s1}$ and $S_{c1}$ into the above-mentioned equation (22) in order to calculate the rotational angle $\theta_1$; and substitutes the amplitudes $S_{s2}$ and $S_{c2}$ into the above-mentioned equation (23) in order to calculate the rotational angle $\theta_2$. Subsequently, in step S56, the torque computation section 32 calculates the steering torque Tr by use of the above-mentioned equation (24), and in step S57, outputs to the assist computation section 31 the steering torque detection signal representing the calculated steering torque Tr.

In contrast, in the case where the torque computation section 32 determines in step S51 that calculation of the rotation angle is impossible (S51: No), in step S58, the torque computation section 32 outputs the torque detection impossible signal to the assist computation section 31. As a result, the assist computation section 31 stops the steering assist.

In the torque detection device of the present embodiment described above, the output section of the detection coil 112 which is one of the detection coils of the first resolver 110 and the output section of the detection coil 122 which is one of the detection coils of the second resolver 120 are connected together via the inter-coil resister 150; and the output section of the detection coil 113 which is the other detection coil of the first resolver 110 and the output section of the detection coil 123 which is the other detection coil of the second resolver 120 are connected together via the inter-coil resister 160. In addition, the first excitation line 210 for supplying an excitation signal to the first resolver 110 and the second excitation line 220 for supplying an excitation signal to the second resolver 120 are provided independently of each other; and the sin wave signal for excitation is supplied to the first excitation line 210, and the cos wave signal for excitation is supplied to the second excitation line 220. As a result, a composite signal containing voltage signals generated by two detection coils is output from each of the detection lines 212, 213, 222, and 223. Accordingly, even if one detection line is broken, the amplitude of the detection coil connected directly to the broken detection line can be calculated by separately extracting the excitation sin wave signal component and the excitation cos wave signal component from the composite signal output from the detection line which is paired with the broken detection line.

Thus, according to the torque detection device of the present embodiment, even when one of the detection lines is broken, it is possible to calculate the rotational angles of the first resolver 110 and the second resolver 120, and detect the steering torque. Therefore, the electric power steering apparatus can continue the steering assist. Accordingly, the reliability of the electric power steering apparatus is improved.

In addition, redundancy for wire breakage can be improved in the case where the torque detection device is configured such that, even when two detection lines are broken, it detects the steering torque in a situation where the two rotational angles can be calculated, The reliability of the conventional torque detection device in terms of wire breakage can be improved by employing, for example, a redundant configuration in which each of the detection lines 212*b*, 213*b*, 222*b*, and 223*b* is composed of two lines. However, in this case, the number of the detection lines increases to a total of 8. In contrast, the torque detection device of the present embodiment ensures the reliability in terms of wire breakage without increasing the number of the detection lines, thereby preventing the wiring harness configuration from becoming complex. Moreover, since the structures of the resolvers 110 and 120 are almost the same as those of the conventional resolvers, the torque detection device of the present embodiment can be readily implemented.

Next, several modifications will be described. Notably, only the configurations which are different from the configuration of the above-described embodiment will be described, and descriptions of the configurations which are in common with the configuration of the above-described embodiment will be omitted. Hereinafter, the above-described embodiment will be referred to as a basic embodiment. First, a first modification will be described hereunder.

<First Modification>

In the first modification, the assembly phases of the first resolver 110 and the second resolver 120 of the resolver unit 100 of the above-described basic embodiment are shifted from each other by 90° in electrical angle. Generally, when resolvers are assembled to the opposite ends of the torsion bar, they are assembled in the same phase. That is, these resolvers are assembled such that, when the sin phase detection coils (or the cos phase detection coils) of these resolvers are viewed axially in a state in which the torsion bar is not twisted, they are aligned with each other.

Figure 9:
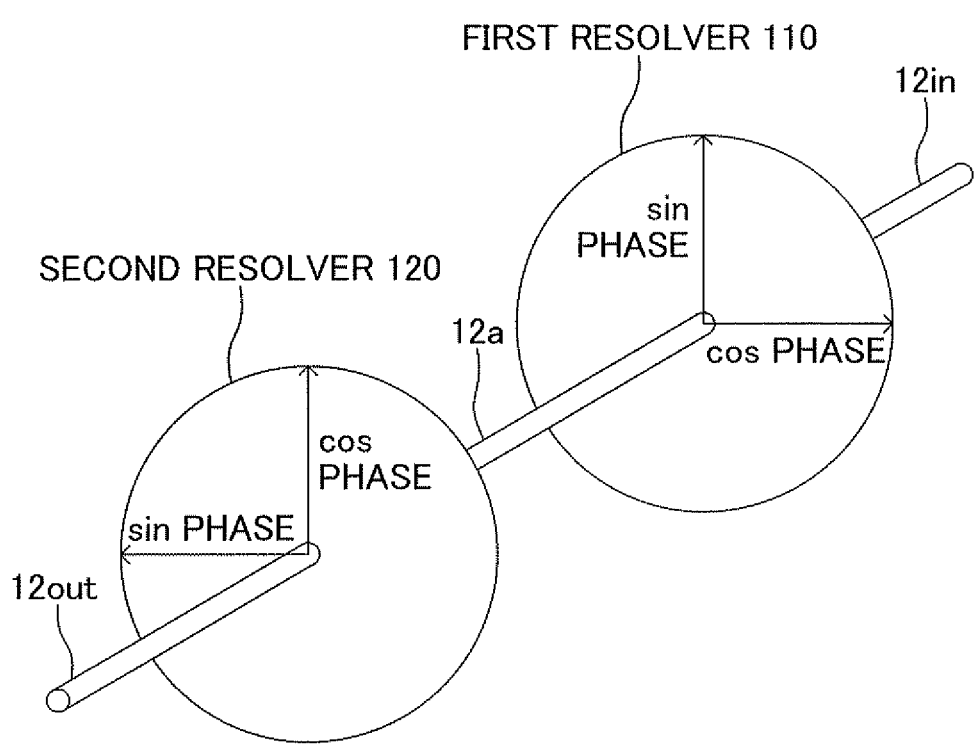
FIG. 9 is an explanatory view showing the assembly of a first resolver and a second resolver (a first modification).

In contrast, as shown in FIG. 9, the resolver unit 100 of the first modification is assembled such that the relative positions of the first resolver 110 and the second resolver 120 are shifted in phase from each other by 90° in electrical angle (90°/k in mechanical angle). By virtue of this, the maximum voltages of the detection signals input to the amplifiers 51*s*1, 51*c*1, 51*s*2, and 51*c*2 of the assist ECU 50 become smaller and the resolution of A/D conversion performed in the assist ECU 50 can be improved as compared with the case where the first resolver 110 and the second resolver 120 are assembled in the same phase. That is, the voltage per resolution unit can be decreased by increasing the gains of the amplifiers 51*s*1, 51*c*1, 51*s*2, and 51*c*2. As a result, high-accuracy detection can be performed.

Hereunder, there will be described the reason why the maximum voltages of the detection signals input to the amplifiers 51*s*1, 51*c*1, 51*s*2, and 51*c*2 of the assist ECU 50 decrease when the assembly phases of the first resolver 110 and the second resolver 120 are shifted from each other by 90°.

For example, the first sin phase detection voltage $E_{s1}$ can be converted as shown by the following equation (35).

$$E_{s1} = \frac{\alpha}{3}(2A_1\sin(k\theta_1)\sin(\omega t + \phi) + A_2\sin(k\theta_2)\cos(\omega t + \phi)) \quad (35)$$

$$= \sqrt{\left(\frac{2}{3}\alpha A_1\sin(k\theta_1)\right)^2 + \left(\frac{1}{3}\alpha A_2\sin(k\theta_2)\right)^2} \cdot \sin(\omega t + \phi_c)$$

In the above equation, $\phi_c$ is a phase determined by $\theta_1$, $\theta_2$, etc.

Accordingly, the maximum voltage input to the assist ECU 50 can be represented by the following equation (36). Notably, $A_1 = A_2 = A$.

$$\max(E_{s1}) = \sqrt{\left(\frac{2}{3}\alpha A_1\sin(k\theta_1)\right)^2 + \left(\frac{1}{3}\alpha A_2\sin(k\theta_2)\right)^2} \quad (36)$$

$$= \frac{\alpha A}{3}\sqrt{(2\sin(k\theta_1))^2 + (\sin(k\theta_2))^2}$$

Here, the expression in the square root symbol will be denoted by X as shown by the following equation (37).

$$X = ((2\sin(k\theta_1))^2 + ((\sin(k\theta_2))^2 \quad (37)$$

X becomes the maximum value 5 (X=5) when $k\theta_1 = 90° \pm 180° \times N$ and $k\theta_2 = 90° \pm 180° \times N$. In contrast, X becomes the minimum value 0 (X=0) when $k\theta_1 = \pm 180° \times N$ and $k\theta_2 = \pm 180° \times N$ (N=0, 1, 2, 3 . . . ). In a $k\theta_2$-$k\theta_1$ coordinate system shown in FIG. 10, a black circle represents the angle at which X assumes the maximum value, and a white circle represents the angle at which X assumes the minimum value.

The torsion angles between the first resolver 110 and the second resolver 120 of the resolver unit 100 (the torsion angle of the torsion bar 12*a*) are restricted mechanically. Thus, the range within which $k\theta_1$ and $k\theta_2$ can change is limited. For example, when the first resolver 110 and the second resolver 120 are assembled in the same phase (the sin phase detection coils of the resolvers 110 and 120 are aligned with each other when viewed axially in a state in which the torsion bar 12*a* is not twisted), a restriction equation representing the range within which $k\theta_1$ and $k\theta_2$ can change can be expressed by the following restriction equation (38), where the maximum torsion angle of the torsion bar 12*a* is $\pm\theta d$ (mechanical angle).

$$|k\theta_1 - k\theta_2| \leq k\theta_d \quad (38)$$

Figure 10:
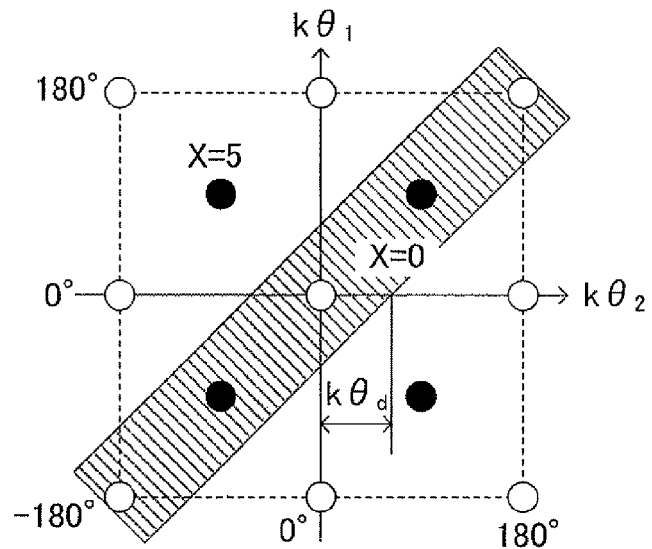
FIG. 10 is a graph showing a range within which the detection signal can change for the case where the assembly phases of the first resolver and the second resolver are rendered the same (the first modification).

In the graph shown in FIG. 10, the above-described restriction range is represented by a hatched elongated range. The inclination of this elongated range is 1, and the width thereof is constant. This range includes both a point (black circle) at which X becomes the maximum value and a point (white circle) at which X becomes the minimum value.

Next, there will be discussed the case where the assembly phases of the first resolver 110 and the second resolver 120 of the resolver unit 100 are shifted from each other by 90° in electrical angle (90°/k in mechanical angle). In this case, the restriction equation representing the range within which $k\theta_1$ and $k\theta_2$ can change can be expressed by the following equation (39).

$$|k\theta_1 - k\theta_2 + 90°| \leq k\theta_d \quad (39)$$

Figure 11:
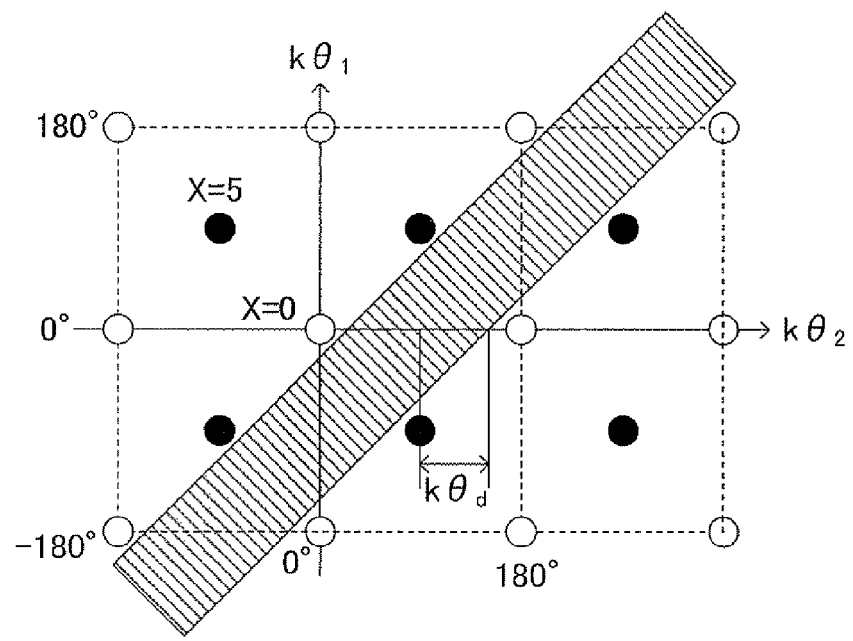
FIG. 11 is a graph showing a range within which the detection signal can change for the case where the assembly phases of the first resolver and the second resolver are shifted from each other by 90° (the first modification).

FIG. 11 shows the above-described restriction range in the $k\theta_2$-$k\theta_1$ coordinate system. As can be understood from this figure, the elongated range within which $k\theta_1$ and $k\theta_2$ can change does not contain the point (black circle) at which X becomes the maximum value. Accordingly, the maximum value of the detection voltage input to the assist ECU 50 can be rendered smaller as compared with the case where the first resolver 110 and the second resolver 120 are assembled in the same phase (FIG. 10). As a result, in the assist ECU 50, the resolution of the detection voltage can be improved, thereby ensuring high-accuracy detection.

Here, the phase shift angle between the first resolver 110 and the second resolver 120 (mechanical angle) at the time when the torsion bar 12*a* is at the neutral position is represented by θs. In such a case, the range within which the above-described maximum voltage suppression effect is attained is represented by the following equation (40) (N=0, 1, 2, 3 . . . ).

$$|k\theta_s - 90° + 180° \cdot N| < 90° - k\theta_d \quad (40)$$

For example, in an electric power steering apparatus in which the maximum torsion angle θd of the torsion bar 12a is limited to 50° (electrical angle), the maximum voltage suppression effect can be attained so long as the shift angle between the first resolver 110 and the second resolver 120 is set to 40° to 130° (electrical angle). The maximum voltage can be minimized when the shift angle is 90° (electrical angle). Therefore, in the first modification, the shift angle is set to 90° (electrical angle).

In the first modification, in addition to the maximum voltage suppression effect, there is attained an effect that failures (wire breakage and short circuit) in the detection lines 212b, 213b, 222b, and 223b can be detected more reliably. In the above-described basic embodiment, when the rotational angles of the first resolver 110 and the second resolver 120 are both 0°, neither the detection voltage $E_{s1}$ nor the detection voltage $E_{s2}$ is output. Accordingly, it takes time for the torque computation section 32 to determine whether or not any one of the detections line 212b, 213b, 222b, and 223b is faulty. That is, it is necessary for the torque computation section 32 to wait until either one of the detection voltages is obtained as a result of rotation of the steering shaft 12. In contrast, in the first modification, since the amplitudes of the detection voltages $E_{s1}$, $E_{c1}$, $E_{s2}$, and $E_{c2}$ do not become 0 volt, failure detection can be performed on the basis of the detection voltages $E_{s1}$, $E_{c1}$, $E_{s2}$, and $E_{c2}$ at all times.

Here, the minimum value of the detection voltage $E_{s1}$ which is known in the design phase of the torque detection device is denoted by Vmin. In such a case, if the detection voltage $E_{s1}$ maintained at its peak for a certain period of time is less than Vmin, the torque computation section 32 can determine that the detection line 212b, 213b, 222b, or 223b is faulty. The period of time during which the detection voltage $E_{s1}$ is maintained at its peak may be as long as the period of time which is required for failure detection.

<Second Modification>

Figure 12:
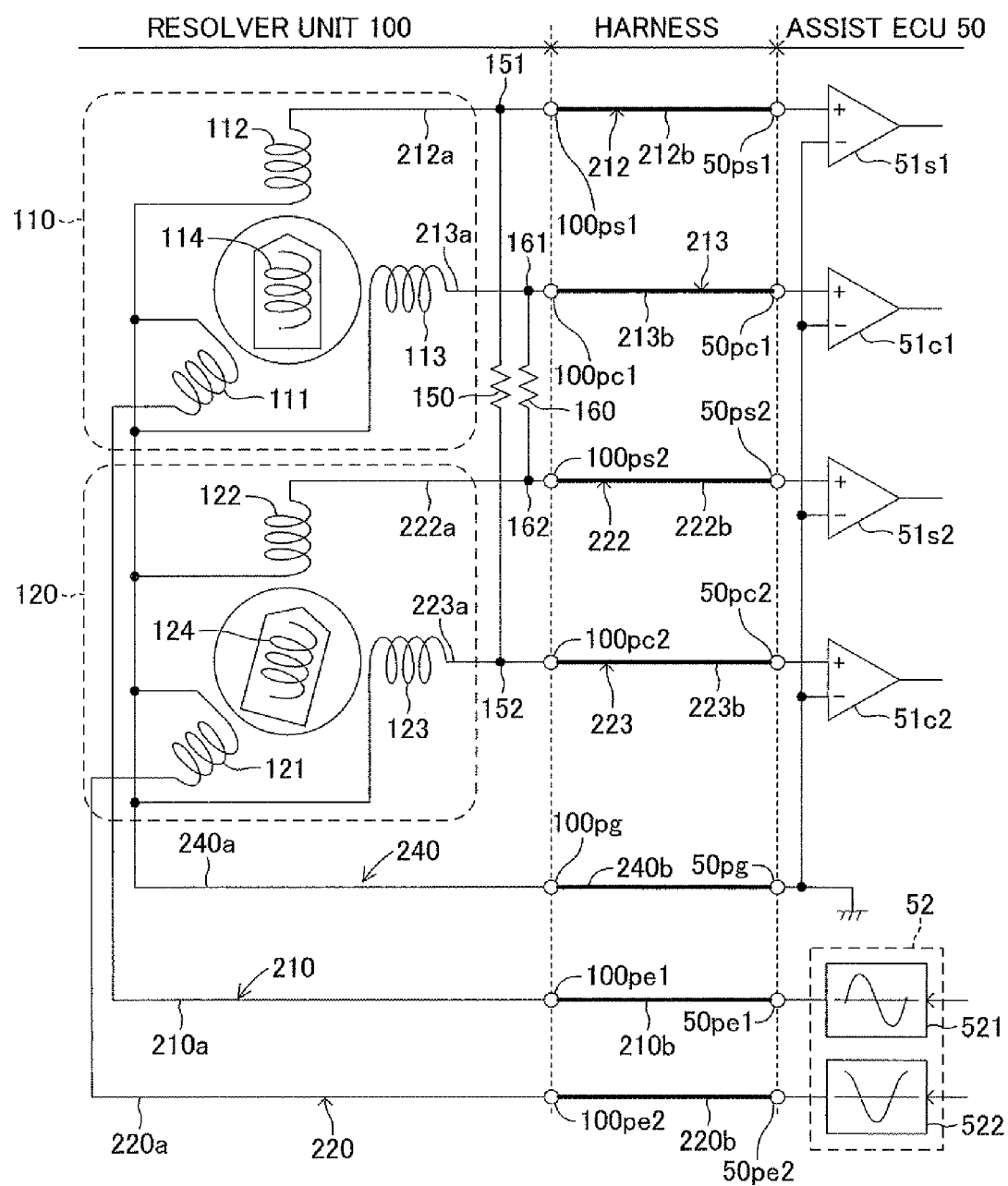
FIG. 12 is a schematic configurational diagram showing a resolver unit and the connection between the resolver unit and an assist ECU (a second modification).
Figure 13:
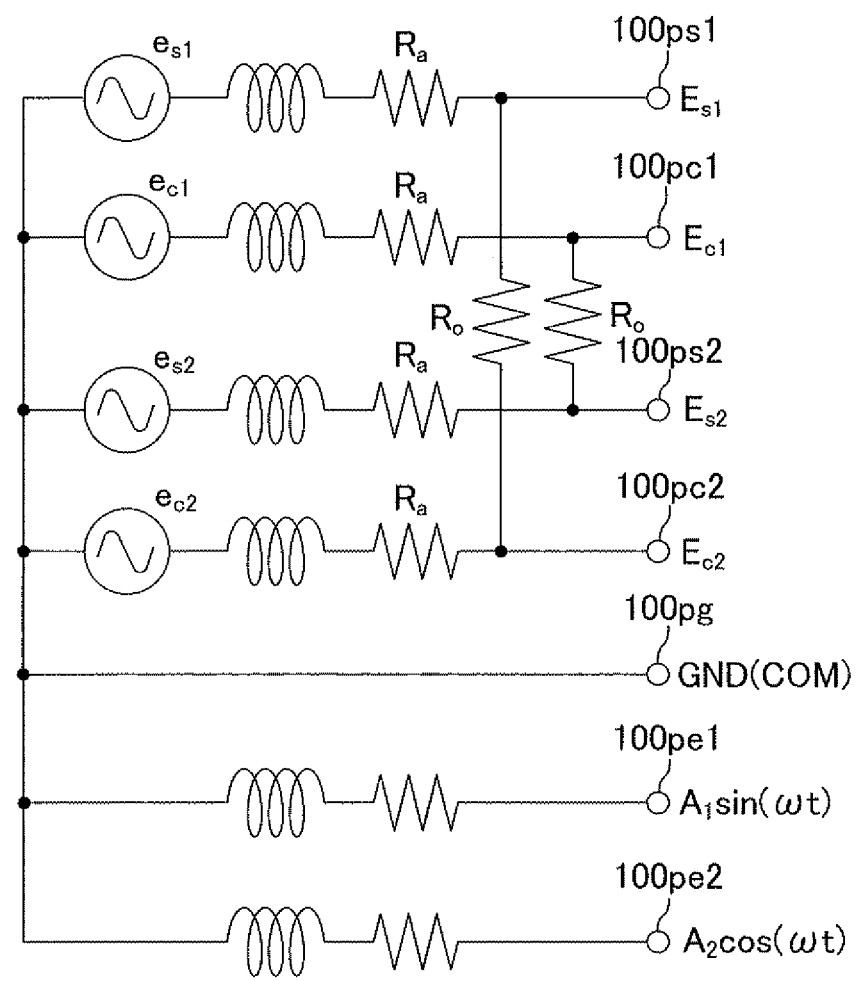
FIG. 13 is an electrical circuit diagram of the resolver unit (the second modification).

In the above-descried first modification, the first resolver 110 and the second resolver 120 are assembled with a phase shift of 90° provided therebetween. In the second modification, instead of using such a configuration, as shown in FIG. 12 and FIG. 13, the internal first sin phase detection line 212a and the internal second cos phase detection line 223a are electrically connected together via the inter-coil resistor 150, and the internal first cos phase detection line 213a and the internal second sin phase detection line 222a are electrically connected together via the inter-coil resistor 160. In this case, the first resolver 110 and the second resolver 120 are assembled in the same phase.

In the second modification, for example, the first sin phase detection voltage $E_{s1}$ can be converted as shown by the following equation (41).

$$E_{s1} = \frac{\alpha}{3}(2A_1 \sin(k\theta_1)\sin(\omega t + \phi) + A_2\cos(k\theta_2)\cos(\omega t + \phi)) \quad (41)$$

$$= \sqrt{\left(\frac{2}{3}\alpha A_1 \sin(k\theta_1)\right)^2 + \left(\frac{1}{3}\alpha A_2\cos(k\theta_2)\right)^2} \cdot \sin(\omega t + \phi_c)$$

Accordingly, the maximum voltage input to the assist ECU 50 can be represented by the following equation (42). Notably, $A_1 = A_2$.

$$\max(E_{s1}) = \sqrt{\left(\frac{2}{3}\alpha A_1 \sin(k\theta_1)\right)^2 + \left(\frac{1}{3}\alpha A_2\cos(k\theta_2)\right)^2} \quad (42)$$

$$= \frac{\alpha A}{3}\sqrt{(2\sin(k\theta_1))^2 + (\cos(k\theta_2))^2}$$

In this case, the maximum torsion angle of the torsion bar 12a is limited to 50° (electrical angle). Accordingly, the maximum value of X in the square root symbol ($=(2 \sin(k\theta_1))^2 (\cos(k\theta_2))^2$) becomes a value which is less than 5 (X<5). Accordingly, in the second modification as well, as in the first modification, the maximum value of the detection voltage input to the assist ECU 50 can be rendered smaller. As a result, in the assist ECU 50, the resolution of the detection voltage can be improved, thereby ensuring high-accuracy detection. Moreover, just like in the first modification, since the amplitudes of the detection voltages $E_{s1}$, $E_{c1}$, $E_{s2}$, and $E_{c2}$ do not become 0 volt, failures of the detection lines 212b, 213b, 222b, and 223b can always be detected from the detection voltages $E_{s1}$, $E_{c1}$, $E_{s2}$, and $E_{c2}$.

<Third Modification>

Figure 14:
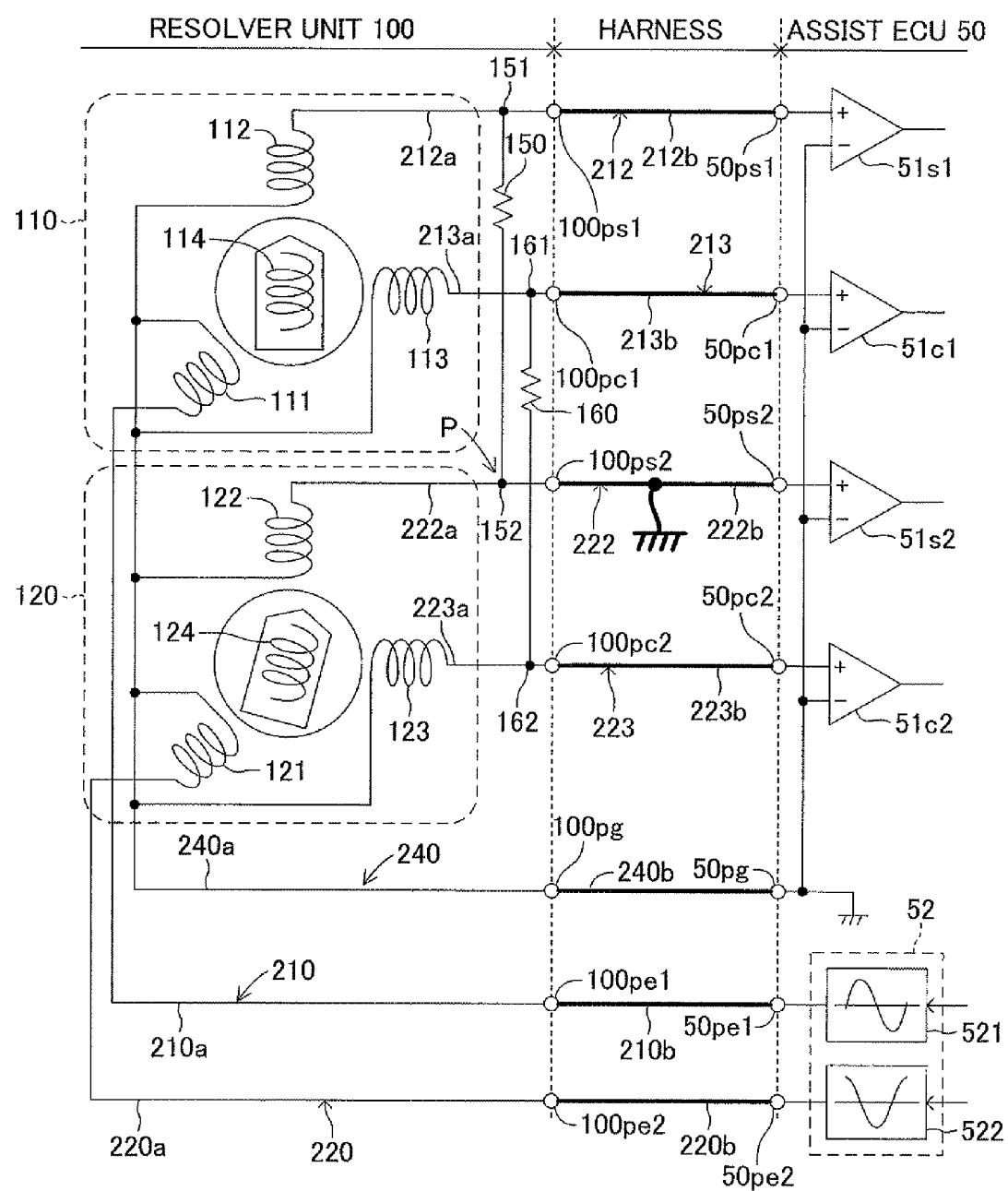
FIG. 14 is a diagram showing a state in which an external second sin phase detection line is grounded.

In the above-described basic embodiment, the torque detection device can cope with breakage of the detection line 212b, 213b, 222b, or 223b, but cannot cope with grounding of the detection lines 212b, 213b, 222b, and 223b (e.g., grounding caused by a short circuit between a detection line and the ground line 240 or grounding caused by a short circuit between a detection line and the casing). For examples, as shown in FIG. 14, in the case where the external second sin phase detection line 222b is grounded, the potential of a point P (a connection point 152 between the internal second sin phase detection line 222a and the inter-coil resistor 150) becomes 0 volt. As a result, the detection signal $E_{s1}$ input to the first sin phase signal input port 50ps1 of the assist ECU 50 contains only the voltage component associated with the first excitation signal ($A_1 \sin(\omega t)$).

Figure 15:
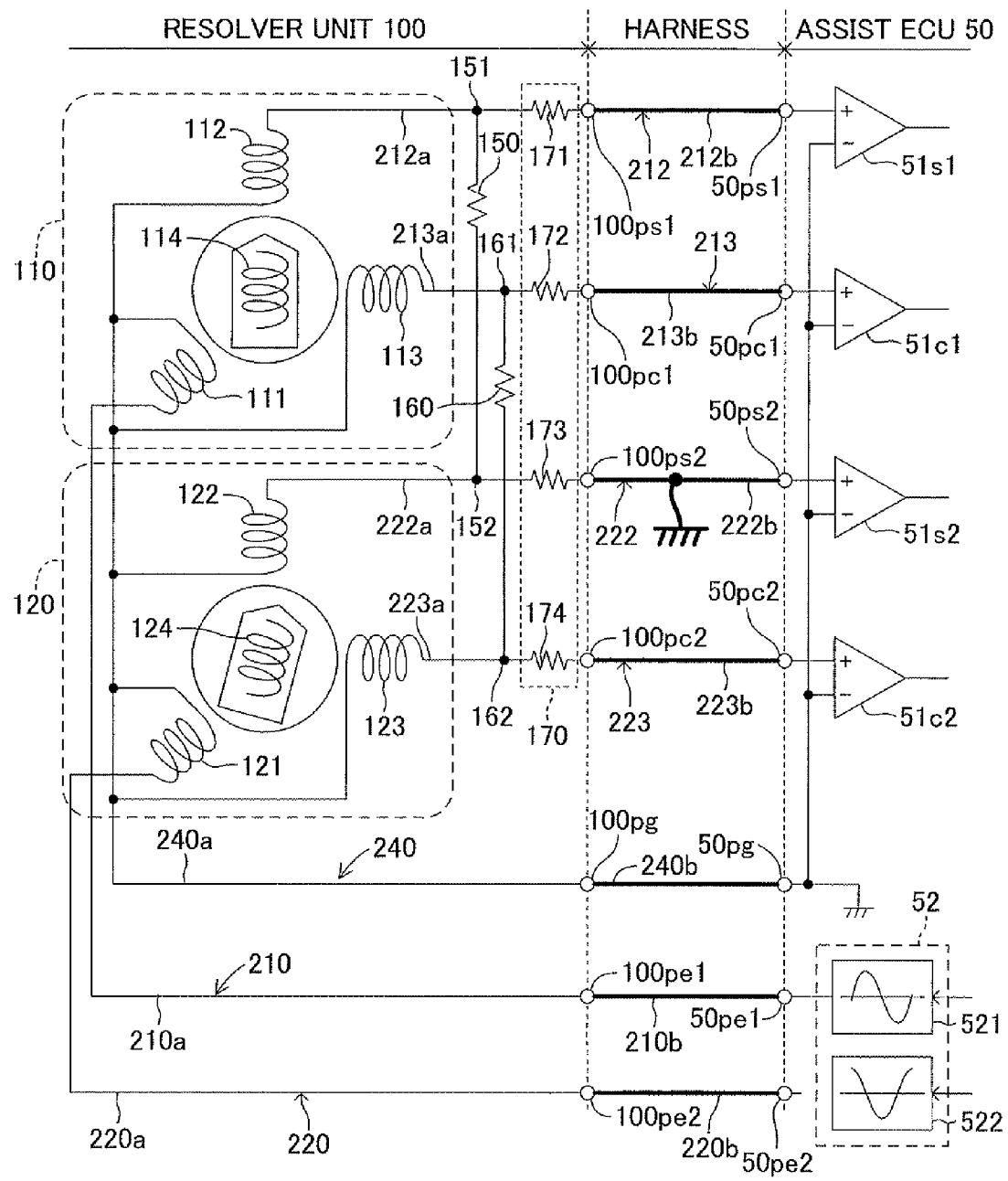
FIG. 15 is a schematic configurational diagram showing a resolver unit and the connection between the resolver unit and an assist ECU (a third modification).

In order to overcome the above-described drawback, in the third modification, as shown in FIG. 15, a grounding coping resistor unit 170 is provided in the resolver unit 100. The grounding coping resistor unit 170 includes electric resistor elements 171 to 174. The electric resistor element 171 is provided on the first sin phase detection line 212 to be located between the first sin phase signal output port 100ps1 and the connection point 151 to which the inter-coil resistor 150 is connected. The electric resistor element 172 is provided on the first cos phase detection line 213 to be located between the first cos phase signal output port 100pc1 and the connection point 161 to which the inter-coil resistor 160 is connected. The electric resistor element 173 is provided on the second sin phase detection line 222 to be located between the second sin phase signal output port 100ps2 and the connection point 152 to which the inter-coil resistor 150 is connected. The electric resistor element 174 is provided on the second cos phase detection line 223 to be located between the second cos phase signal output port 100pc2 and the connection point 162 to which the inter-coil resistor 160 is connected. Notably, electrical resistances of all the electric resistor elements 171, 172, 173, and 174 are set to the same value ($R_b$).

By means of providing the above-described grounding coping resistor unit 170, even in the case where one of the detection lines 212b, 213b, 222b, and 223b is grounded, the potential at the connection point between the grounded detection line and the inter-coil resistor connected thereto does not become 0 volt. Accordingly, the signal output from the detection line paired with the grounded detection line (i.e., the detection line connected to the grounded detection line via an inter-coil resister) contains both a voltage component associated with the first excitation signal ($A_1 \sin(\omega t)$) and a voltage component associated with the second excitation signal ($A_2 \cos(\omega t)$). Therefore, the amplitudes $S_{s1}$, $S_{c1}$, $S_{s2}$, and $S_{c2}$ of respective detection coils can be calculated by performing the above-described the multiplying and accumulating operation.

Figure 16:
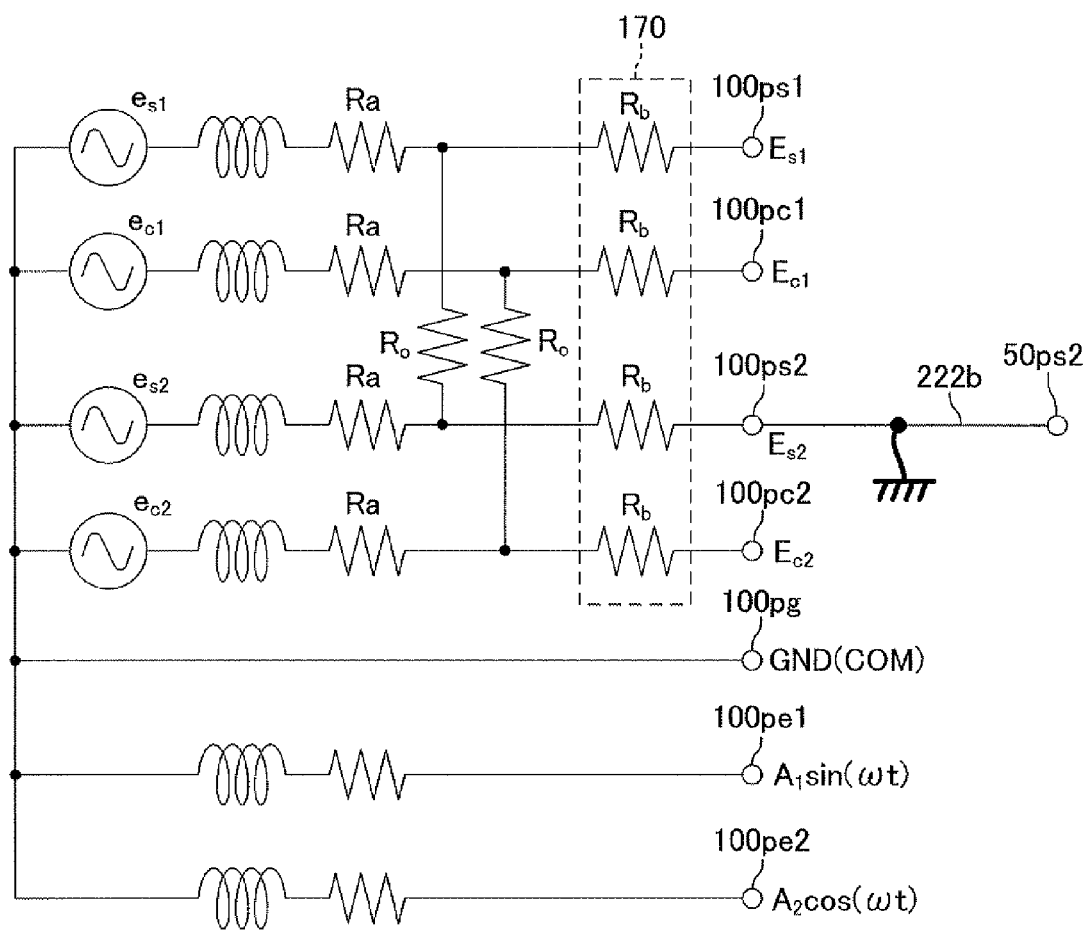
FIG. 16 is an electrical circuit diagram of the resolver unit (the third modification).

In this case, since the detection voltages $E_{s1}$, $E_{c1}$, $E_{s2}$, and $E_{c2}$ input to the assist ECU 50 are different from those input to the assist ECU 50 at the time of wire breakage, the amplitudes $S_{s1}$, $S_{c1}$, $S_{s2}$, and $S_{c2}$ which are required to calculate the rotational angles $\theta_1$ and $\theta_2$ must be corrected. Hereunder, there will be described a method of calculating the rotational angles $\theta_1$ and $\theta_2$ in the case where, for example, the external second sin phase detection line 222b is grounded as shown in FIG. 15 and FIG. 16.

The first sin phase detection voltage $E_{S1}$ is represented by the following equation (43).

$$E_{s1} = C_1 e_{s1} + C_2 e_{s2} = (C_1 \sin(k\theta_1)\sin(\omega t+\phi) + C_2 \sin(k\theta_2)\cos(\omega t+\phi)) \quad (43)$$

In the equation given above, C1 and C2 are constants represented by the following equations (44) and (45).

$$C_1 = \alpha A_1 \frac{R_a R_b + R_a R_0 + R_b R_0}{R_a^2 + 2R_a R_b + R_a R_0 + R_b R_0} \quad (44)$$

$$C_2 = \alpha A_2 \frac{R_a R_b}{R_a^2 + 2R_a R_b + R_a R_0 + R_b R_0} \quad (45)$$

The first sin phase amplitude $S_{s1}$ obtained by performing the multiplying and accumulating operation for the first sin phase detection voltage $E_{s1}$ with $\sin(\omega t+\phi)$ is represented by the following equation (46). The second sin phase amplitude $S_{s2}$ obtained by performing the multiplying and accumulating operation for the first sin phase detection voltage $E_{s1}$ with $\cos(\omega t+\phi)$ is represented by the following equation (47).

$$S_{s1} = \frac{NC_1}{2}\sin(k\theta_1) \quad (46)$$

$$S_{s2} = \frac{NC_2}{2}\sin(k\theta_2) \quad (47)$$

Accordingly, the rotational angles $\theta_1$ and $\theta_2$ can be calculated using correction values m1 and m2 as shown by the following equations (48) and (49).

$$\theta_1 = \frac{1}{k}\tan^{-1}\frac{\sin(k\theta_1)}{\cos(k\theta_1)} = \frac{1}{k}\tan^{-1}\frac{m_1 \cdot S_{s1}}{S_{c1}} \quad (48)$$

$$\theta_2 = \frac{1}{k}\tan^{-1}\frac{\sin(k\theta_2)}{\cos(k\theta_2)} = \frac{1}{k}\tan^{-1}\frac{m_2 \cdot S_{s2}}{S_{c2}} \quad (49)$$

The correction values m1 and m2 are constants calculated by the following equations (50) and (51).

$$m_1 = \frac{(R_0 + R_a)(R_a^2 + 2R_a R_b + R_a R_0 + R_b R_0)}{R_a R_b (2R_a + R_0)} \quad (50)$$

$$m_2 = \frac{R_a(R_a^2 + 2R_a R_b + R_a R_0 + R_b R_0)}{(R_a R_b + R_a R_0 + R_b R_0)(2R_a + R_0)} \quad (51)$$

Similarly, in the case where the external first sin phase detection line 212b is grounded, the torque computation section 32 calculates the first sin phase amplitude $S_{s1}$ and the second sin phase amplitude $S_{s2}$ from the second sin phase detection voltage $E_{s2}$ which is input to the assist ECU 50 via the external second sin phase detection line 222b paired with the detection line 212b.

The second sin phase detection voltage $E_{s2}$ is represented by the following equation (52).

$$E_{s2} = C_2 e_{s1} + C_1 e_{s2} \quad (52)$$

The first sin phase amplitude $S_{s1}$ obtained by performing the multiplying and accumulating operation for the second sin phase detection voltage $E_{s2}$ with $\sin(\omega t+\phi)$ is represented by the following equation (53). The second sin phase amplitude $S_{s2}$ obtained by performing the multiply and accumulating operation for the second sin phase detection voltage $E_{s2}$ with $\cos(\omega t+\phi)$ is represented by the following equation (54).

$$S_{s1} = \frac{NC_2}{2}\sin(k\theta_1) \quad (53)$$

$$S_{s2} = \frac{NC_1}{2}\sin(k\theta_2) \quad (54)$$

Accordingly, the rotational angles $\theta_1$ and $\theta_2$ can be calculated as shown by the following equations (55) and (56).

$$\theta_1 = \frac{1}{k}\tan^{-1}\frac{m_2 \cdot S_{s1}}{S_{c1}} \quad (55)$$

$$\theta_2 = \frac{1}{k}\tan^{-1}\frac{m_1 \cdot S_{s2}}{S_{c2}} \quad (56)$$

Similarly, in the case where the external first cos phase detection line 213b is grounded, the first cos phase amplitude $S_{c1}$ and the second cos phase amplitude $S_{c2}$ are calculated from the second cos phase detection voltage $E_{c2}$ which is input to the assist ECU 50 via the external second cos phase detection line 223b paired with the detection line 213b.

The second cos phase detection voltage $E_{c2}$ is represented by the following equation (57).

$$E_{c2} = C_2 e_{c1} + C e_{c2} \quad (57)$$

The first cos phase amplitude $S_{c1}$ which is obtained by performing the multiplying and accumulating operation for the second cos phase detection voltage $E_{c2}$ with $\sin(\omega t+\phi)$ is represented by the following equation (58). The second cos phase amplitude $S_{c2}$ which is obtained by performing the multiplying and accumulating operation for the second cos phase detection voltage $E_{c2}$ with $\cos(\omega t+\phi)$ is represented by the following equation (59).

$$S_{c1} = \frac{NC_2}{2}\cos(k\theta_1) \quad (58)$$

$$S_{c2} = \frac{NC_1}{2}\cos(k\theta_2) \quad (59)$$

Accordingly, the rotational angles $\theta_1$ and $\theta_2$ can be calculated as shown by the following equations (60) and (61).

$$\theta_1 = \frac{1}{k}\tan^{-1}\frac{S_{s1}}{m_2 \cdot S_{c1}} \quad (60)$$

$$\theta_2 = \frac{1}{k}\tan^{-1}\frac{S_{s2}}{m_1 \cdot S_{c2}} \quad (61)$$

Similarly, in the case where the external second cos phase detection line 223b is grounded, the first cos phase amplitude $S_{c1}$ and the second cos phase amplitude $S_{c2}$ are calculated from the first cos phase detection voltage $E_{c1}$ which is input to the assist ECU 50 via the external first cos phase detection line 213b paired with the detection line 223b.

The first cos phase detection voltage $E_{c1}$ is represented by the following equation (62).

$$E_{c1} = C_1 e_{c1} + C_2 e_{c2} \quad (62)$$

The first cos phase amplitude $S_{c1}$ obtained by performing the multiplying and accumulating operation for the first cos phase detection voltage $E_{c1}$ with $\sin(\omega t+\phi)$ is represented by the following equation (63). The second cos phase amplitude $S_{c2}$ obtained by performing the multiplying and accumulating operation for the first cos phase detection voltage $E_{c1}$ with $\cos(\omega t+\phi)$ is represented by the following equation (64).

$$S_{c1} = \frac{NC_1}{2}\cos(k\theta_1) \quad (63)$$

$$S_{c2} = \frac{NC_2}{2}\cos(k\theta_2) \quad (64)$$

Accordingly, the rotational angles $\theta_1$ and $\theta_2$ can be calculated as shown by the following equations (65) and (66).

$$\theta_1 = \frac{1}{k}\tan^{-1}\frac{S_{s1}}{m_1 \cdot S_{c1}} \quad (65)$$

$$\theta_2 = \frac{1}{k}\tan^{-1}\frac{S_{s2}}{m_2 \cdot S_{c2}} \quad (66)$$

Figure 17:
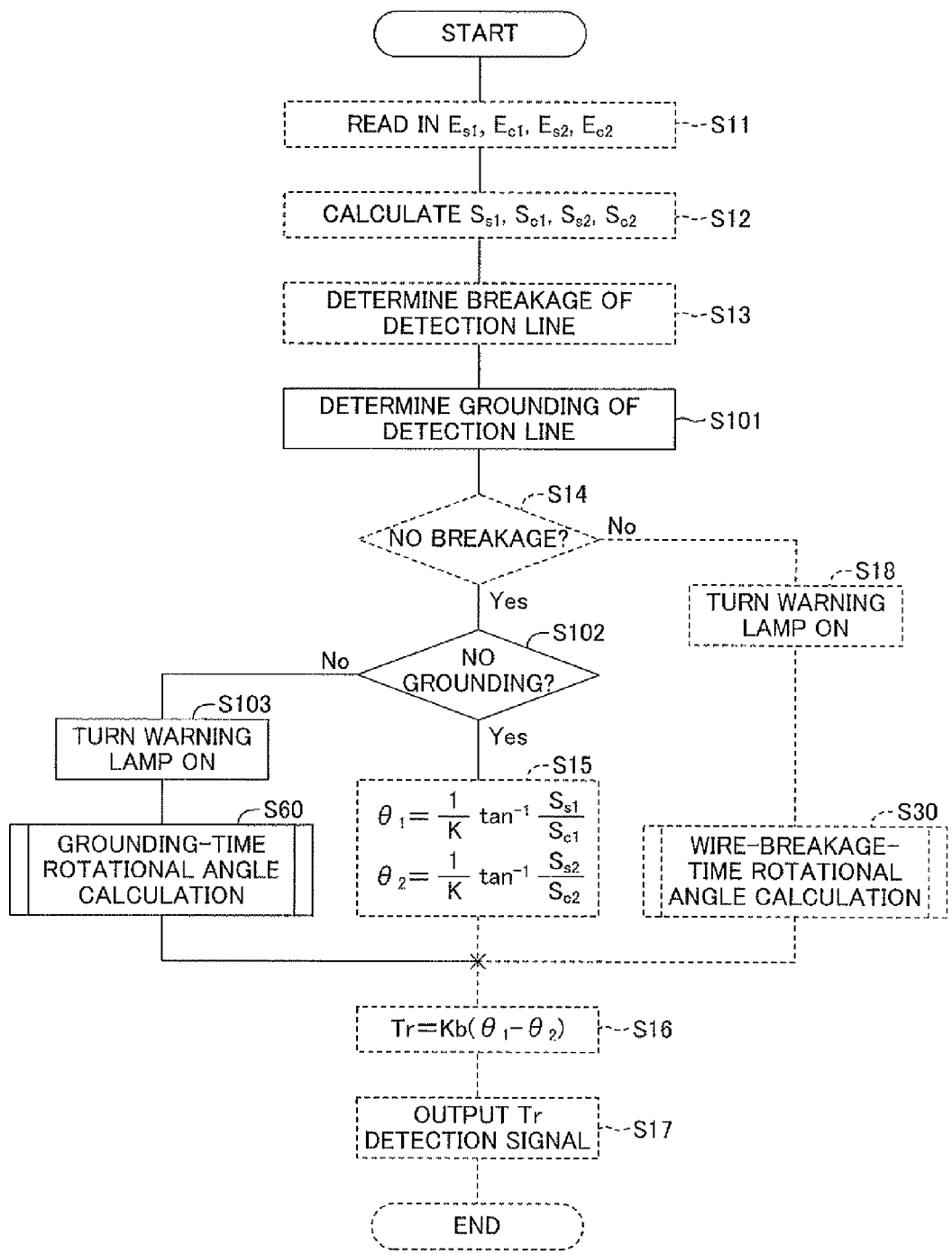
FIG. 17 is a flowchart showing a steering torque detection routine (the third modification).

Hereunder, there will be described the processing performed by the torque computation section 32 according to the third modification. FIG. 17 is a flowchart showing the steering torque detection routine executed by the torque computation section 32. In this drawing, the steps which are the same as those of the basic embodiment are assigned common step numbers and are represented by broken lines. This steering torque detection routine has steps S101, S102, S103, and S60 in addition to the steps of the steering torque detection routine of the basic embodiment.

Upon completion of the processing of step S13, in step S101, the torque computation section 32 determine whether or not any one of the detection lines 212b, 213b, 222b, and 223b is grounded. In the case where any one of the detection lines 212b, 213b, 222b, and 223b is grounded, the value $(S_{s1}^2+S_{c1}^2)$ of the sum of squares of the amplitudes $S_{s1}$ and $S_{c1}$ and the value $(S_{s2}^2+S_{c2}^2)$ of the sum of squares of the amplitudes $S_{s2}$ and $S_{c2}$ become less than the value $Ao^2$ at the time when all of the detection lines 212b, 213b, 222b, and 223b are normal $((S_{s1}^2+S_{c1}^2)<Ao^2$, $(S_{s2}^2+S_{c2}^2)<Ao^2)$. Accordingly, in the third modification, the torque computation section 32 determines whether or not the value $(S_{s1}^2+S_{c1}^2)$ of the sum of squares of the amplitudes $S_{s1}$ and $S_{c1}$ is less than a preset reference value Sg for grounding determination, and also determines whether or not the value $(S_{s2}^2+S_{c2}^2)$ of the sum of the squares of the amplitudes $S_{s2}$ and $S_{c2}$ is less than the reference value Sg for grounding determination.

In the case where the torque computation section 32 determines in step S101 that one of the detection lines 212b, 213b, 222b, and 223b is grounded, it specifies the grounded detection line on the basis of the detection voltages $E_{s1}$, $E_{c1}$, $E_{s2}$, and $E_{c2}$. In this case, the torque computation section 32 determines that the external first sin phase detection line 212b is grounded if the detection voltage $E_{s1}$ is maintained at 0 volt; and determines that the external first cos phase detection line 213b is grounded if the detection voltage $E_{c1}$ is maintained at 0 volt. Similarly, the torque computation section 32 determines that the external second sin phase detection line 222b is grounded if the detection voltage $E_{s2}$ is maintained at 0 volt, and determines that the external second cos phase detection line 223b is grounded if the detection voltage $E_{c2}$ is maintained at 0 volt. The processing of step S101 corresponds to the grounding detection means which specifies (detects) the grounded detection line among the four detection lines.

Notably, in the case where the torque computation section 32 determines that two or more of detection lines 212b, 213b, 222b, and 223b are grounded, the torque computation section 32 outputs a torque detection impossible signal to the assist computation section 31 without performing rotational angle calculation processing. As a result, the assist computation section 31 stops the steering assist.

Figure 18:
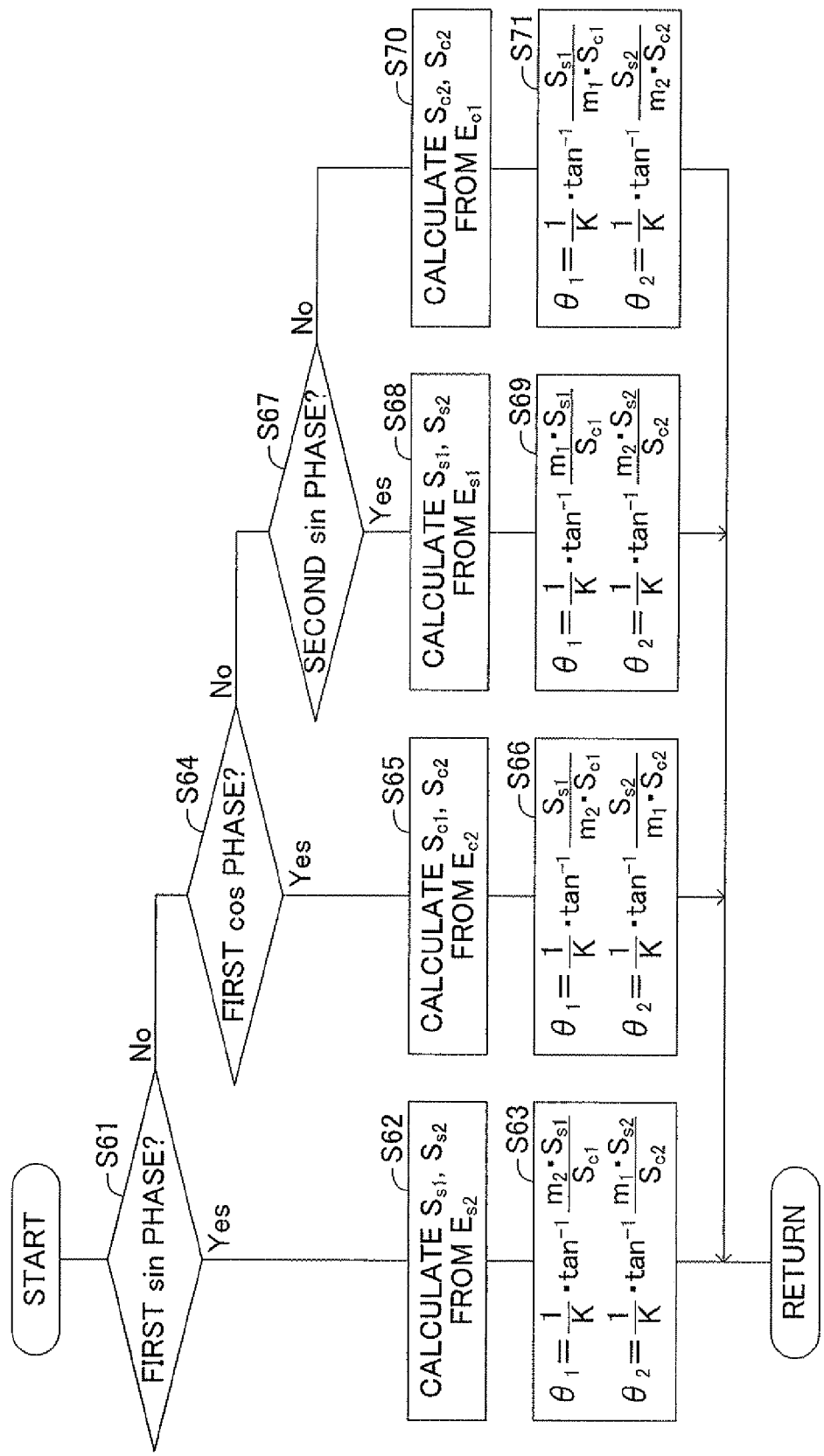
FIG. 18 is a flowchart showing a grounding-time rotational angle calculation routine (the third modification).

In step S102, the torque computation section 32 determines whether or not grounding is present. In the case where any one of detection lines 212b, 213b, 222b, and 223b is grounded, in step S103, the torque computation section 32 turns on the warning lamp 65 of the vehicle, and in step S60 subsequent thereto, executes a grounding-time rotational angle calculation processing. FIG. 18 is a flowchart showing the grounding-time rotational angle calculation routine (subroutine) incorporated as the step S60 of the steering torque detection routine of FIG. 17. When this routine starts, in step S61, the torque computation section 32 determines whether or not the grounded detection line is the external first sin phase detection line 212b. In the case where the torque computation section 32 determines that the grounded detection line is the external first sin phase detection line 212b, in step S62, the torque computation section 32 performs the multiplying and accumulating operation for the second sin phase detection voltage $E_{s2}$ with $\sin(\omega t+\phi)$ in order to calculate the first sin phase amplitude $S_{s1}$, and performs the multiplying and accumulating operation for the second sin phase detection voltage $E_{s2}$ with $\cos(\omega t+\phi)$ in order to calculate the second sin phase amplitude $S_{s2}$. Subsequently, in step S63, the torque computation section 32 substitutes the amplitudes $S_{c1}$ and $S_{c2}$ calculated in step S12 and the amplitudes $S_{s1}$ and $S_{s2}$ calculated in step S62 into the above-described equations (55) and (56) in order to calculate the rotational angles $\theta_1$ and $\theta_2$, and exits the grounding-time rotational angle calculation routine, thereby proceeding to step S16 of the steering torque detection routine.

In the case where the torque computation section 32 determines in step S64 that the grounded detection line is the external first cos phase detection line 213b, in step S65, the torque computation section 32 performs the multiplying and accumulating operation for the second cos phase detection voltage $E_{c2}$ with $\sin(\omega t+\phi)$ in order to calculate the first cos phase amplitude $S_{c1}$, and performs the multiplying and accumulating operation for the second cos phase detection voltage $E_{c2}$ with $\cos(\omega t+\phi)$ in order to calculate the second cos phase amplitude $S_{c2}$. Subsequently, in step S66, the torque computation section 32 substitutes the amplitudes $S_{s1}$ and $S_{s2}$ calculated in step S12 and the amplitudes $S_{c1}$ and $S_{c2}$ calculated in step S65 into the above-described equations (60) and (61) in order to calculate the rotational angles $\theta_1$ and $\theta_2$, and exits the grounding-time rotational angle calculation routine, thereby proceeding to step S16 of the steering torque detection routine.

In the case where the torque computation section 32 determines in step S67 that the grounded detection line is the external second sin phase detection line 222b, in step S68, the torque computation section 32 performs the multiplying and accumulating operation for the first sin phase detection voltage $E_{s1}$ with $\sin(\omega t+\phi)$ in order to calculate the first sin phase amplitude $S_{s1}$, and performs the multiplying and accumulating operation for the first sin phase detection voltage $E_{s1}$ with $\cos(\omega t+\phi)$ in order to calculate the second sin phase amplitude $S_{s2}$. Subsequently, in step S69, the torque computation section 32 substitutes the amplitudes $S_{c1}$ and $S_{c2}$ calculated in step S12 and the amplitudes $S_{s1}$ and $S_{s2}$ calculated in step S68 into the above-described equations (48) and (49) in order to calculate the rotational angles $\theta_1$ and $\theta_2$, and exits the grounding-time rotational angle calculation routine, thereby proceeding to step S16 of the steering torque detection routine.

In the case where the torque computation section 32 makes a "No" determination in step S67; that is, in the case where the torque computation section 32 determines that the detection line grounded is the external second cos phase detection line 223b, in step S70, the torque computation section 32 performs the multiplying and accumulating operation for the first cos phase detection voltage $E_{c1}$ with $\sin(\omega t+\phi)$ in order to calculate the first cos phase amplitude $S_{c1}$, and performs the multiplying and accumulating operation for the first cos phase detection voltage $E_{c1}$ with $\cos(\omega t+\phi)$ in order to calculate the second cos phase amplitude $S_{c2}$. Subsequently, in step S71, the torque computation section 32 substitutes the amplitudes $S_{s1}$ and $S_{s2}$ calculated in step S12 and the amplitudes $S_{c1}$ and $S_{c2}$ calculated in step S70 into the above-described equations (65) and (66) in order to calculate the rotational angle $\theta_1$ and $\theta_2$, and exists the grounding-time rotational angle calculation routine, thereby proceeding to step S16 of the steering torque detection routine.

According to the above-described third modification, in addition to the effect of the basic embodiment, there is attained an effect that the steering torque can be detected even in the case where any one of the detection lines 212b, 213b, 222b, and 223b is grounded. As a result, the reliability of the electric power steering apparatus is improved further.

<Fourth Modification>

In the configuration in which the first resolver 110 and the second resolver 120 are connected together via the inter-coil resistors 150 and 160, the amplitudes of the detection voltages $E_{s1}$, $E_{c1}$, $E_{s2}$, and $E_{c2}$ of the first sin phase detection signal, the first cos phase detection signal, the second sin phase detection signal, and the second cos phase detection signal which are input to the assist ECU 50 decrease as compared with the configuration in which the first resolver 110 and the second resolver 120 are not connected via the inter-coil resistors 150 and 160. For example, when $R_a=R_b$, the amplitudes of the detection voltages $E_{s1}$, $E_{c1}$, $E_{s2}$, and $E_{c2}$ decrease to about ⅔ the amplitudes in the case where the inter-coil resistors 150 and 160 are not provided. Accordingly, there arises a resolution reduction problem in the assist ECU 50.

To solve this problem, in the fourth modification, the assist ECU 50 (torque computation section 32) performs N/D conversion for the detection voltages of the detection signals received via the detection lines which are connected together via an inter-coil resistor, adds together the converted voltage values, and then performs the multiplying and accumulating operation for the resultant sum. That is, the torque computation section 32 adds together the detection voltage values of the paired detection lines, and then performs multiplying and accumulating operation for the resultant sum. For example, in the configuration shown in FIG. 2, the torque computation section 32 performs A/D conversion for the detection voltage $E_{s1}$ of the first sin phase detection signal and the detection voltage $E_{s2}$ of the second sin phase detection signal, and then adds together the digital values representing the detection voltages $E_{s1}$ and $E_{s2}$. Accordingly, as shown by the following equation (67), the resultant value is equal to the sum of the first sin phase coil voltage $e_{s1}$ and the second sin phase coil voltage $e_{s2}$.

$$E_{s1} + E_{s2} = \frac{R_0 + R_a}{R_0 + 2R_a}e_{s1} + \frac{R_a}{R_0 + 2R_a}e_{s2} + \qquad (67)$$
$$\frac{R_a}{R_0 + 2R_a}e_{s1} + \frac{R_0 + R_a}{R_0 + 2R_a}e_{s2} = e_{s1} + e_{s2}$$

Subsequently, by means of performing the multiplying and accumulating operation for the sum with $\sin(\omega t+\phi)$, the torque computation section 32 can calculate the first sin phase amplitude $S_{s1}$ as shown by the following equation (68). Similarly, by means of performing the multiplying and accumulating operation for the sum with $\cos(\omega t+\phi)$, the torque computation section 32 can calculate the second sin phase amplitude $S_{s2}$ as shown by the following equation (69).

$$E_{s1} + E_{s2} = \qquad (68)$$
$$e_{s1} + e_{s2} = \alpha A_1 \sin(k\theta_1)\sin(\omega t + \phi) + \alpha A_2 \sin(k\theta_2)\cos(\omega t + \phi)$$
$$\xrightarrow{\Sigma(E_{s1}+E_{s2})\sin(\omega t+\phi)} S_{s1} = \frac{N}{2}\alpha A_1 \sin(k\theta_1)$$
$$\xrightarrow{\Sigma(E_{s1}+E_{s2})\cos(\omega t+\phi)} S_{s2} = \frac{N}{2}\alpha A_2 \sin(k\theta_2) \qquad (69)$$

Similarly, the torque computation section 32 performs A/D conversion for the detection voltage $E_{c1}$ of the first cos phase detection signal and the detection voltage $E_{c2}$ of the second cos phase detection signal, and then adds together the digital values representing the detection voltages $E_{c1}$ and $E_{c2}$. As shown by the following equation (70), the resultant value is equal to the sum of the first cos phase coil voltage $e_{c1}$ and the second cos phase coil voltage $e_{c2}$.

$$E_{c1} + E_{c2} = \frac{R_0 + R_a}{R_0 + 2R_a}e_{c1} + \frac{R_a}{R_0 + 2R_a}e_{c2} + \qquad (70)$$
$$\frac{R_a}{R_0 + 2R_a}e_{c1} + \frac{R_0 + R_a}{R_0 + 2R_a}e_{c2} = e_{c1} + e_{c2}$$

Subsequently, by means of performing the multiplying and accumulating operation for the sum with $\sin(\omega t+\phi)$, the torque computation section 32 can calculate the first cos phase amplitude $S_{c1}$ as shown by the following equation (71). Similarly, by means of performing the multiplying and accumulating operation for the sum with $\cos(\omega t+\phi)$, the torque computation section 32 can calculate the second cos phase amplitude $S_{c2}$ as shown by the following equation (72).

$$E_{c1} + E_{c2} = \quad (71)$$
$$e_{c1} + e_{c2} = \alpha A_1 \cos(k\theta_1)\sin(\omega t + \phi) + \alpha A_2 \cos(k\theta_2)\cos(\omega t + \phi)$$

$$\xrightarrow{\Sigma(E_{c1}+E_{c2})\sin(\omega t+\phi)} S_{c1} = \frac{N}{2}\alpha A_1 \cos(k\theta_1)$$

$$\xrightarrow{\Sigma(E_{c1}+E_{c2})\cos(\omega t+\phi)} S_{c2} = \frac{N}{2}\alpha A_2 \cos(k\theta_2) \quad (72)$$

Accordingly, the torque computation section 32 can compute the rotational angles $\theta_1$ and $\theta_2$ by use of the equations (22) and (23) given above without using the correction value m.

As mentioned above, according to the fourth modification, the amplitudes $S_{s1}$, $S_{s2}$, $S_{c1}$, and $S_{c2}$ after the calculation can be increased to 1.5 times without changing the input range for the A/D converter. As a result, the resolution is improved, and more accurate calculation becomes possible. Notably, almost the same calculation accuracy can be secured by increasing the number of times of sampling per period of the excitation signal to 1.5 times in place of performing the above-described calculation processing. However, in such a case, the steering torque calculation period becomes longer, which results in delay in response. Accordingly, this alternative processing method is not so preferable.

In the fourth modification, in order to improve the resolution, the torque computation section 32 calculates the amplitudes $S_{s1}$, $S_{c1}$, $S_{s2}$, and $S_{c2}$ by use of the sum of the detection voltage values in step S12 of the torque detection routine of FIG. 6 as mentioned previously. However, the resolution cannot be improved by such a calculation method in the case where an anomaly such as wire breakage is detected in any one of the detection lines. In order to overcome this drawback, the torque computation section 32 performs such calculation processing when no breakage is detected in any one of the detection lines, and switches the calculation processing to the calculation processing according to the above-described basic embodiment when breakage is detected in any one of the detection lines.

<Fifth Modification>

In the above-described basic embodiment, there arises the following problem. If the temperature characteristic of the internal resistance (output impedance) $R_a$ of each of the detection coils 112, 113, 122, and 123 is different from the temperature characteristic of the resistance $R_0$ of each of the inter-coil resistors 150 and 160, the correction value m ($=1+R_0/R_a$) goes out of the proper range due to a change in the temperature inside the resolver unit 100, thereby preventing the torque computation section 32 from calculating the rotational angles $\theta_1$ and $\theta_2$ accurately.

The fifth modification solves this problem. There will be described two modifications (the fifth modification 1 and the fifth modification 2).

<Fifth Modification 1>

The resolver unit 100 according to the fifth modification 1 includes, as the inter-coil resistors 150 and 160, coils formed of the same material as that of the detection coils 112, 113, 122, and 123. In this case, the inter-coil resistors 150 and 160 and the detection coils 112, 113, 122, and 123 are provided in the same casing of the resolver unit 100. Thus, the temperature characteristic of the resistance $R_0$ of each of the inter-coil resistors 150 and 160 is the same as the temperature characteristic of the internal resistance $R_a$ of each of the detection coils 112, 113, 122, and 123. As a result, the correction value m does not change even when the temperature inside the resolver unit 100 changes. According to the fifth modification 1, the torque computation section 32 can calculate the rotational angles $\theta_1$ and $\theta_2$ accurately regardless of the change in the temperature inside the resolver unit 100, thereby improving the torque detection accuracy.

<Fifth Modification 2>

The fifth modification 2 solves the above-described problem by changing the calculation method used by the assist ECU 50. For example, in the case where the external first sin phase detection line 212b is broken, the assist ECU 50 (torque computation section 32) performs the multiplying and accumulating operation for the second sin phase detection voltage $E_{s2}$ with $\sin(\omega t+\phi)$ in order to calculate the first sin phase amplitude $S_{s1}$, and performs the multiplying and accumulating operation for the second cos phase detection voltage $E_{c2}$ with $\cos(\omega t+\phi)$ in order to calculate the first cos phase amplitude $S_{c1}$. By means of using such a calculation method, as shown by the following equation (73), both the first sin phase amplitude $S_{s1}$ and the first cos phase amplitude $S_{c1}$ are multiplied by the correction value m during the calculation of the rotation angle $\theta_1$. As a result, the correction value m is set off, thereby the influence of the temperature can be compensated.

$$\theta_1 = \frac{1}{k}\tan^{-1}\frac{\sin(k\theta_1)}{\cos(k\theta_1)} = \frac{1}{k}\tan^{-1}\frac{m \cdot S_{s1}}{m \cdot S_{c1}} \quad (73)$$

In the case where another detection line is broken, the influence of the temperature can be compensated by performing calculations in the same manner.

Figure 19:
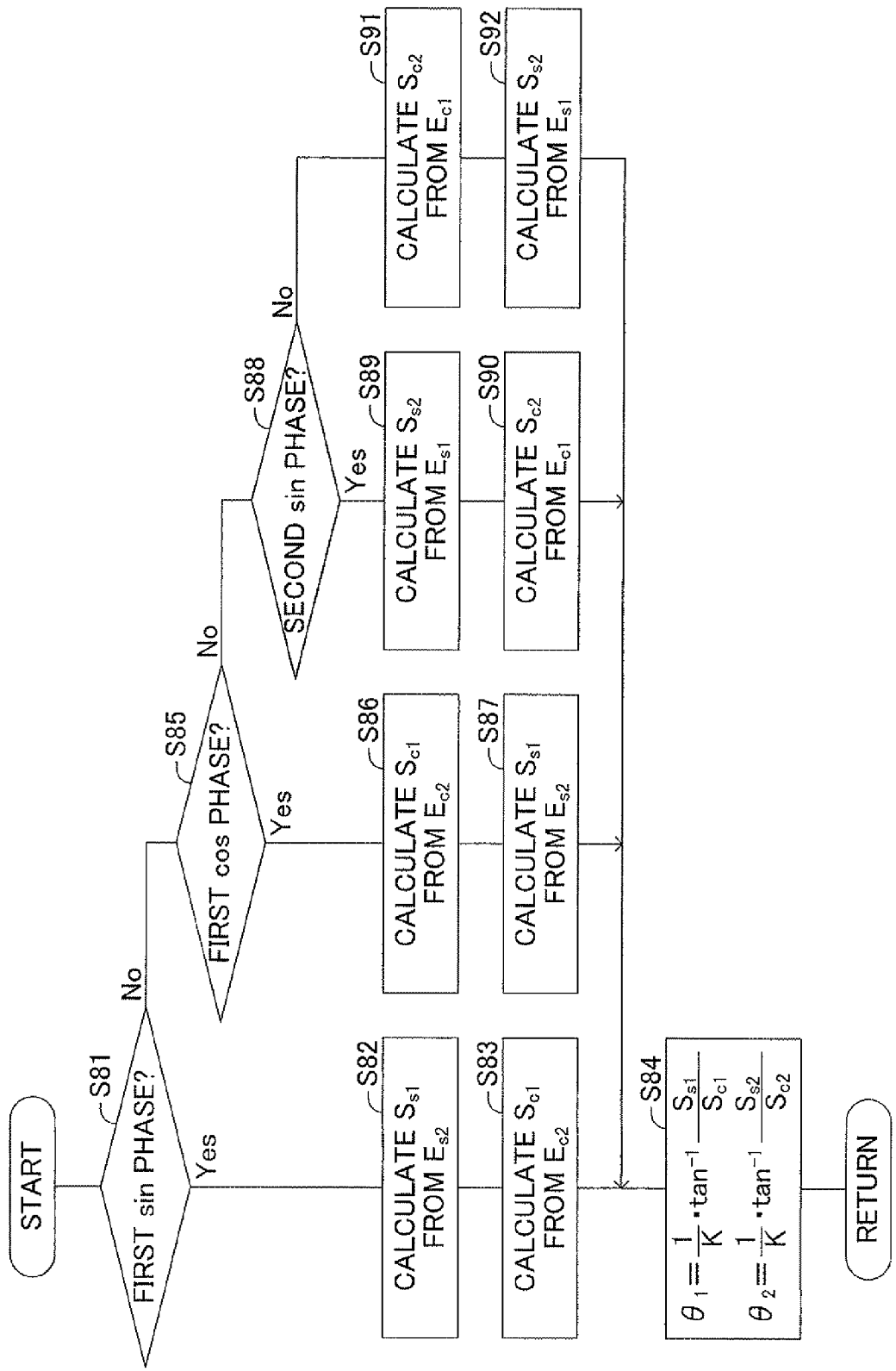
FIG. 19 is a flowchart showing a wire-breakage-time rotational angle calculation routine (a fifth modification 2).

Hereunder, there will be described steering torque detection processing according to the fifth modification 2. FIG. 19 shows a breakage-time rotational angle calculation routine according to the fifth modification 2. This wire-breakage-time rotational angle calculation routine is executed in place of step S30 of the steering torque detection routine of the basic embodiment.

When this routine starts, in step S81, the torque computation section 32 determines whether or not the broken detection line is the external first sin phase detection line 212b. In the case where the torque computation section 32 determines that the broken detection line is the external first sin phase detection line 212b, in step S82, the torque computation section 32 performs the multiplying and accumulating operation for the second sin phase detection voltage $E_{s2}$ with $\sin(\omega t+\phi)$, to thereby calculate the first sin phase amplitude $S_{s1}$ represented by the above-described equation (25). Subsequently, in step S83, the torque computation section 32 performs the multiplying and accumulating operation for the second cos phase detection voltage $E_{c2}$ with $\sin(\omega t+\phi)$, to thereby calculate the first cos phase amplitude $S_{c1}$ represented by the above-described equation (28). After that, in step S84, the torque computation section 32 substitutes the amplitudes $S_{s1}$ and $S_{c1}$ calculated in steps S82 and S83 into the above-described equation (22) in order to calculate the rotational angle $\theta_1$, and substitutes the amplitudes $S_{s2}$ and $S_{c2}$ calculated in step S12 into the above-described equation (23) in order to calculate the rotational angle $\theta_2$. After calculating the two rotational angles $\theta_1$ and $\theta_2$, the torque computation section 32 exits the wire-breakage-time rotational angle calculation routine, thereby proceeding to step S16 of the steering torque detection routine.

In the case where the torque computation section 32 determines in step S85 that the broken detection line is the external first cos phase detection line 213b, in step S86, the torque computation section 32 performs the multiplying and accumulating operation for the second cos phase detection voltage $E_{c2}$ with $\sin(\omega t+\phi)$, to thereby calculate the first cos phase amplitude $S_{c1}$ represented by the above-described equation (28). Subsequently, in step S87, the torque computation section 32 performs the multiplying and accumulating operation for the second sin phase detection voltage $E_{s2}$ with $\sin(\omega t+\phi)$, to thereby calculate the first sin phase amplitude $S_{s1}$ represented by the above-described equation (25). After that, in step S84, the torque computation section 32 substitutes the amplitudes $S_{c1}$ and $S_{s1}$ calculated in steps S86 and S87 into the above-described equation (22) in order to calculate the rotational angle $\theta_1$, and substitutes the amplitudes $S_{s2}$ and $S_{c2}$ calculated in step S12 into the above-described equation (23) in order to calculate the rotational angle $\theta_2$. After calculating the two rotational angles $\theta_1$ and $\theta_2$, the torque computation section 32 exits the wire-breakage-time rotational angle calculation routine, thereby proceeding to step S16 of the steering torque detection routine.

In the case where the torque computation section 32 determines in step S88 that the broken detection line is the external second sin phase detection line 222b, in step S89, the torque computation section 32 performs the multiplying and accumulating operation for the first sin phase detection voltage $E_{s1}$ with $\cos(\omega t+\phi)$, to thereby calculate the second sin phase amplitude $S_{s2}$ represented by the above-described equation (30). Subsequently, in step S90, the torque computation section 32 performs the multiplying and accumulating operation for the first cos phase detection voltage $E_{c1}$ with $\cos(\omega t+\phi)$, to thereby calculate the second cos phase amplitude $S_{c2}$ represented by the above-described equation (32). Next, in step S84, the torque computation section 32 substitutes the amplitudes $S_{s1}$ and $S_{c1}$ calculated in step S12 into the above-described equation (22) in order to calculate the rotational angle $\theta_1$, and substitutes the amplitudes $S_{s2}$ and $S_{c2}$ calculated in steps S89 and S90 into the above-described equation (23) in order to calculate the rotational angle $\theta_2$. After calculating the two rotational angles $\theta_1$ and $\theta_2$, the torque computation section 32 exits the wire-breakage-time rotational angle calculation routine, thereby proceeding to step S16 of the steering torque detection routine.

In the case where the torque computation section 32 makes a "No" determination in step S88; that is, in the case where the torque computation section 32 determines that the broken detection line is the external second cos phase detection line 223b, in step S91, the torque computation section 32 performs the multiplying and accumulating operation for the first cos phase detection voltage $E_{c1}$ with $\cos(\omega t+\phi)$), to thereby calculate the second cos phase amplitude $S_{c2}$ represented by the above-described equation (32). Subsequently, in step S92, the torque computation section 32 performs the multiplying and accumulating operation for the first sin phase detection voltage $E_{s1}$ with $\cos(\omega t+\phi)$, to thereby calculate the second sin phase amplitude $S_{s2}$ represented by the above-described equation (30). Subsequently, in step S84, the torque computation section 32 substitutes the amplitudes $S_{s1}$ and $S_{c1}$ calculated in step S12 into the above-described equation (22) in order to calculate the rotational angle $\theta_1$, and substitutes the amplitudes $S_{c2}$ and $S_{s2}$ calculated in steps S91 and S92 into the above-described equation (23) in order to calculate the rotational angle $\theta_2$. After calculating the two rotational angles $\theta_1$ and $\theta_2$, the torque computation section 32 exits the wire-breakage-time rotational angle calculation routine, thereby proceeding to step S16 of the steering torque detection routine.

As mentioned above, in the fifth modification 2, in the case where breakage of one detection line is detected, the torque computation section 32 calculates the rotational angles $\theta_1$ and $\theta_2$ by separating the amplitudes $S_{s1}$, $S_{c1}$, $S_{c2}$, and $S_{s2}$ (i.e., output components of the four detection coils) from the two detection signals output from the resolver connected to the detection line which is not broken. Accordingly, the torque computation section 32 can calculate the rotational angles $\theta_1$ and $\theta_2$ accurately regardless of the temperature change inside the resolver unit 100, thereby improving the torque detection accuracy.

<Sixth Modification>

In the above-described basic embodiment, the phase of each of the AC signals output from the detection coils 112, 113, 122, and 123 (i.e., the phase of each of the excitation signal components ($\sin(\omega t+\phi)$ and $\cos(\omega t+\phi)$ of the coil voltages $e_{s1}$, $e_{c1}$, $e_{s2}$, and $e_{c2}$) and the phase of each of the detection signals input to the assist ECU 50 (i.e., the phase of each of the excitation signal components ($\sin(\omega t+\phi)$ and $\cos(\omega t+\phi)$)) of the detection voltages $E_{s1}$, $E_{c1}$, $E_{s2}$, and $E_{c2}$) may shift from each other due to the influence of the inductances of the detection coils 112, 113, 122, and 123. There arises a problem that the torque computation section 32 cannot calculate the amplitudes $S_{s1}$, $S_{c1}$, $S_{s2}$, and $S_{c2}$ accurately if it performs the multiplying and accumulating operation with the above-described phases shifted from each other. Therefore, in the case where the influence of the inductances of the detection coils 112, 113, 122, and 123 is large, appropriate measures must be taken.

The sixth modification solves this problem. There will be described two modifications (the sixth modification 1 and the sixth modification 2).

<Sixth Modification 1>

Figure 20:
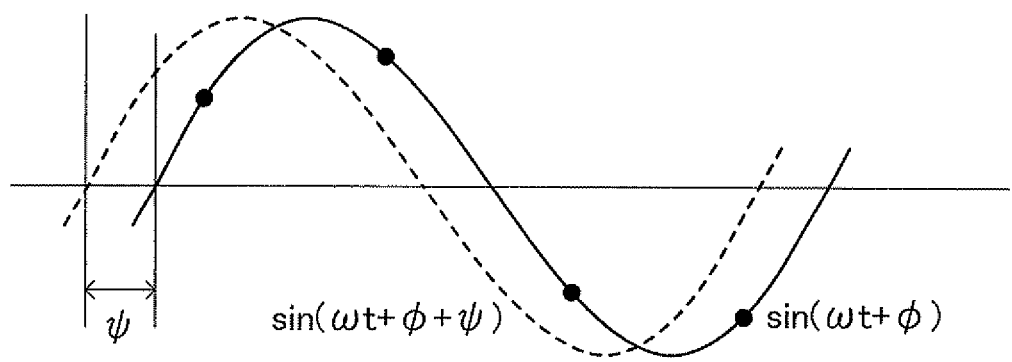
FIG. 20 is a graph showing the amount of phase shift (a sixth modification 1).

The amount of phase shift is determined by inductance and resistance. In view of this, in the sixth modification 1, the amount of phase shift $\psi$ is determined in advance through calculations and experiments in the design phase, and the determined amount of phase shift $\psi$ is stored in the memory of the assist ECU 50. In FIG. 20 explaining the amount of shift $\psi$, a solid line represents the waveform of $\sin(\omega t+\phi)$, and a broken line represents the waveform of $\sin(\omega t+\phi+\psi)$, whose phase is shifted from $\sin(\omega t+\phi)$ by $\psi$. The assist ECU 50 according to the sixth modification 1 multiplies $\sin(\omega t+\phi+\psi)$ or $\cos(\omega t+\phi+\psi)$ in place of $\sin(\omega t+\phi)$ or $\cos(\omega t+\phi)$ when performing the multiplying and accumulating operation in the above-described basic embodiment or each of the above-described modifications. Thus, even in the state where phase shift is present, the assist ECU 50 can calculate the amplitudes $S_{s1}$, $S_{c1}$, $S_{s2}$, and $S_{c2}$ accurately, thereby improving the torque detection accuracy.

<Sixth Modification 2>

Figure 21:
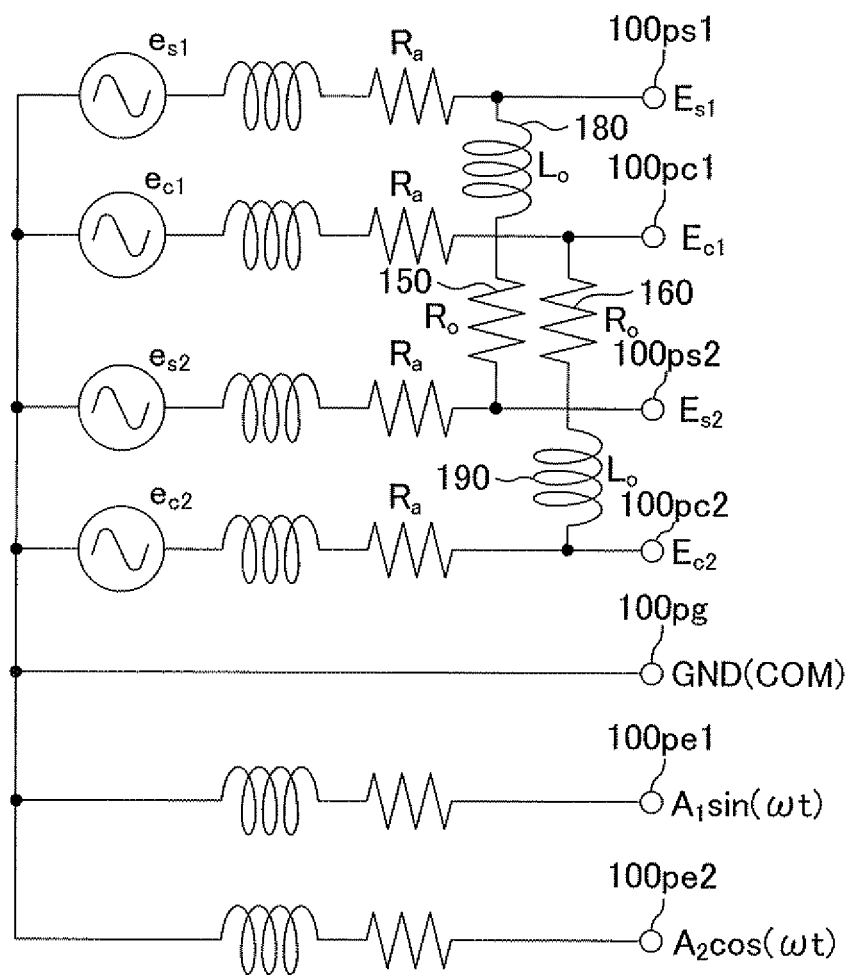
FIG. 21 is an electrical circuit diagram of the resolver unit (a sixth modification 2).

In the sixth modification 2, as shown in FIG. 21, the resolver unit 100 is configured such that inductors 180 and 190 are connected in series to the inter-coil resistors 150 and 160 respectively. Inductance $L_0$ of each of these inductors 180 and 190 is set to a proper value (a value which does not cause phase shift) through calculations and experiments in the design phase. According to the sixth modification 2, the output impedance of each of the detection coils 112, 113, 122, and 123 can be rendered the same as the impedance of each of the inter-coil resistors 150 and 160. As a result, there can be eliminated the phase shifts between the coil voltages $e_{s1}$, $e_{c1}$, $e_{s2}$, and $e_{c2}$ and the detection voltages $E_{s1}$, $E_{c1}$, $E_{s2}$, $E_{c2}$. Accordingly, accurate amplitudes $S_{s1}$, $S_{c1}$, $S_{s2}$, and $S_{c2}$ can be calculated, whereby the torque detection accuracy can be improved.

<Seventh Modification>

In the configuration according to the above-described basic embodiment, the first resolver 110 and the second resolver 120 are connected together via the inter-coil resistors 150 and 160. In the case where the resistance $R_0$ of either one of the inter-coil resistor 150 and 160 changes greatly due to deterioration or the like, or in the case where wire breakage occurs in the inter-coil resistor 150 or 160, the resolver unit 100 cannot output proper voltage signals to the assist ECU 50 In such a case, the torque computation section 32 cannot detect the rotational angles accurately.

In the seventh modification, the torque computation section 32 constantly monitors the resistances $R_0$ of the inter-coil resistors 150 and 160. In the case where either one of the resistances $R_0$ is outside the normal range, the torque computation section 32 warns the driver or outputs an assist stop instruction to the assist computation section 31 in accordance with the anomaly level.

First, a method of calculating the resistance $R_0$ will be described hereunder. The detection voltage $E_{s1}$ of the first sin phase detection signal is represented by the following equation (74), and the sum of the detection voltage $E_{s1}$ of the first sin phase detection signal and the detection voltage $E_{s2}$ of the second sin phase detection signal is represented by the following equation (75).

$$E_{s1} = \frac{R_0 + R_a}{R_0 + 2R_a} e_{s1} + \frac{R_a}{R_0 + 2R_a} e_{s2} \quad (74)$$

$$E_{s1} + E_{s2} = e_{s1} + e_{s2} \quad (75)$$

Here, the values obtained by performing the multiplying and accumulating operation for the detection voltage $E_{s1}$ and the sum $(E_{s1}+E_{s2})$ respectively with $\sin(\omega t+\phi)$ are denoted by $S_{s1}$ and $S_{s12}$. In such a case, $S_{s1}$ and $S_{s12}$ are represented by the following equations (76) and (77) respectively.

$$\Sigma E_{s1} \cdot \sin(\omega t + \phi) \to S_{s1} = \frac{N}{2} \frac{R_0 + R_a}{R_0 + 2R_a} \alpha A_1 \sin(k\theta_1) \quad (76)$$

$$\Sigma (E_{s1} + E_{s2}) \cdot \sin(\omega t + \phi) \to S_{s12} = \frac{N}{2} \alpha A_1 \sin(k\theta_1) \quad (77)$$

The ratio "a" of $S_{s1}$ to $S_{s12}$ is represented by the following equation (78).

$$a = \frac{S_{s1}}{S_{s12}} = \frac{R_0 + R_a}{R_0 + 2R_a} \quad (78)$$

This equation can be transformed to the following equation (79) by solving it for $R_0$.

$$R_0 = \frac{2a - 1}{1 - a} R_a \quad (79)$$

In the equation given above, $R_a$ is the known value, and the ratio "a" is the value obtained by performing the multiplying and accumulating operation for the sampling value of the detection voltage. Accordingly, the resistance $R_0$ can be obtained through calculations.

This resistance $R_0$ represents the resistance of the inter-coil resistor 150. The resistance $R_0$ of the inter-coil resistor 160 can also be calculated in the same manner. In this case, the torque computation section 32 performs the multiplying and accumulating operation for the detection voltage $E_{c1}$ of the first cos phase detection signal and the sum $(E_{c1}+E_{c2})$ of the detection voltage $E_{c1}$ of the first cos phase detection signal and the detection voltage $E_{c2}$ of the second cos phase detection signal with $\cos(\omega t+\phi)$ in order to calculate $S_{c1}$ and $S_{c12}$. The ratio "a" of $S_{c1}$ to $S_{c12}$ ($=S_{c1}/S_{c12}$) is represented by the same equation as that for calculating the resistance of the inter-coil resistor 150. By means of using this equation, the torque computation section 32 can calculate the resistance $R_0$ of the inter-coil resistor 160.

Figure 22:
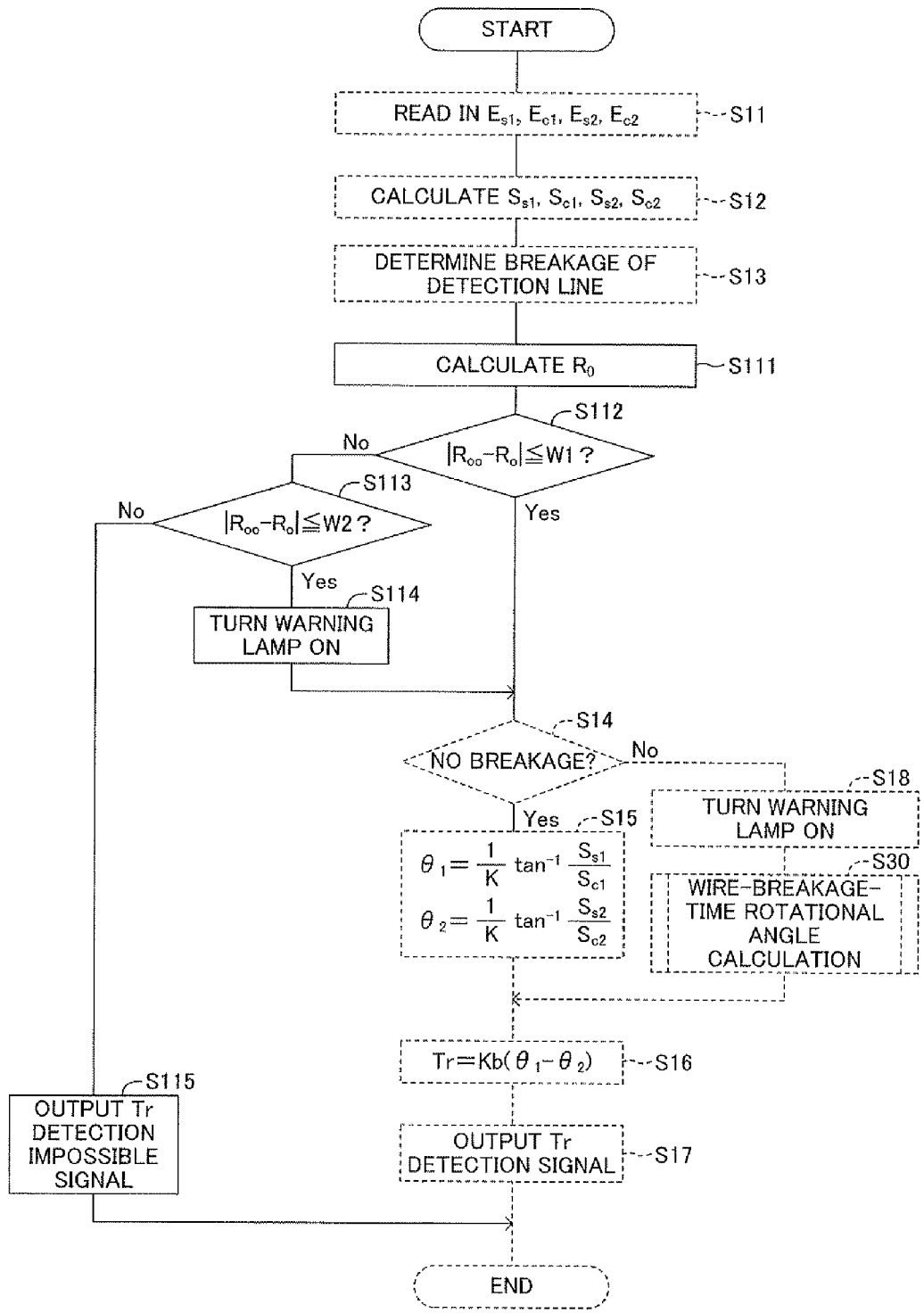
FIG. 22 is a flowchart showing a steering torque detection routine (a seventh modification).

Hereunder, there will be described processing performed by the torque computation section 32 according to the seventh modification. FIG. 22 is a flowchart showing the steering torque detection routine executed by the torque computation section 32. In this figure, the steps which are the same as those of the basic embodiment are assigned the common step numbers, and are represented by broken lines. This steering torque detection routine has steps S111, S112, S113, and S114, and S115 in addition to the steps of the steering torque detection routine of the basic embodiment.

Upon completion of the processing of step S13, the torque computation section 32 calculates the resistances $R_0$ of the inter-coil resistors 150 and 160 respectively by use of the above-described equations in step S111. Subsequently, in step S112, the torque computation section 32 determines whether or not the resistances $R_0$ of the inter-coil resistors 150 and 160 are within the proper range. In this case, the torque computation section 32 calculates the magnitude ($|R_{00}-R_0|$) of the difference between the reference resistance $R_{00}$ and the resistance $R_0$ of the inter-coil resistors 150 and the magnitude ($|R00-R0|$) of the difference between the reference resistance $R_{00}$ and the resistance $R_0$ of the inter-coil resistors 160 respectively, and determines whether or not the values of the calculated magnitudes (referred to as resistance differences $|\Delta R|$) are equal to or less than a permissibility determination value W1. The reference resistance $R_{00}$ is a proper value which is determined in the design phase and is set in advance. In the case where both the resistance $R_0$ of the inter-coil resistor 150 and the resistance $R_0$ of the inter-coil resistor 160 are within the ±W1 range extending from the resistance $R_{00}$ (the center value), the torque computation section 32 determines that the resistances $R_0$ of the inter-coil resistances 150 and 160 are proper, and performs the above-described processing starting with step S14.

Meanwhile, in the case where either one of the resistance $R_0$ of the inter-coil resistor 150 and the resistance $R_0$ of the inter-coil resistor 160 is outside the proper range, in step S113, the torque computation section 32 determines whether or not the resistance $R_0$ of the relevant inter-coil resistor is within the warning range. In this case, the torque computation section 32 determines whether or not the resistance difference $|\Delta R|$ between the reference resistance $R_{00}$ and the resistance $R_0$ of the relevant inter-coil resistor is equal to or less than a warning determination value W2. This warning determination value W2 sets the boundary of the warning range, and is set to a value greater than the permissibility determination value W1. In the case where the torque computation section 32 determines in step S113 that the resistance $R_0$ of the relevant inter-coil resistor is within the warning range, in step S114, the torque computation section 32 turns on the warning lamp 65 of the vehicle, and proceeds to step S14.

Meanwhile, in the case where either one of the resistance $R_0$ of the inter-coil resistor 150 and the resistance $R_0$ of the inter-coil resistor 160 is outside the warning range, in step S115, the torque computation section 32 outputs a torque detection impossible signal to the assist computation section 31. As a result, the assist computation section 31 stops the steering assist.

The resistance $R_0$ of each of the inter-coil resistors 150 and 160 becomes an extremely large value (e.g., infinite) when wire breakage occurs in the inter-coil resistor 150 or 160, and becomes an extremely small value (e.g., zero) when a short circuit occurs in the inter-coil resistor 150 or 160 (a short circuit between the detection line 212a and the detection line 222a or a short circuit between the detection line 213a and the detection line 223a). Accordingly, the torque computation section 32 can distinguish between wire breakage and short circuit on the basis of the sign (+ or −) of the resistance difference $\Delta R$ ($=R_{00}-R_0$) between the reference resistance $R_{00}$ and the resistance $R_0$ of the relevant inter-coil resistance and the magnitude of the resistance difference $\Delta R$.

According to the steering torque detection routine of the above-described seventh modification, in the case where an anomaly of the resistance of either one of the inter-coil resistors 150 and 160 is detected and its level is a warning level, the torque computation section 32 can warn the driver of the anomaly. In the case where the anomaly level is higher than the warning level, the torque computation section 32 can (instruct the assist computation section 31 to) stop the steering assist. Hence, for a change in the resistance $R_0$ of each of the inter-coil resistors 150 and 160 with time, the torque computation section 32 can prompt the driver to replace faulty parts without stopping the steering assist suddenly before expiration of the period in which safety is maintained. In addition, in the case where wire breakage or a short circuit suddenly occurs in either one of the inter-coil resistor 150 and 160, the torque computation section 32 can stop the steering assist immediately. Therefore, safety is high.

Notably, in the above-described seventh modification, the resistance $R_0$ is calculated on the assumption that the resistance $R_a$ of each of the detection coils 112, 113, 122, and 123 is known. However, in the case where the resistance $R_a$ changes due to an anomaly occurred in any one of the detection coils 112, 113, 122, and 123, the value of the ratio "a" (i.e., the ratio of $S_{s1}$ to $S_{s12}$) changes. As a result, the change in the resistance $R_a$ appears as a change in the resistance $R_0$. Accordingly, by means of conducting a failure diagnosis through the calculation of the resistance $R_0$, the torque computation section 32 can detect an anomaly occurred in any of the detection coils 112, 113, 122, and 123.

In the above-described steering torque detection routine, the torque computation section 32 determines the anomaly level on the basis of the magnitude of the resistance difference $|\Delta R|$ between the resistance $R_0$ of each of the inter-coil resistors 150 and 160 and the reference resistance $R_{00}$. Instead, the torque computation section 32 may determine the anomaly level on the basis of the magnitude of the difference ($|a_0-a|$) between the value of the ratio "a" (i.e., the ratio of $S_{s1}$ to $S_{s12}$) and the reference value $a_0$. For example, in step S112, the torque computation section 32 determines whether or not the value of $|a_0-a|$ is equal to or less than the permissibility determination value W1, and in step S113 subsequent thereto, the torque computation section 32 determines whether or not the value of $|a_0-a|$ is equal to or less than the warning determination value W2. Such a configuration, just like the above-described configuration, allows the torque computation section 32 to detect the resistance anomaly of each of the inter-coil resistors 150 and 160 and the resistance anomaly of each of the detection coils 112, 113, 122, and 123.

Meanwhile, in the above-described steering torque detection routine, the torque computation section 32 stops the steering assist in the case where wire breakage occurs in either one of the inter-coil resistors 150 and 160. This method of processing can be modified such that the torque computation section 32 does not stop the steering assist so long as none of the detection lines 212b, 213b, 222b, and 223b is broken even when wire breakage occurs in either one of the inter-coil resistors 150 and 160. In this case, in step S15, the torque computation section 32 can calculate the rotational angles $\theta_1$ and $\theta_2$ by use of the method according to the fourth modification. That is, the torque computation section 32 calculates the rotational angles $\theta_1$ and $\theta_2$ by use of the first sin phase amplitude $S_{s1}$ obtained by performing the multiplying and accumulating operation for the sum ($E_{s1}+E_{s2}$) of the detection voltages $E_{s1}$ and $E_{s2}$ with $\sin(\omega t+\phi)$; the second sin phase amplitude $S_{s2}$ obtained by performing the multiplying and accumulating operation for the sum ($E_{s1}+E_{s2}$) with $\cos(\omega t+\phi)$; the first cos phase amplitude $S_{c1}$ obtained by performing the multiplying and accumulating operation for the sum ($E_{c1}+E_{c2}$) of the detection voltages $E_{c1}$ and $E_{c2}$ with $\sin(\omega t+\phi)$; and the second cos phase amplitude $S_{c2}$ obtained by performing the multiplying and accumulating operation for the sum ($E_{c1}+E_{c2}$) with $\cos(\omega t+\phi)$. Thus, the torque computation section 32 can calculate the rotational angles $\theta_1$ and $\theta_2$ without the influence of the wire breakage occurred in either one of the inter-coil resistors 150 and 160. As a result, the steering assist can be continued, whereby redundancy of the electric power steering apparatus can be provided.

Notably, such a method of continuing the steering assist even in the case where wire breakage occurs in either one of the inter-coil resistors 150 and 160 can be implemented only in a situation where none of the detection lines 212b, 213b, 222b, and 223b is broken. Therefore, in the steering torque detection routine, the torque computation section 32 repeatedly determines whether or not wire breakage is present in either one the inter-coil resistors 150 and 160, and repeatedly determines whether or not wire breakage is present in any one of the detection lines 212b, 213b, 222b, and 223b. If the torque computation section 32 detects a situation at least one of the detection lines 212b, 213b, 222b, and 223b breaks in a state in which the either one of the inter-coil resistors 150 and 160 is broken, the torque computation section 32 outputs a torque detection impossible signal to the assist computation section 31, to thereby stop the steering assist.

<Eighth Modification>

In the above-described basic embodiment and modifications, in the case where the first excitation line 210 or the second excitation line 220 is broken, the torque computation section 32 cannot calculate the rotational angles $\theta_1$ and $\theta_2$, and must stop the steering assist. In the eighth modification, the torque computation section 32 can calculate the rotational angles $\theta_1$ and $\theta_2$ even in the case where the external first excitation line 210b or the external second excitation line 220b of the wiring harness section breaks.

Figure 23:
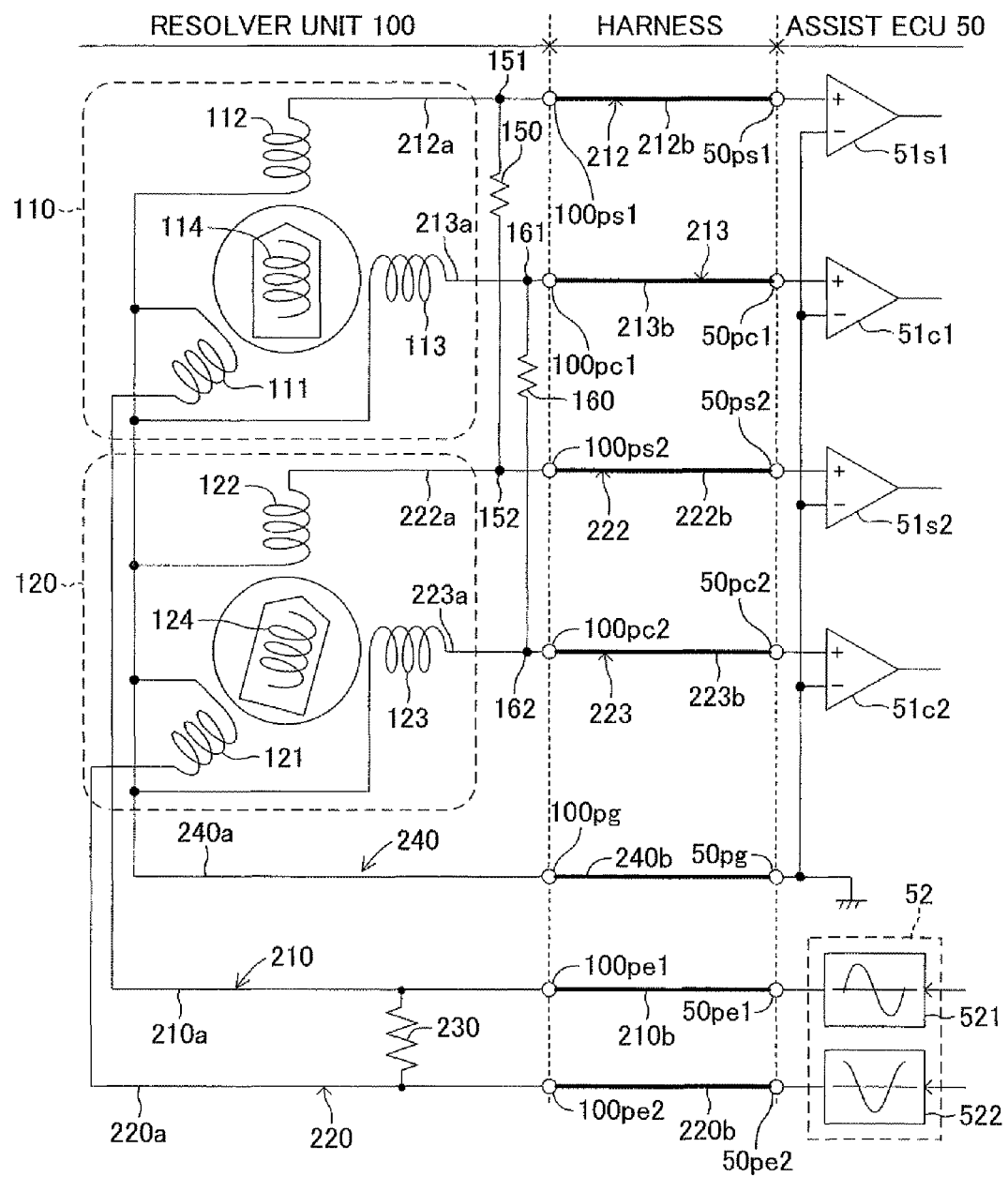
FIG. 23 is a schematic configurational diagram showing a resolver unit and the connection between the resolver unit and an assist ECU (an eighth modification).
Figure 24:
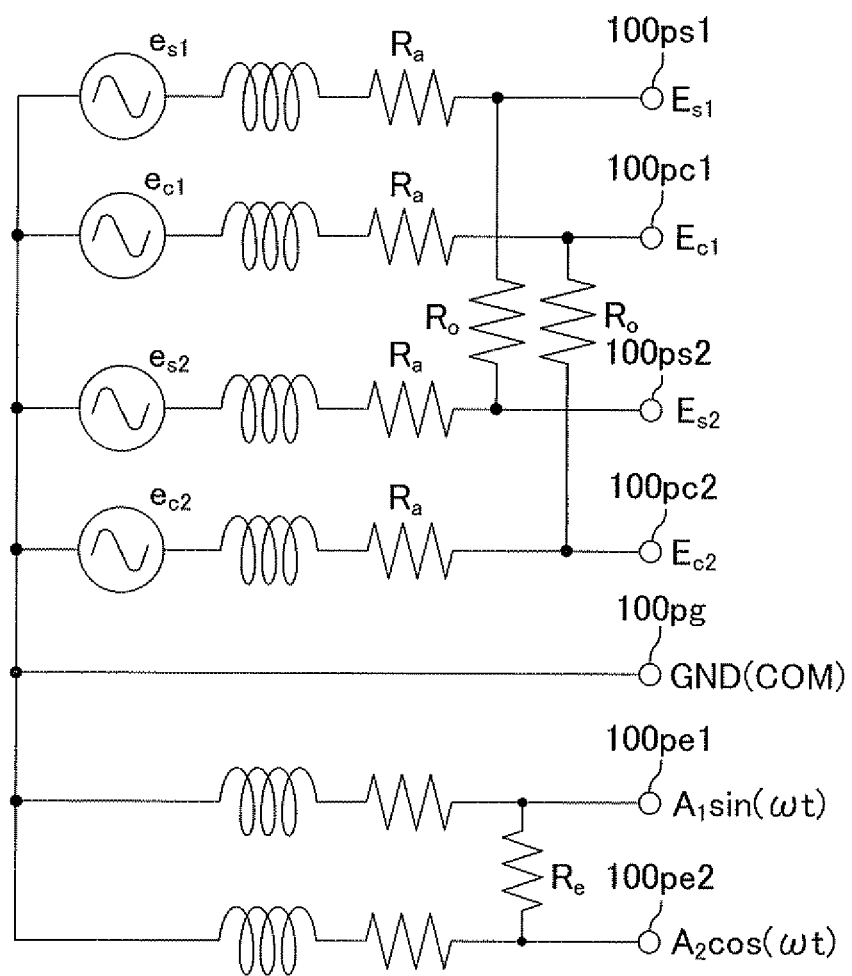
FIG. 24 is an electrical circuit diagram of the resolver unit (the eighth modification).

FIG. 23 shows the configuration of the resolver unit 100 according to the eighth modification. In this resolver unit 100, the internal first excitation line 210a and the internal second excitation line 220a are connected each other via an electric resistor element 230 which is not included in the basic embodiment. Hereinafter, the electric resistor element 230 will be referred to as an inter-excitation-line resistor 230, and its resistance will be referred to as $R_e$. FIG. 24 is an electrical diagram of this resolver unit 100.

First, a method of calculating the rotational angles $\theta_1$ and $\theta_2$ will be described.

Let $a=(R_0+R_a)/(R_0+2R_a)$. Then, the first sin phase detection voltage $E_{s1}$ and the second sin phase detection voltage $E_{s2}$ are represented by the following equations (80) and (81).

$$E_{s1}=a \cdot e_{s1}+(1-a)e_{s2} \qquad (80)$$

$$E_{s2}=(1-a)e_{s1}+a \cdot e_{s2} \qquad (81)$$

By solving these equations, the first sin phase coil voltage $e_{s1}$ and the second sin phase coil voltage $e_{s2}$ are represented by the following equations (82) and (83).

$$e_{s1} = \frac{a \cdot E_{s1} + (a-1)E_{s2}}{2a-1} \tag{82}$$

$$e_{s2} = \frac{a \cdot E_{s2} + (a-1)E_{s1}}{2a-1} \tag{83}$$

Similarly, the first cos phase detection voltage $E_{c1}$ and the second cos phase detection voltage $E_{c2}$ are represented by the following equations (84) and (85).

$$E_{c1} a \cdot e_{c1} + (1-a)e_{c2} \tag{84}$$

$$E_{c2} = (1-a)e_{c1} + a \cdot e_{c2} \tag{85}$$

By solving these equations, the first cos phase coil voltage $e_{c1}$ and the second cos phase coil voltage $e_{c2}$ are represented by the following equations (86) and (87).

$$e_{c1} = \frac{a \cdot E_{c1} + (a-1)E_{c2}}{2a-1} \tag{86}$$

$$e_{c2} = \frac{a \cdot E_{c2} + (a-1)E_{c1}}{2a-1} \tag{87}$$

Accordingly, the coil voltages $e_{s1}$, $e_{s2}$, $e_{c1}$, and $e_{c2}$ can be obtained through the above-described calculations.

The torque computation section 32 calculates the coil voltages $e_{s1}$, $e_{s2}$, $e_{c1}$, and $e_{c2}$ as described above, and then calculates the amplitudes $S_{s1}$, $S_{s2}$, $S_{c1}$, and $S_{c2}$ by performing the multiplying and accumulating operation for the coil voltages $e_{s1}$, $e_{s2}$, $e_{c1}$, and $e_{c2}$. For example, the torque computation section 32 calculates the amplitudes $S_{s1}$ and $S_{c1}$ by performing the multiplying and accumulating operation for the coil voltages $e_{s1}$ and $e_{c1}$ of the first resolver 110 with $\sin(\omega t + \phi)$, and calculates the amplitudes $S_{s2}$ and $S_{c2}$ by performing the multiplying and accumulating operation for the coil voltages $e_{s2}$ and $e_{c2}$ of the second resolver 120 with $\cos(\omega t + \phi)$. Subsequently, the torque computation section 32 substitutes the calculated amplitudes $S_{s1}$ and $S_{c1}$ into the above-described equation (22) in order to calculate the first rotational angle $\theta_1$, and substitutes the calculated amplitudes $S_{s2}$ and $S_{c2}$ into the above-described equation (23) in order to calculate the second rotational angle $\theta_2$.

Figure 25:
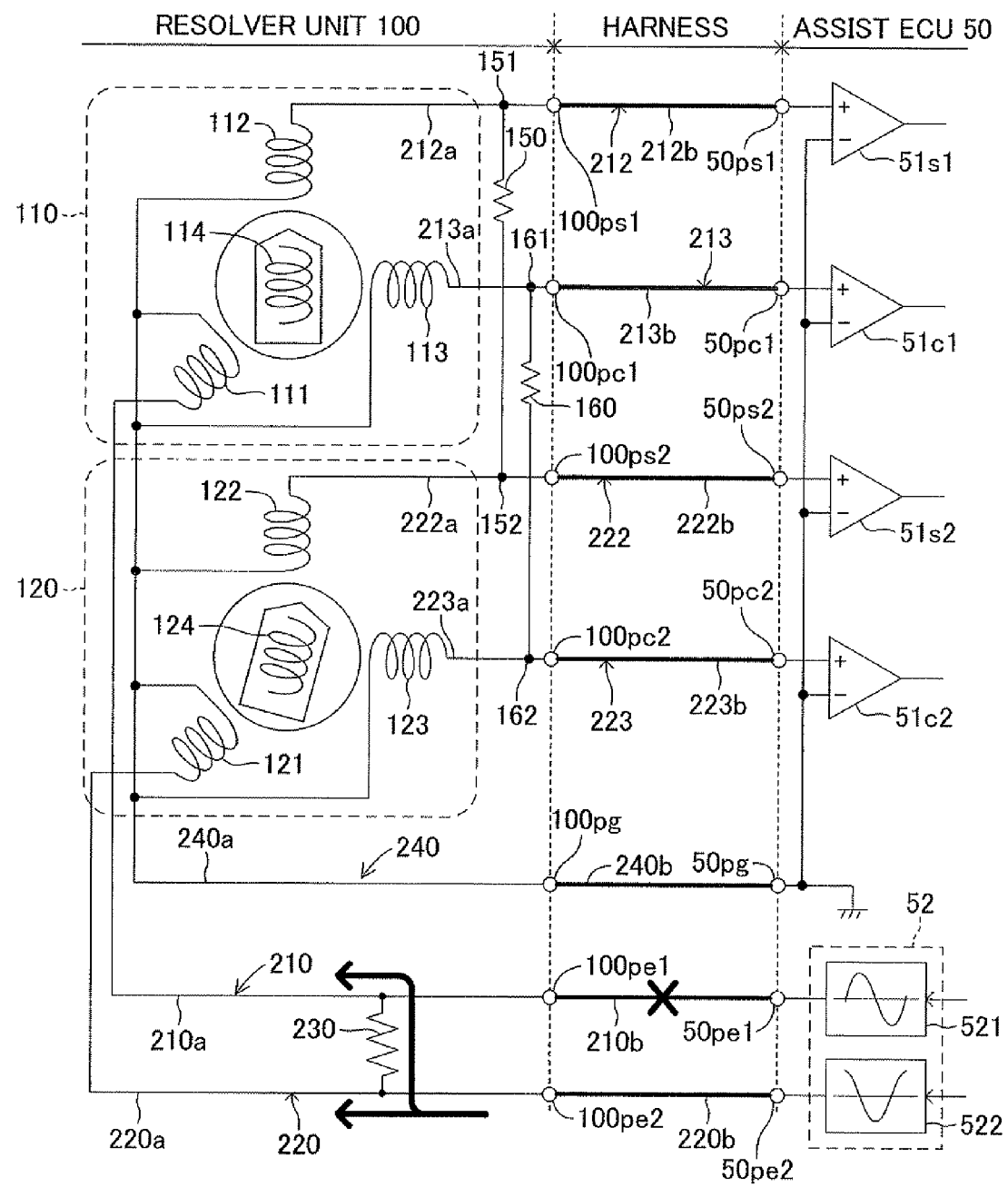
FIG. 25 is a diagram showing the flow of an excitation signal in the case where a first excitation line is broken.
Figure 26:
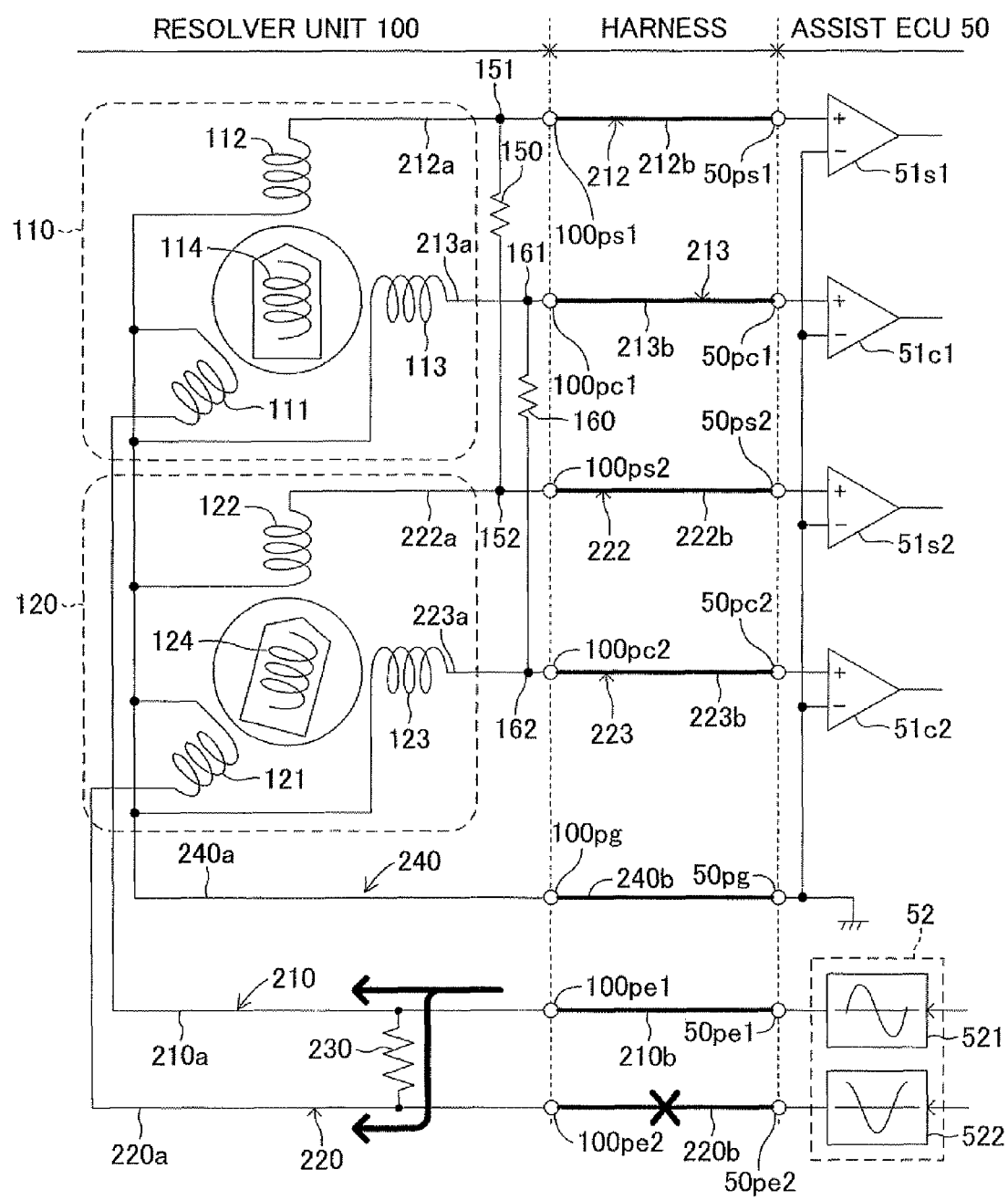
FIG. 26 is a diagram showing the flow of an excitation signal in the case where a second excitation line is broken.

Next, there will be described a method of calculating the rotational angles $\theta_1$ and $\theta_2$ at the time when the case where the external first excitation line 210b or the external second excitation line 220b is broken. In the resolver unit 100, as shown in FIG. 25, even in the case where the external first excitation line 210b is broken, an excitation signal is supplied to the first resolver 110 via the inter-excitation-line resistor 230. Similarly, as shown in FIG. 26, even in the case where the external second excitation line 220b is broken, an excitation signal is supplied to the second resolver 120 via the inter-excitation-line resistor 230.

In the case where the external first excitation line 210b is broken, the second excitation signal ($A_2 \cos(\omega t)$) is supplied to the first resolver 110 and the second resolver 120. Therefore, the torque computation section 32 performs the multiplying and accumulating operation for the coil voltages $e_{s1}$, $e_{s2}$, $e_{c1}$, and $e_{c2}$ with $\cos(\omega t + \phi)$ in order to calculate the amplitudes $S_{s1}$, $S_{s2}$, $S_{c1}$, and $S_{c2}$. In this case, the above-described equations for calculating the coil voltages $e_{s1}$, $e_{s2}$, $e_{c1}$, and $e_{c2}$ do not change regardless of breakage of the external first excitation line 210b. Thus, the torque computation section 32 calculates the coil voltages $e_{s1}$, $e_{s2}$, $e_{c1}$, and $e_{c2}$ by use of the above-described equations, and performs the multiplying and accumulating operation for the calculated coil voltages $e_{s1}$, $e_{s2}$, $e_{c1}$, and $e_{c2}$ with $\cos(\omega t + \phi)$ to thereby calculate the amplitudes $S_{s1}$, $S_{s2}$, $S_{c1}$, and $S_{c2}$. Subsequently, the torque computation section 32 substitutes the calculated amplitudes $S_{s1}$ and $S_{c1}$ into the above-described equation (22) in order to calculate the first rotational angle $\theta_1$, and substitutes the calculated amplitudes $S_{s2}$ and $S_{c2}$ into the above-described equation (23) in order to calculate the second rotational angle $\theta_2$.

In the case where the external first excitation line 210b is broken, the current supplied to the first excitation coil 111 decreases due to the influence of the inter-excitation-line resistor 230 as compared with the case where the external first excitation line 210b is not broken. Accordingly, the coil voltages $e_{s1}$ and $e_{c1}$ decrease. However, the ratio of the coil voltage $e_{s1}$ to the coil voltage $e_{c1}$ does not change even if the external first excitation line 210b is broken. Thus, occurrence of the breakage does not affect the calculation of the rotational angle $\theta_1$.

Similarly, in the case where the external second excitation line 220b is broken, the first excitation signal ($A_1 \sin(\omega t)$) is supplied to the first resolver 110 and the second resolver 120. Accordingly, the torque computation section 32 performs the multiplying and accumulating operation for the coil voltages $e_{s1}$, $e_{s2}$, $e_{c1}$, and $e_{c2}$ with $\sin(\omega t + \phi)$ in order to calculate the amplitudes $S_{s1}$, $S_{s2}$, $S_{c1}$, and $S_{c2}$. In this case, the above-described equations for calculating the coil voltages $e_{s1}$, $e_{s2}$, $e_{c1}$, and $e_{c2}$ do not change regardless of breakage of the external second excitation line 220b. Thus, the torque computation section 32 calculates the coil voltages $e_{s1}$, $e_{s2}$, $e_{c1}$, and $e_{c2}$ by use of the above-described equations, and performs the multiplying and accumulating operation for the calculated coil voltages $e_{s1}$, $e_{s2}$, $e_{c1}$, and $e_{c2}$ with $\sin(\omega t + \phi)$ to thereby calculate the amplitudes $S_{s1}$, $S_{s2}$, $S_{c1}$, and $S_{c2}$. Subsequently, the torque computation section 32 substitutes the calculated amplitudes $S_{s1}$ and $S_{c1}$ into the above-described equation (22) in order to calculate the first rotational angle $\theta_1$, and substitutes the calculated amplitudes $S_{s2}$ and $S_{c2}$ into the above-described equation (23) in order to calculate the second rotational angle $\theta_2$.

Notably, in the configuration according to the eighth modification, the torque computation section 32 cannot calculate rotational angles in a situation where one of the detection lines 212b, 213b, 222b, and 223b breaks in a state in which the external first excitation line 210b or the external second excitation line 220b is broken. Accordingly, in the steering torque detection routine, the torque computation section 32 repeatedly determines whether or not wire breakage is present in either one of the excitation coils 210b and 220b, and repeatedly determines whether or not wire breakage is present in any one of the detection lines 212b, 213b, 222b, and 223b. If the torque computation section 32 detects a situation where at least one of the excitation lines 210b and 220b is broken and at least one of the detection lines 212b, 213b, 222b, and 223b is broken, the torque computation section 32 outputs a torque detection impossible signal to the assist computation section 31, to thereby stop the steering assist.

Meanwhile, in the case where any one of the detection lines 212b, 213b, 222b, and 223b breaks in a state in which where neither the external first excitation line 210b nor the external second excitation line 220b is broken, the torque computation section 32 cannot calculate the rotational angles $\theta_1$ and $\theta_2$ by use of the above-described method. Accordingly, in the case where breakage of any one of the detection lines 212b, 213b, 222b, and 223b is detected, the torque computation section 32 switches the calculation method from the above-described method to the calculation method (step S30 of FIG. 6) according to the basic embodiment.

Notably, the torque computation section 32 has wire breakage detection means which detects breakage of the excitation lines 210b and 220b. For example, this wire breakage detection means detect wire breakage as follows. In the case where the external first excitation line 210b is broken, the ratio $((S_{s1}^2+S_{c1}^2)/(S_{s2}^2+S_{c2}^2))$ of the value of the sum of squares of the amplitudes $S_{s1}$ and $S_{c1}$ $(S_{s1}^2+S_{c1}^2)$ to the value of the sum of squares of the amplitudes $S_{s2}$ and $S_{c2}$ $(S_{s2}^2+S_{c2}^2)$ decreases by a preset value as compared with the ratio at the time when the external first excitation line 210b is not broken.

Similarly, in the case where the external second excitation line 220b is broken, the ratio $((S_{s1}^2+S_{c1}^2)/(S_{s2}^2+S_{c2}^2))$ of the sum of squares of the amplitudes $S_{s1}$ and $S_{c1}$ $(S_{s1}^2+S_{c1}^2)$ to the sum of squares of the amplitudes $S_{s2}$ and $S_{c2}$ $(S_{s2}^2+S_{c2}^2)$ increases by the preset value as compared with the ratio at the time when the external second excitation line 220b is not broken.

In view of this, in the steering torque detection routine, the torque computation section 32 calculates a ratio Z $(=(S_{s1}^2+S_{c1}^2)/(S_{s2}^2+S_{c2}^2))$ which is a ratio of the sum of squares of amplitudes $S_{s1}$ and $S_{c1}$ $(S_{s1}^2+S_{c1}^2)$ to the sum of squares of the amplitudes $S_{s2}$ and $S_{c2}$ $(S_{s2}^2+S_{c2}^2)$. If the calculated ratio Z is in the vicinity of a first reference value Z1 (<1), the torque computation section 32 determines that the external first excitation line 210b is broken. If the calculated ratio Z is in the vicinity of a second reference value Z2 (>1), the torque computation section 32 determines that the external second excitation line 220b is broken. The first reference value Z1 and the second reference value Z2 are assumed values of the ratios Z at the time when the external first excitation line 210b and the external second excitation line 220b are broken respectively. These values are obtained in advance through experiments or calculations, and are stored in the memory of the assist ECU 50.

Instead of determining presence of wire breakage on the basis of the ratio Z, for example, the torque computation section 32 may determine that the external first excitation line 210b is broken in the case where the value of the sum of squares of the amplitudes. $S_{s1}$ and $S_{c1}$ $(S_{s1}^2+S_{c1}^2)$ is in the vicinity of a reference value $S_{f1}$ which is smaller than the normal value, and determine that the external second excitation line 220b is broken in the case where the value of the sum of squares of the amplitudes $S_{s2}$ and $S_{c2}$ $(S_{s2}^2+S_{c2}^2)$ is in the vicinity of a reference value $S_{f2}$ which is smaller than the normal value. The reference values $S_{f1}$ and $S_{f2}$ are assumed values of the sum of squares of the amplitudes at the time when the external first excitation line 210b and the external second excitation line 220b are broken respectively. These values are obtained in advance through experiments or calculations, and are stored in the memory of the assist ECU 50.

Notably, in the case where the torque computation section 32 detects breakage of any one of the excitation lines 210 and 220 and the detection lines 212b, 213b, 222b, and 223b, the torque computation section 32 turns on the warning lamp 65 in order to warn the driver of an anomaly.

According to the above-described eighth modification, even in the case where either one of the first excitation line 210 or the second excitation line 220 is broken, the torque computation section 32 can calculate the rotational angles $\theta_1$ and $\theta_2$. Accordingly, the steering assist can be continued by use of the electric power steering apparatus. In the case where the first excitation line 210 or the second excitation line 220 is broken and any one of the detection lines 212b, 213b, 222b, and 223b is broken, the steering assist is stopped so as to ensure safety.

Moreover, in the case where any one of the excitation lines 210 and 220 and the detection lines 212b, 213b, 222b, and 223b is broken, the torque computation section 32 can turn on the warning lamp 65 in order to prompt the driver to replace faulty parts. Thus, breakage of two lines in a wiring harness (double failure) can be prevented, and the problem of the steering assist being stopped can also be prevented.

In the above, the present embodiment and its modifications have been described. However, the present invention is not limited to the above-described embodiment and modifications, and can be modified in various ways without departing from the scope of the present invention. For example, a plurality of the above-described modifications may be combined. In addition, the torque detection device may be provided not only in the electric power steering apparatus for detecting steering torque but also in other apparatuses.

The invention claimed is:

1. A torque detection device comprising;
a resolver unit including a first resolver and a second resolver, the first resolver having a first excitation coil supplied with an excitation AC signal, a first sin phase detection coil which outputs a voltage signal having an amplitude corresponding to the sin value of a rotational angle of a shaft at a first axial position thereof, and a first cos phase detection coil which outputs a voltage signal having an amplitude corresponding to the cos value of the rotational angle of the shaft at the first axial position thereof, the second resolver having a second excitation coil supplied with an excitation AC signal, a second sin phase detection coil which outputs a voltage signal having an amplitude corresponding to the sin value of a rotational angle of the shaft at a second axial position thereof, and a second cos phase detection coil which outputs a voltage signal having an amplitude corresponding to the cos value of the rotational angle of the shaft at the second axial position thereof; and
torque computation section which supplies the excitation AC signals to an excitation AC signal input section of the first excitation coil and an excitation AC signal input section of the second excitation coil via individual excitation lines, inputs the voltage signals from a signal output section of the first sin phase detection coil, a signal output section of the first cos phase detection coil, a signal output section of the second sin phase detection coil, and a signal output section of the second cos phase detection coil via individual detection lines, calculates a first rotational angle of the shaft at the first axial position and a second rotational angle of the shaft at the second axial position on the basis of the voltage signals, and calculates a torque acting around the axis of the shaft on the basis of the calculated first and second rotational angles, wherein
the resolver unit includes a first inter-coil resistor element which electrically connects the signal output section of one of the first sin phase detection coil and the first cos phase detection coil of the first resolver and the signal output section of one of the second sin phase detection coil and the second cos phase detection coil of the second resolver, and a second inter-coil resistor element which electrically connects the signal output section of the other of the first sin phase detection coil and the first cos phase detection coil of the first resolver and the signal output section of the other of the second sin phase detection coil and the second cos phase detection coil of the second resolver; and the torque computation section includes:

a coil drive circuit which supplies a sin wave signal for excitation to one of the first excitation coil and the second excitation coil and supplies a cos wave signal for excitation to the other of the first excitation coil and the second excitation coil, the cos wave signal for excitation having a frequency identical with that of the sin wave signal for excitation and having a phase delay of 90° in relation to the sin wave signal for excitation, and separation means which separates excitation sin wave signal components corresponding to the sin wave signal for excitation, and excitation cos wave signal components corresponding to the cos wave signal for excitation, from composite signals which are input via the detection lines and including the voltage signals output from the first resolver and the second resolver in a mixed manner.

2. A torque detection device according to claim 1, wherein the torque detection device is provided in an electric power steering apparatus for a vehicle so as to detect steering torque applied to a steering shaft.

3. A torque detection device according to claim 1, wherein the first resolver and the second resolver are assembled to the shaft such that the first resolver and the second resolver have a phase shift of 90° in electrical angle therebetween in a state in which no torque is applied to the shaft.

4. A torque detection device according to claim 1, wherein the resolver unit includes resistor elements for coping with grounding which are provided in the signal output section of the first sin phase detection coil, the signal output section of the first cos phase detection coil, the signal output section of the second sin phase detection coil, and the signal output section of the second cos phase detection coil such that each resistor element for coping with grounding is located on the side toward the corresponding detection line in relation to a connection point where the first inter-coil resistor element or the second inter-coil resistor element is connected to the corresponding signal output section.

5. A torque detection device according to claim 1, wherein the separation means adds the voltage values of the composite signals output from two signal output sections which are electrically connected with each other via the first inter-coil resistor element, adds the voltage values of the composite signals output from two signal output sections which are electrically connected with each other via the second inter-coil resistor element, and calculates, from the resultant voltage values, values contained in the excitation sin wave signal component and corresponding to the amplitudes of the output voltages of the corresponding detection coils and values contained in the excitation cos wave signal component and corresponding to the amplitudes of the output voltages of the corresponding detection coils.

6. A torque detection device according to claim 1, wherein the torque computation section includes temperature compensation means which compensates the influence, on the calculated rotational angles, of a difference between the temperature characteristic of the internal resistance of each detection coil and the temperature characteristic of each inter-coil resistor element.

7. A torque detection device according to claim 6, wherein the temperature compensation means compensates the influence of the temperature characteristics on the calculated rotational angles by making the material of the inter-coil resistor elements the same as the material of the detection coils.

8. A torque detection device according to claim 6, wherein the separation means compensates the influence of the difference in temperature characteristic on the calculated rotational angles by separately extracting the voltage signal components output from the first sin phase detection coil, the first cos phase detection coil, the second sin phase detection coil, the second cos phase detection coil, from two composite signals output from the first resolver or the second resolver to the torque computation section.

9. A torque detection device according to claim 1, wherein the torque computation section includes phase shift compensation means which compensates phase shift between the voltage signals generated in the detection coils and the corresponding composite signals input to the torque computation section.

10. A torque detection device according to claim 9, wherein the phase shift compensation means compensates the phase shift by inductors connected in series to the first inter-coil resistor element and the second inter-coil resistor element respectively.

11. A torque detection device according to claim 1, wherein the torque computation section includes:

resistance calculation means which calculates the resistance of each inter-coil resistor element on the basis of the composite signals received via the detection lines, and anomaly processing means which performs anomaly processing when the calculated resistance falls outside a normal range.

12. A torque detection device according to claim 11, wherein the anomaly processing means operates a warning device when the calculated resistance falls within a warning range defined outside the normal range, and outputs a torque detection impossible signal when the calculated resistance falls within a detection impossible range defined outside the warning range.

13. A torque detection device according to claim 1, wherein the resolver unit includes an inter-excitation-coil resistor element which electrically connects the excitation AC signal input section of the first excitation coil and the excitation AC signal input section of the second excitation coil.

* * * * *